(12) United States Patent
Matsuura et al.

(10) Patent No.: US 7,096,079 B2
(45) Date of Patent: Aug. 22, 2006

(54) AUDIO PROCESSING AND IMAGE GENERATING APPARATUS, AUDIO PROCESSING AND IMAGE GENERATING METHOD, RECORDING MEDIUM AND PROGRAM

(75) Inventors: Masaya Matsuura, Tokyo (JP); John Belmonte, Tokyo (JP); Anthony Carrico, Sunderland, MA (US)

(73) Assignee: Sony Computer Entertainment Inc., Tokyo (JP)

(*) Notice: Subject to any disclaimer, the term of this patent is extended or adjusted under 35 U.S.C. 154(b) by 891 days.

(21) Appl. No.: 09/863,169

(22) Filed: May 22, 2001

(65) Prior Publication Data

US 2001/0037181 A1 Nov. 1, 2001

Related U.S. Application Data

(63) Continuation-in-part of application No. 09/687,463, filed on Oct. 13, 2000, now abandoned.

(30) Foreign Application Priority Data

Oct. 14, 1999 (JP) ................................. 11-293057

(51) Int. Cl.
- *G06F 17/00* (2006.01)
- *G06F 19/00* (2006.01)
- *A63F 9/24* (2006.01)
- *A63F 13/00* (2006.01)

(52) U.S. Cl. ................................ 700/94; 463/7; 463/36
(58) Field of Classification Search .............. 84/464 R, 84/464 A; 700/94; 463/7, 36; 434/250; 482/8; 381/59, 306
See application file for complete search history.

(56) References Cited

U.S. PATENT DOCUMENTS

| 3,892,478 | A | * | 7/1975 | Lampkin | 353/15 |
| 4,164,942 | A | * | 8/1979 | Beard et al. | 128/201.19 |
| 4,196,461 | A | * | 4/1980 | Geary | 362/259 |
| 4,887,197 | A | * | 12/1989 | Effinger | 362/306 |
| 4,972,305 | A | * | 11/1990 | Blackburn | 362/234 |
| 5,191,319 | A | * | 3/1993 | Kiltz | 345/73 |
| 5,280,742 | A | * | 1/1994 | Vergara | 84/411 R |
| 5,313,276 | A | * | 5/1994 | Taaffe | 348/51 |
| 5,513,129 | A | * | 4/1996 | Bolas et al. | 703/13 |
| 5,818,342 | A | * | 10/1998 | Solomon et al. | 340/815.46 |
| 5,907,115 | A | * | 5/1999 | Matsunaga et al. | 84/477 R |
| 6,001,013 | A | * | 12/1999 | Ota | 463/7 |
| 6,151,010 | A | * | 11/2000 | Miller et al. | 345/440.1 |

(Continued)

FOREIGN PATENT DOCUMENTS

EP  0 638 861 A1  2/1995

(Continued)

OTHER PUBLICATIONS

Tektronix TDS 340A, TDS 360, & TDS 380 Digital Real-Time Oscilloscopes User Manual (1995).*

(Continued)

*Primary Examiner*—Sinh Tran
*Assistant Examiner*—Andrew Flanders
(74) *Attorney, Agent, or Firm*—Fitch, Even, Tabin & Flannery

(57) ABSTRACT

An audio processing and image generating apparatus for displaying novel line drawing images on a display screen according to music is disclosed. A character object line drawing image is displayed on a virtual road object line drawing image. Further, obstacle object line drawing images generated based on a result of a frequency analysis of an digital audio signal of CD data or the like are inserted in the virtual road object line drawing image.

8 Claims, 56 Drawing Sheets

U.S. PATENT DOCUMENTS

| | | | |
|---|---|---|---|
| 6,227,968 B1* | 5/2001 | Suzuki et al. | 463/7 |
| 6,233,086 B1* | 5/2001 | Hardiman | 359/290 |
| 6,758,756 B1* | 7/2004 | Horigami et al. | 463/43 |
| 2002/0008702 A1* | 1/2002 | Gilbert | 345/440.1 |

FOREIGN PATENT DOCUMENTS

| | | |
|---|---|---|
| JP | 6-348811 A | 12/1994 |
| JP | 7-65143 A | 3/1995 |
| JP | 8-293039 A | 11/1996 |
| JP | 9-251368 A | 9/1997 |
| JP | 11-149565 A | 6/1999 |

OTHER PUBLICATIONS

Japanese Patent Office; "Rejection of the Application"; mailing date Jan. 21, 2003; (5 pages, including two-page English translation of portions).

"Introduction of a Japanese Waveform Editing Software for Windows ('DigiOnSound' capable of linking moving images)" DTM Magazine; vol. 6, No. 8; Terajima Joho Kikaku Co. Ltd.; Aug. 1, 1999; 2 pages (including one-page partial English translation).

"Check & Report", Sound Forge 4.5, Sonic Foundry; DTM Magazine; vol. 6, No. 1; Terajima Joho Kikaku Co. Ltd.; Jan. 1, 1999; 3 pages (including one-page partial English translation).

"Set to Clean Up?"; Steinberg Avalon 2.0 Atari Sample Editor; http://www.sospubs.co.uk/sos/jul99/articles/retrosteinberg.htm; XP-002240716; Retrieved from the internet on Sep. 5, 2003; (5 pages).

European Patent Office; "European Search Report"; cited in corresponding European Patent Application No. EP 00 30 9022; dated Aug. 12, 2003; (2 pages).

Conrad Electronic, Katalog (Electronic Welt 97); XP-002240714; 1997; (1 page).

A. Merck; "Steinberg Cubase Audio Sequenzer & Harddisk-Recording fur Apple Macintosh"; Keyboards; Musik Media Verlag; Augsburg; XP-002240715; Jan. 1993; (5 pages).

Japanese Patent Office; "Rejection of the Application"; Mailing No. 286343; Mailing Date: Aug. 19, 2003; (2 pages, with one-page English translation of portions).

Takeyasu Tabuchi; "Dance Dance Revolution 2$^{nd}$ MIX"; GAMEST; vol. 14, No. 10 issued by Shinsei-sha on Mar. 15, 1999; (p. 104, with one-page English translation).

A. Merck; "Steinberg Cubase Audio Sequenzer & Harddisk-Recording fur Apple Macintosh"; Keyboards; Musik Media Verlag; Augsburg; XP-002240715; Jan. 1993; pp. 112-115 and 118; (with 10-page full English translation included).

* cited by examiner

F I G.12
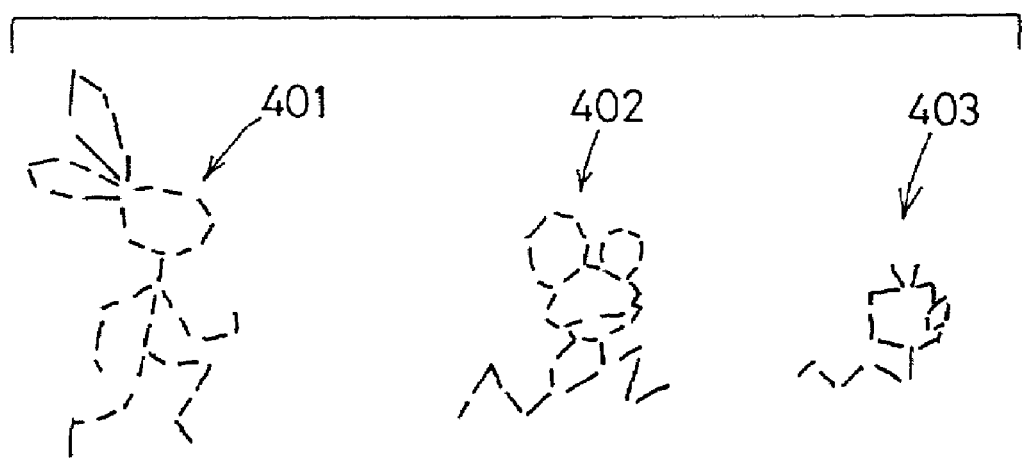

FIG.13
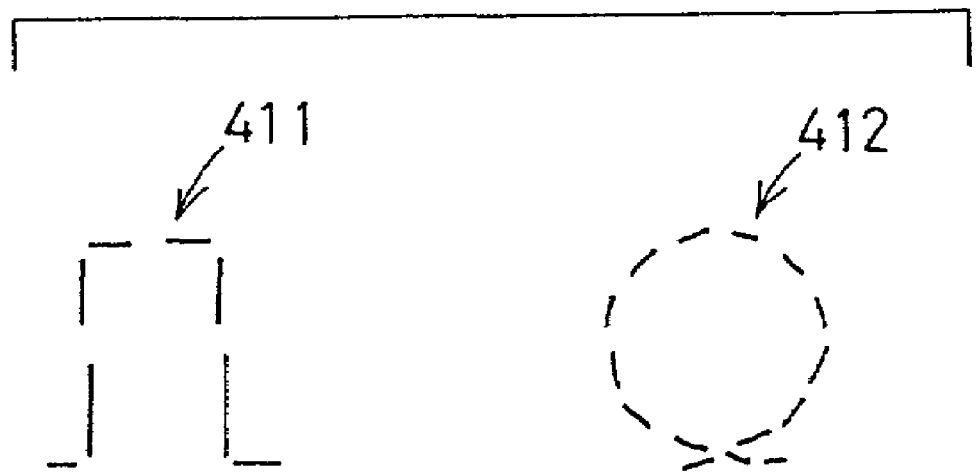
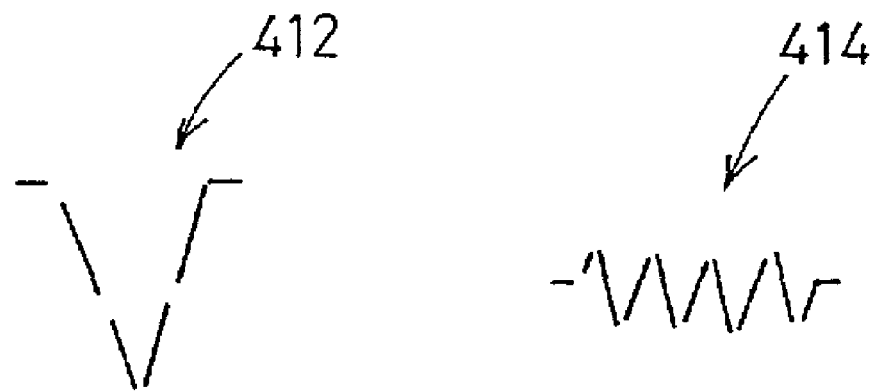

F I G. 15
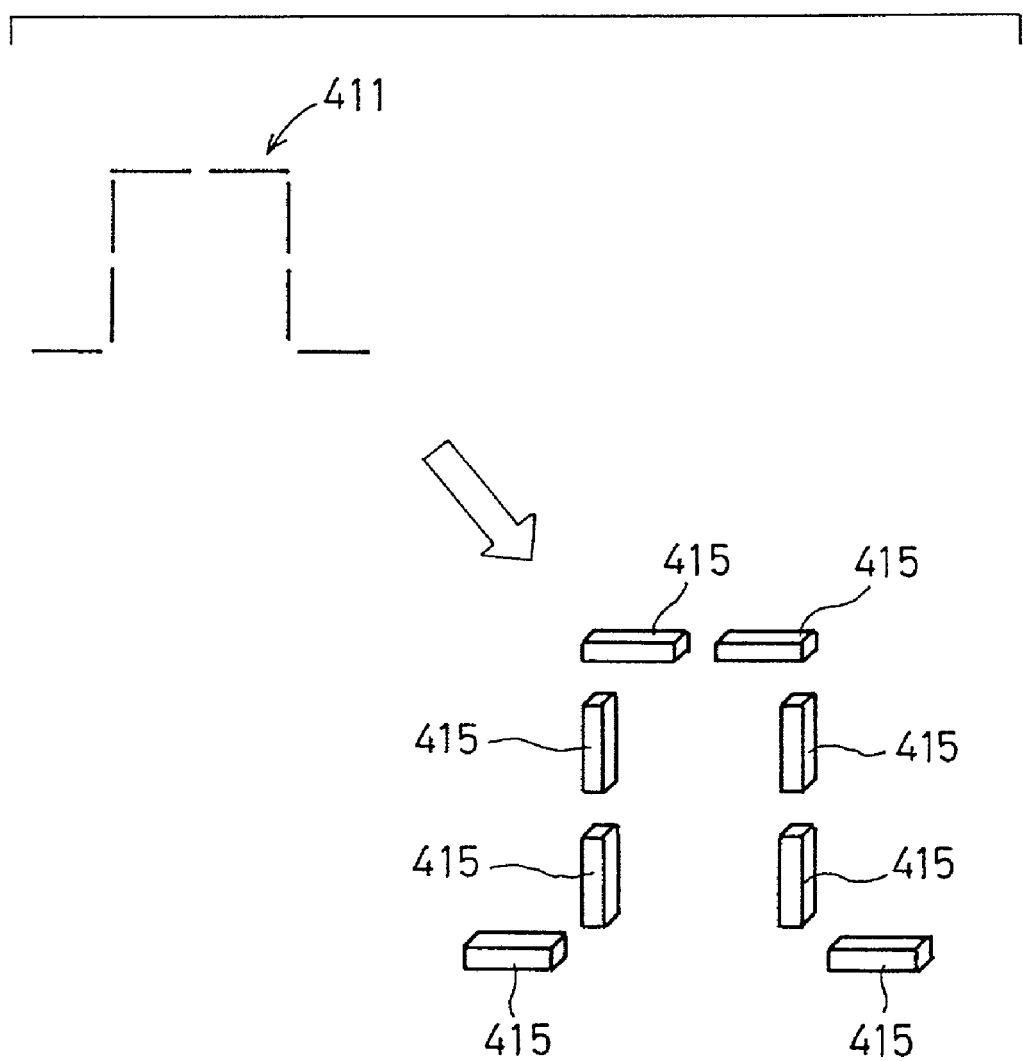

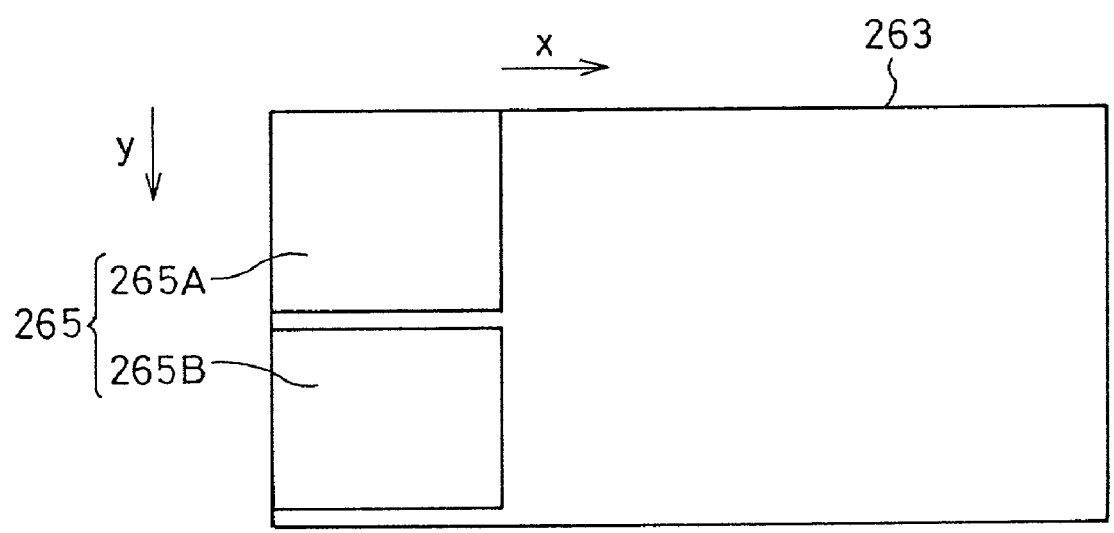
F I G. 21

F I G. 22
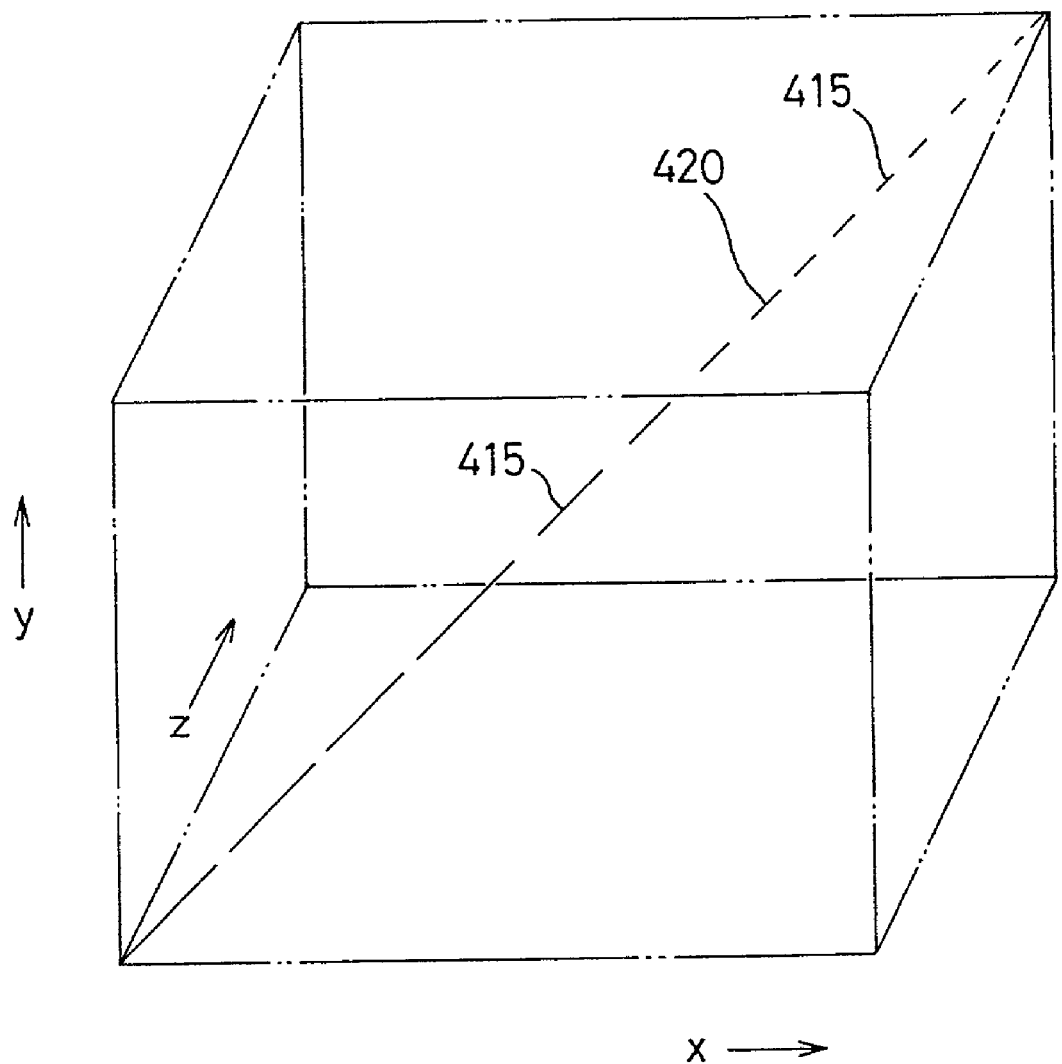

F I G. 24
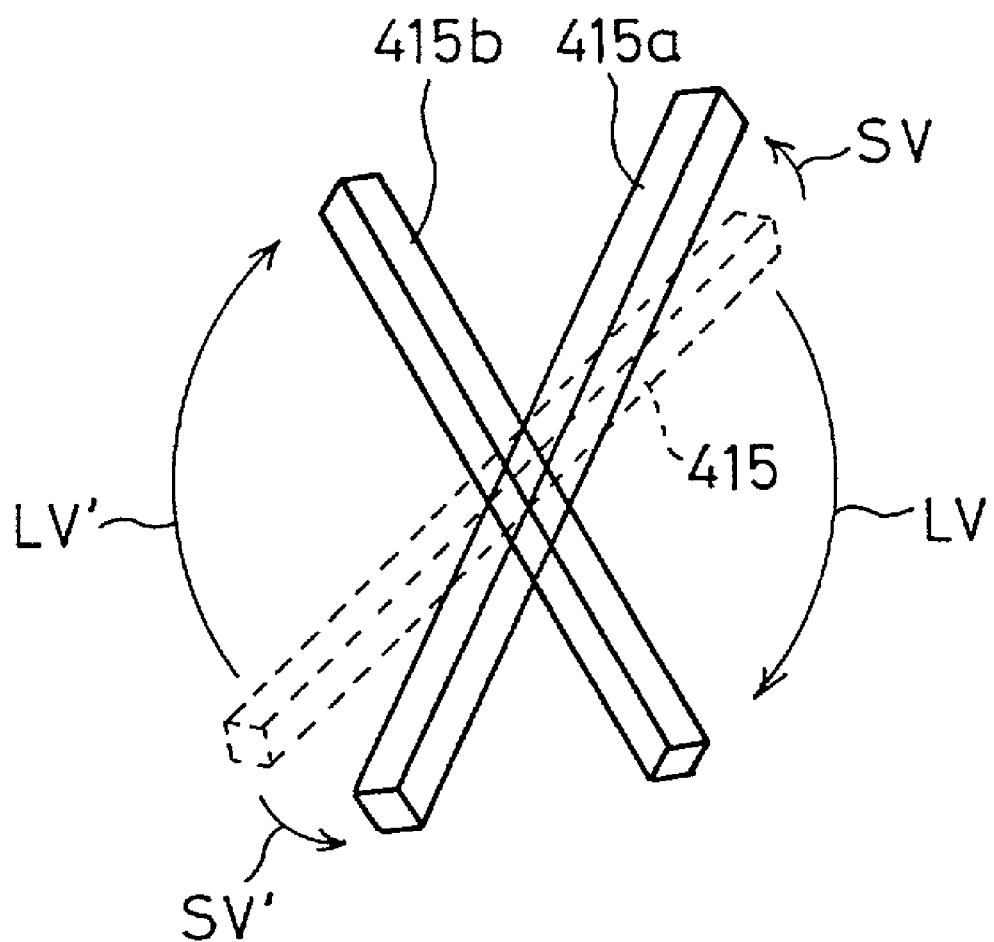

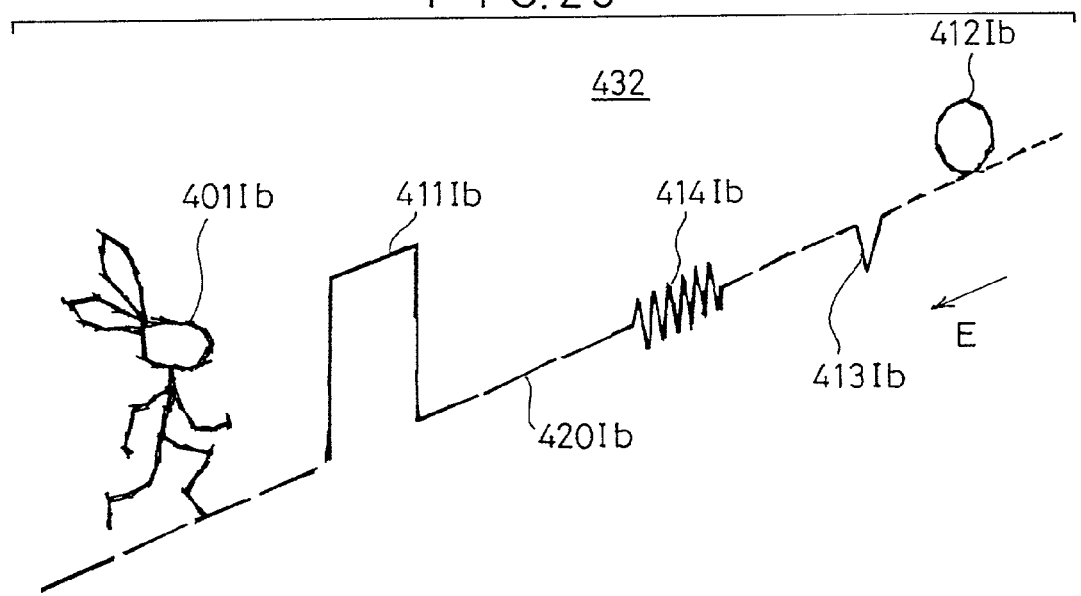
F I G. 25

F I G. 31
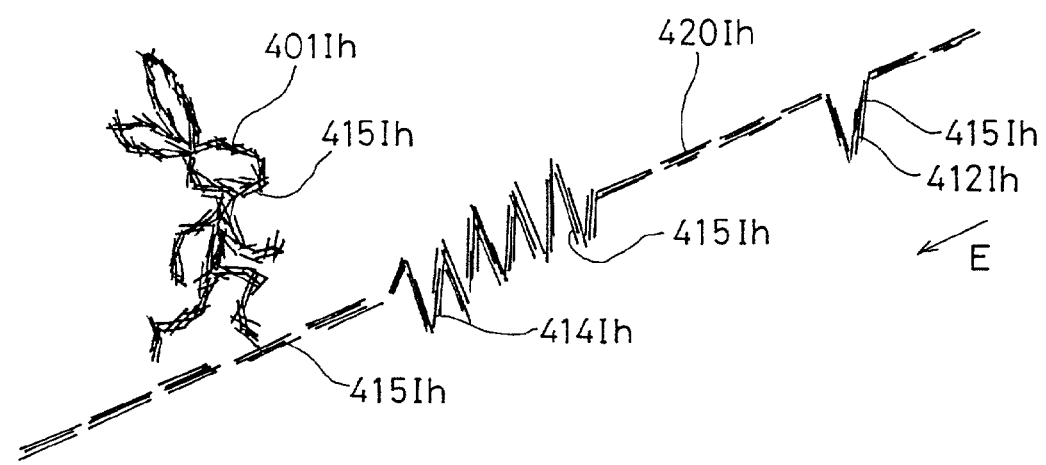

F I G. 39
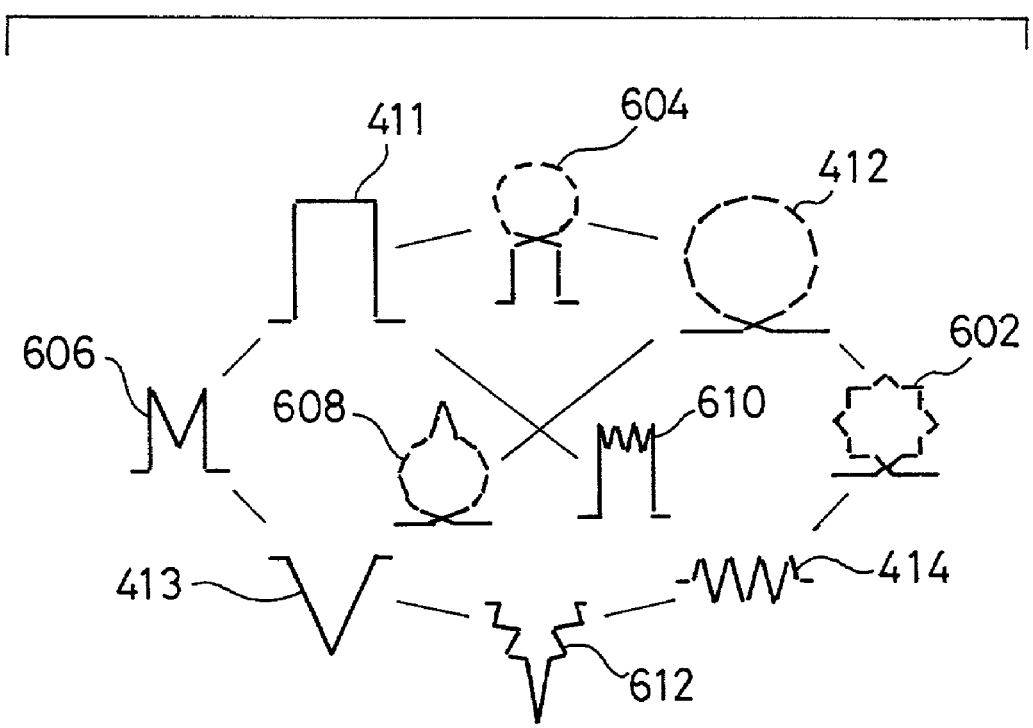

F I G. 40
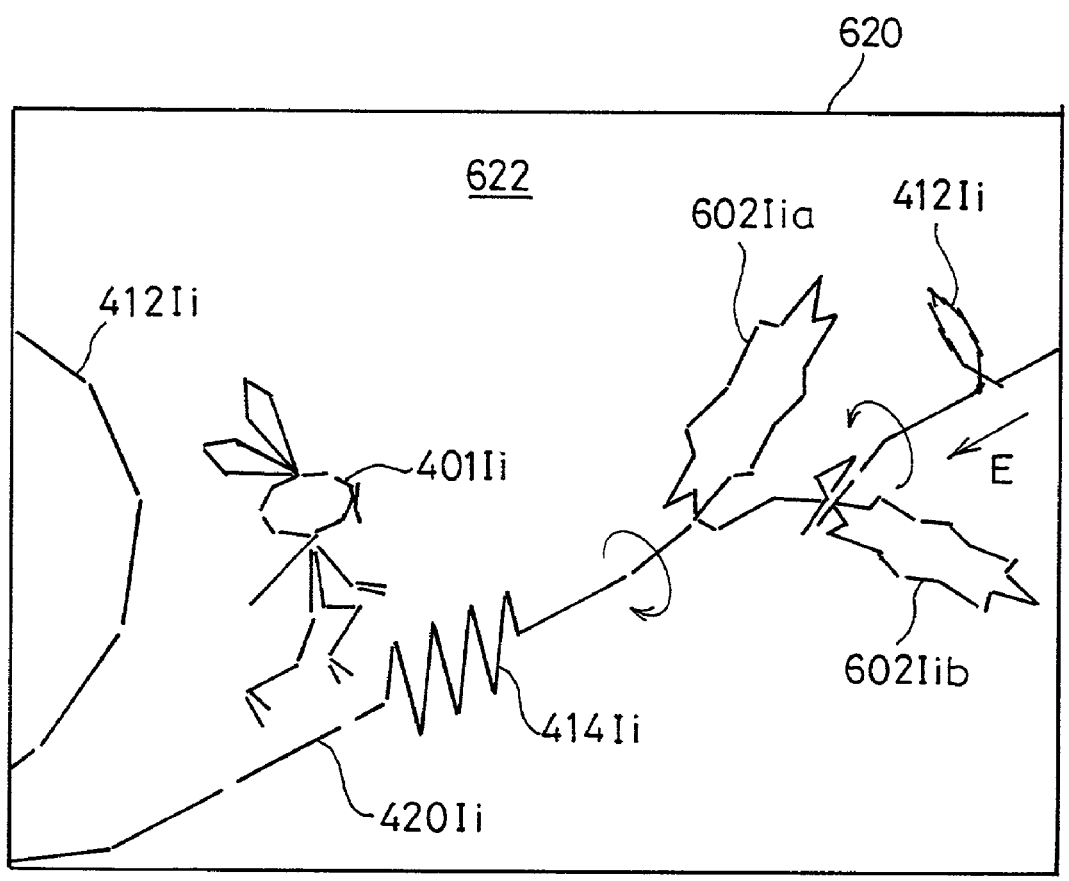

AUDIO PROCESSING AND IMAGE GENERATING APPARATUS, AUDIO PROCESSING AND IMAGE GENERATING METHOD, RECORDING MEDIUM AND PROGRAM

CROSS-REFERENCE TO RELATED APPLICATION

The present application is a continuation-in-part of U.S. patent application Ser. No. 09/687,463 filed on Oct. 13, 2000 now abandoned, which is assigned to the assignee of the present application.

BACKGROUND OF THE INVENTION

1. Field of the Invention

The present invention relates to an audio processing and image generating apparatus, an audio processing and image generating method, a recording medium, and a program which make it possible to display novel line drawing images on a display screen according to music.

2. Description of the Related Art

In some information apparatuses such as entertainment apparatuses including video game machines (entertainment systems), for example, a game is played by manipulating a controller while displaying the contents of the game stored in a recording medium such as a CD-ROM on the screen of a television receiver as a monitor.

Currently, many games available on the market are directed to utilize more realistic and finer video images with the aid of recent advanced technology. In such games, the controller of the entertainment apparatus can be vibrated according to the movement of images so as to make the games more realistic and interesting. Under the circumstances, since games are getting more complicated, the difficulties of the games tend to be increased. In some games, high level of skills for manipulating the controller is required for the user. In this case, it is not possible for some users such as amateur game players or older people to complete the games. Further, once a user completes such games and acquires the manipulation skills, the user may soon get tired of playing the games.

In contrast, less complicated games utilizing only line drawing images can be widely accepted by people in different generations. That is, since such games are simple and do not require manipulation skills, children and old people can enjoy the heartwarming games.

SUMMARY OF THE INVENTION

The present invention was made taking the above-described points into consideration, and an object of the invention is to provide an audio processing and image generating apparatus, an audio processing and image generating method, a recording medium, and a program which make it possible to display novel line drawing images on a display screen according to music.

According to the present invention, a line drawing image is generated based on a result of an analysis of an audio signal. Accordingly, it is possible to generate a novel image according to music.

According to the present invention, a frequency analysis or an amplitude analysis of an audio signal for a certain period of time may be performed. Therefore, it is possible to process an audio signal easily.

Further, the line drawing image may be drawn as a three-dimensional line drawing image so as to generate a highly entertaining image.

The three-dimensional line drawing image may be an image comprising a substantially linear line drawing image extending between a right side and a left side on a display screen and non-linear line drawing images each of which is generated based on an result of an analysis of an audio signal. Accordingly, variety of line drawing images can be generated.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIG. 12 is an illustration of character objects.

FIG. 13 is an illustration of obstacle objects.

FIG. 15 is an illustration of an example of formation of an object.

FIG. 21 is an illustration of a frame buffer.

FIG. 22 is an illustration for explaining generation of a three-dimensional line drawing image.

FIG. 24 is an illustration for explaining a vibration process.

FIG. 25 is an illustration showing a screen that appears several seconds after the beginning of the game.

FIG. 31 is an illustration of a screen which appears at a time interval of about one second or more after the character object fails in getting over the obstacle object.

FIG. 39 is an illustration for explaining obstacle objects according to the embodiment.

FIG. 40 is an illustration of a screen in which obstacle objects rotate about a virtual road.

DESCRIPTION OF THE PREFERRED EMBODIMENT

An embodiment of the present invention will be described below specifically with reference to drawings.

Figure 1:
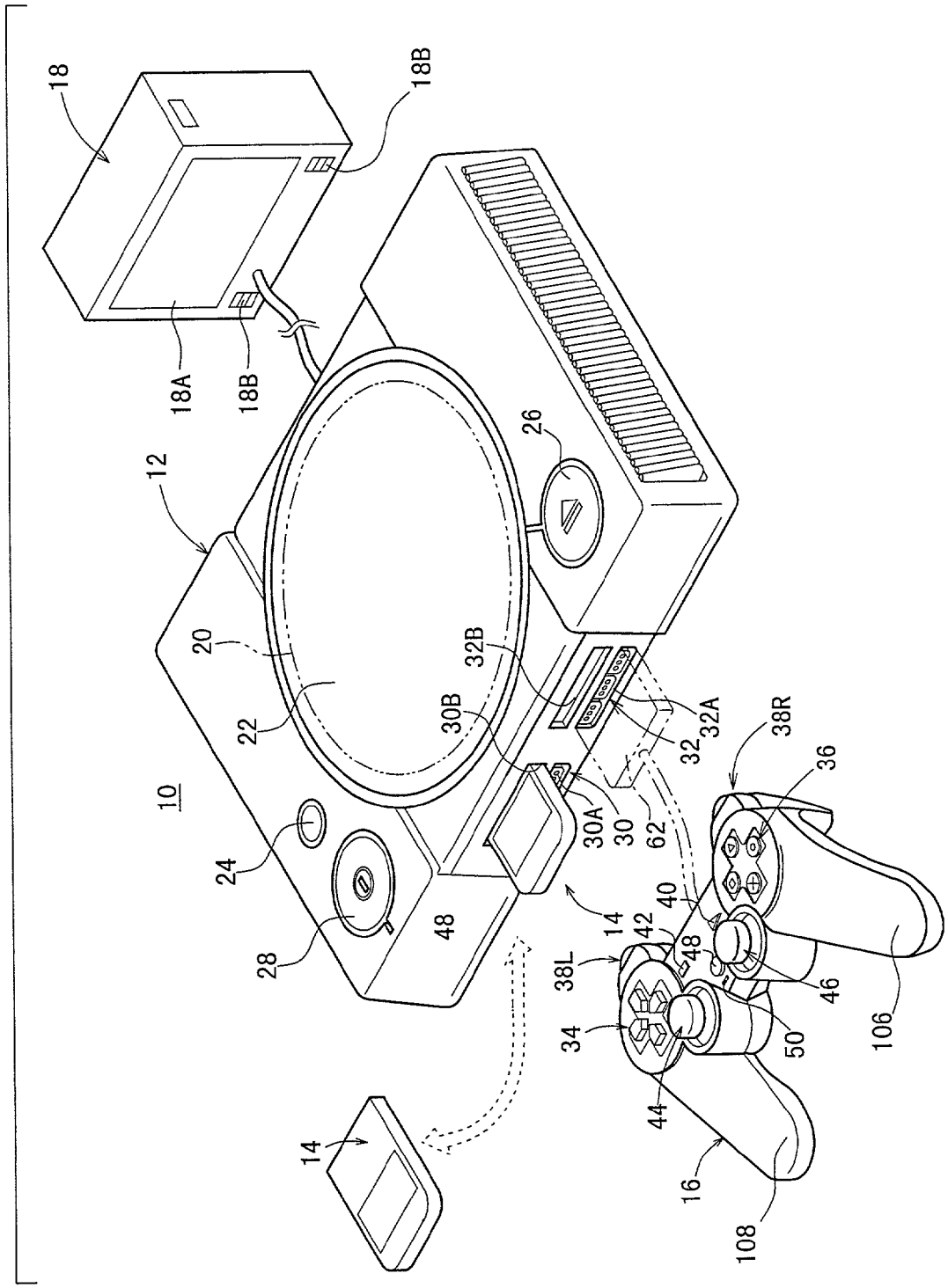
FIG. 1 is a perspective view of an entertainment system according to an embodiment of the present invention.

FIG. 1 shows generally an arrangement of an entertainment system 10 to which an image processing apparatus according to the embodiment of the present invention is applied.

The entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a monitor 18 such as a television receiver which is supplied with video and audio output signals from the entertainment apparatus 12.

The entertainment apparatus 12 reads a program and data recorded in a mass storage medium such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the monitor 18 based on manual input actions entered from the manual controller 16 via the connector 62.

The entertainment system 10 is capable of playing back an optical disk 20 such as a CD (compact disk) as a recording medium. Specifically, audio signals as music data (sound data) are read and played back by referring TOC (table of contents) data stored in the compact disk.

Further, the entertainment apparatus 12 is capable of executing a game program by utilizing the TOC data and music data stored in the compact disk.

The recording medium for supplying the application program and sound data is not limited to the optical disk 20. Alternatively, the entertainment apparatus 12 may be supplied with the application program and sound data via a communication link, rather than being supplied from the optical disk 20 as the recording medium.

The entertainment apparatus 12 has a substantially flat casing in the shape of a rectangular parallelepiped which houses a disk loading unit 22 disposed centrally for loading the optical disk 20 for supplying the application program and data for a video game or the like. The casing supports a reset switch 24 for resetting a program which is being presently executed, a disk control switch 26 for controlling the loading of the optical disk 20, a power supply switch 28, and two slots 30, 32.

The slots 30, 32 have respective upper slot units 30B, 32B and respective lower slot units 30A, 32A. Two manual controllers 16 may be connected respectively to the lower slot units 30A, 32A via the connectors 62, and memory cards 14 for storing flags indicative of interim game data may be connected respectively to the upper slot units 30B, 32B. The slots 30, 32 (the upper slot units 30B, 32B and the lower slot units 30A, 32A) are asymmetrically shaped to prevent the connectors 62 and the memory cards 14 from being inserted in the wrong direction.

Figure 2:
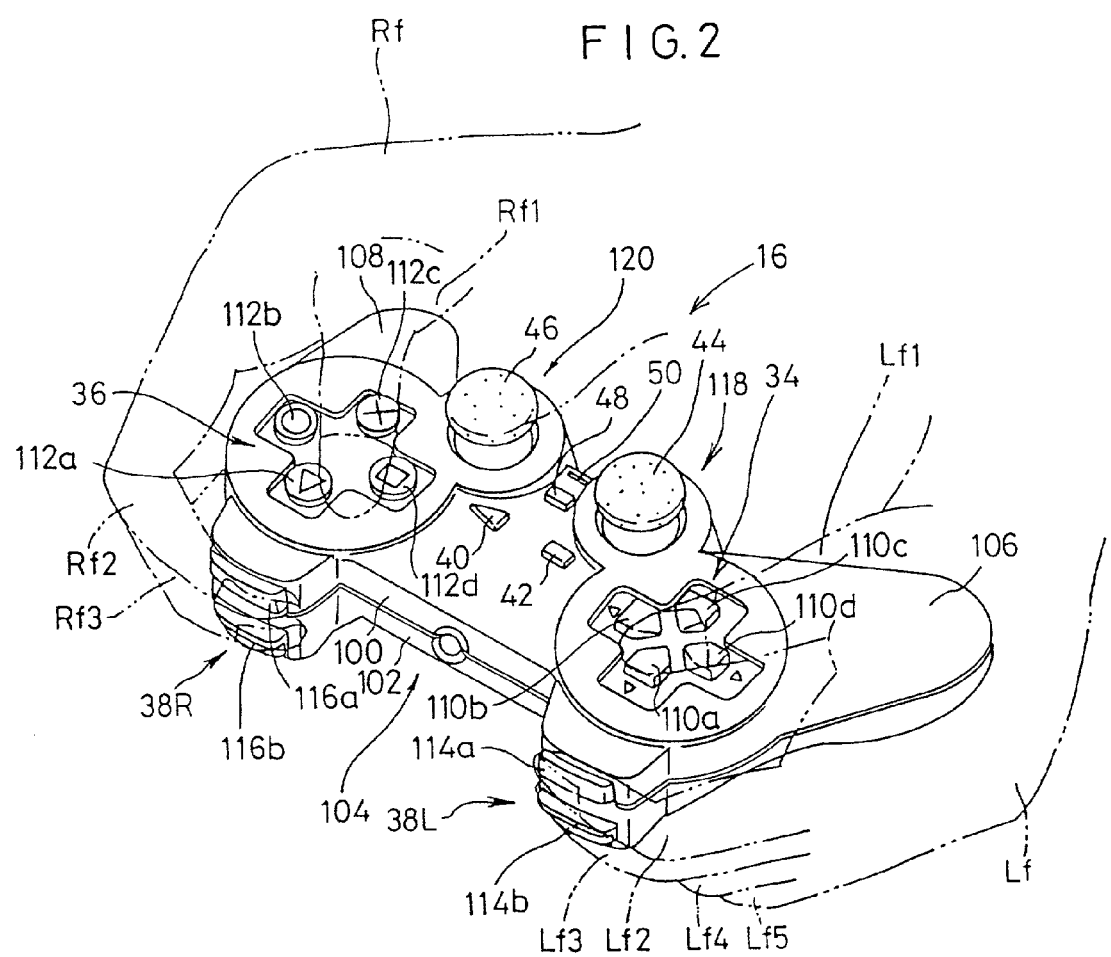
FIG. 2 is a perspective view of a manual controller.

As shown in FIGS. 1 and 2, the manual controller 16 basically comprises first and second control pads 34, 36, an L (Left) button 38L, an R (Right) button 38R, a start button 40, and a selection button 42. The manual controller 16 also has joysticks 44, 46 for making analog control actions, a mode selection switch 48 for selecting control modes of the joysticks 44, 46, and an indicator 50 for indicating a selected control mode. The indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIG. 2, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 1, the left and right grips 106, 108 are progressively spaced away from each other toward their distal ends.

As shown in FIGS. 2, the first control pad 34 is disposed on one end of the housing 104 and comprises a first pressable control member (up button) 110a, a second pressable control member (right button) 110b, a third pressable control member (down button) 110c, and a fourth pressable control member (right button) 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 1 and 2, the second control pad 36 is disposed on the other end of the housing 104 and comprises a first pressable control member (Δ button) 112a, a second pressable control member (○ button) 112b, a third pressable control member (X button) 112c, and a fourth pressable control member (□ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

The L button 38L and the R button 38R are disposed on a side of the housing 104 remote from the first and second grips 106, 108 and positioned respectively at the opposite ends of the housing 104. As shown in FIG. 2, the L button 38L and the R button 38R have respective first and second pressable control members 114a, 114b and 116a, 116b and respective switch elements associated respectively with the pressable control members 114a, 114b and 116a, 116b.

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

The first pressable control members 114a, 114b are also referred to as the L1 button 114a, the L2 button 114b, respectively. The second pressable control members 116a, 116b are also referred to as the R1 button 116a, the R2 button 114b, respectively.

As shown in FIG. 2, the manual controller 16 also has left and right analog control pads 118, 120 disposed respectively at confronting corners defined between the housing 104 and the proximal ends of the first and second grips 106, 108 which are joined to the housing 104.

The left and right analog control pads 118, 120 have the respective joysticks 44, 46 which can be tilted in all directions 360° about control shafts thereof, and respective signal input elements such as variable resistors or the like which are operable by the respective joysticks 44, 46. Specifically, the joysticks 44, 46 are mounted on tip ends of the control shafts that are normally urged to return to their neutral positions by resilient members, and can be tilted in all directions (360°) about the axes of the control shafts.

The left and right analog control pads 118, 120 can move a displayed game character while rotating the same or while changing its speed, and can make an analog-like action such as to change the form of a displayed character, when the game player rotates the joysticks 44, 46. Therefore, the left and right analog control pads 118, 120 are used as a control unit for entering command signals for a displayed character to perform the above movement or action.

When the mode selection switch 48 is pressed, it can select a control mode for allowing a command signal to be inputted from the left and right analog control pads 118, 120 or a control mode for inhibiting a command signal from being inputted from the left and right analog control pads 118, 120.

When the mode selection switch 48 is pressed, it can also select a control mode for allowing a command signal to be inputted from the left and right analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 2, the first and second grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 2, when the first and second grips 106, 108 are gripped respectively by the palms of the hands of the game player, the thumbs Rf1, Lf1 of the right and left hands can extend over the joysticks 44, 46 of the left and right analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the left and right analog control pads 118, 120 are positioned in confronting relation to the proximal ends of the first and second grips 106, 108 which are joined to the housing 104, when the first and second grips 106, 108 are gripped by the left and right hands, the joysticks 44, 46 are positioned most closely to the thumbs Rf1, Lf1, respectively. Therefore, the joysticks 44, 46 can easily be rotated by the thumbs Rf1, Lf1.

As shown in FIG. 2, when the first and second grips 106, 108 are gripped respectively by the palms of the hands of the game player, the index fingers Rf2, Lf2 and middle fingers Rf3, Lf3 of the right and left hands can extend over positions where they can selectively press the first and second pressable control members 114a, 114b and 116a, 116b of the R button 38R and the L button 38L.

Further, the manual controller 16 is provided with unillustrated vibration imparting mechanisms comprising motors or the like for imparting vibrations to the user in order for the user to be able to play a highly realistic game. Vibration commands for energizing the vibration imparting mechanisms are generated by the entertainment apparatus 12 so as to produce suitable vibration effects in the game.

Next, circuit arrangements of the entertainment apparatus 12 and the manual controller 16 will be described below.

Figure 3:
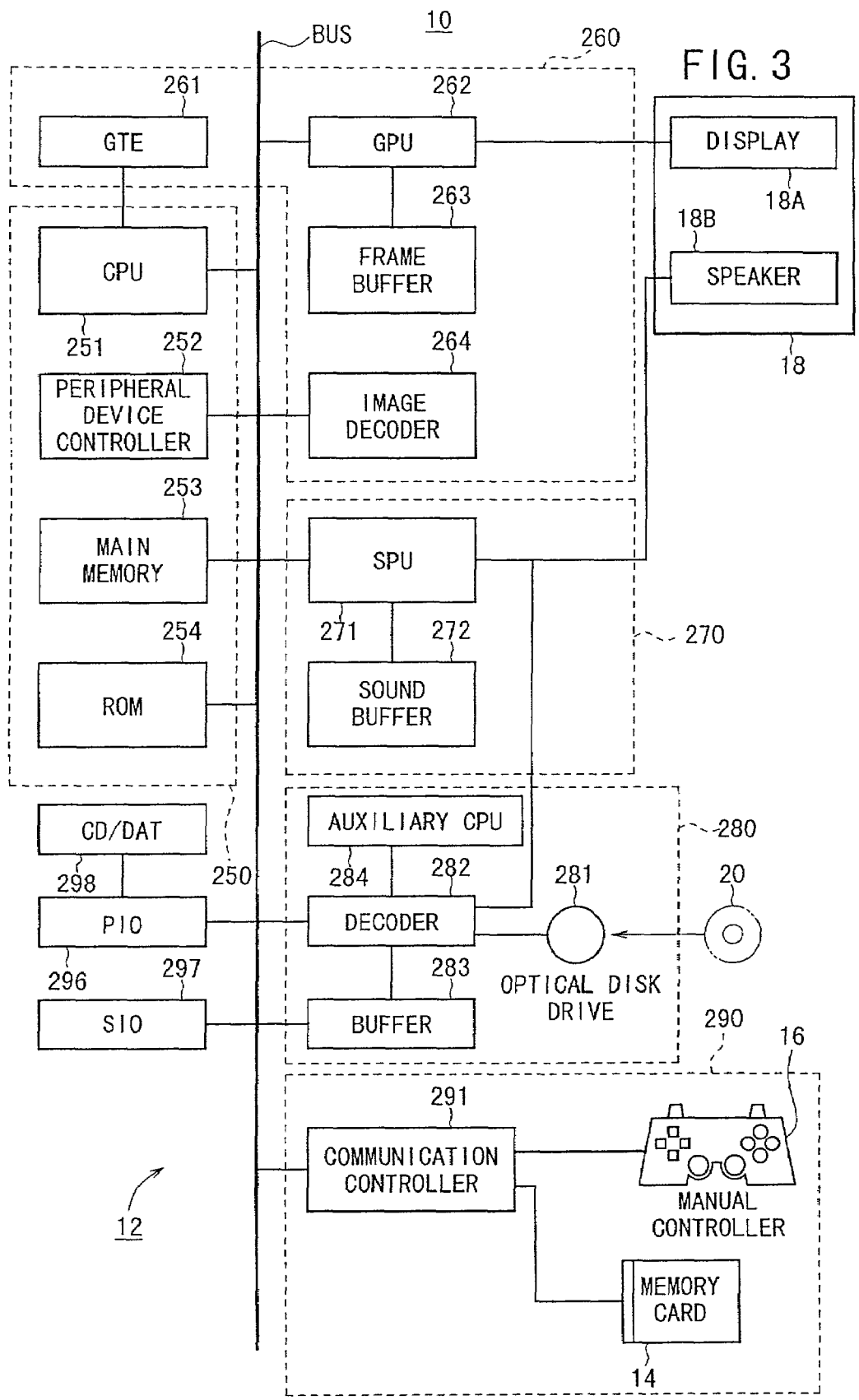
FIG. 3 is a block diagram showing a circuit configuration of the entertainment system.

FIG. 3 shows an arrangement of the entertainment system 10 including a circuit arrangement of major electric components of the entertainment apparatus 12.

As shown in FIG. 3, the entertainment apparatus 12 comprises a control system 250 including a central processing unit (CPU) 251 and its peripheral devices, a graphic system 260 including a graphic processing unit (GPU) 262 for generating and storing image data in a frame buffer 263, a sound system 270 including a sound processing unit (SPU) 271 for generating music sounds and sound effects, an optical disk controller 280 for controlling an optical disk 20 in which application programs are recorded, a communication controller 290 for controlling signals from the manual controller 16 which enter instructions from the user, and data supplied to and from a memory card 14 which stores game settings, and a bus BUS to which the control system 250, the graphic system 260, the sound system 270, the optical disk controller 280, and the communication controller 290 are connected.

The control system 250 comprises a CPU 251, a peripheral device controller 252 for controlling interrupts and direct memory access (DMA) data transfer, a main memory 253 comprising a random-access memory (RAM), and a read-only memory (ROM) 254 which stores various programs such as an operating system for managing the main memory 253, the graphic system 260, the sound system 270, etc. The main memory 253 is a memory capable of storing a program which is being executed.

The CPU 251 controls the entertainment apparatus 12 in its entirety by executing the operating system stored in the ROM 254. The CPU 251 comprises a 32-bit RISC-CPU, for example.

When the entertainment apparatus 12 is turned on, the CPU 251 executes the operating system stored in the ROM 254 to start controlling the graphic system 260, the sound system 270, etc. For example, when the operating system is executed, the CPU 251 initializes the entertainment apparatus 12 in its entirety for checking its operation, and thereafter controls the optical disk controller 280 to execute an application program recorded in the optical disk 20 loaded in the disk loading unit 22 (see FIG. 1)

As the application program such as a game program stored in the optical disk 20 is executed, the CPU 251 controls the graphic system 260, the sound system 270, etc. depending on commands entered from the user for thereby controlling the display of images and the generation of music sounds and sound effects.

The graphic system 260 comprises a geometry transfer engine (GTE) 261 for performing coordinate transformations including perspective transformations and other processing, a GPU 262 for generating image data according to instructions from the CPU 251, a frame buffer 263 for storing image data generated by the GPU 262 and updating a screen image each time a screen switching signal (screen image switching signal) such as a vertical synchronization signal is generated, and an image decoder 264 for decoding image data compressed and encoded by an orthogonal transform such as a discrete cosine transform. The image data stored in the frame buffer 263 is outputted by means of GPU 262 as a video image data. The outputted video image data is supplied to a display 18A of the monitor 18 such as television receiver or the like via an output terminal. The image data (including three dimensional image data) is updated each time a vertical synchronization signal is generated.

The GTE 261 has a parallel arithmetic mechanism for performing a plurality of arithmetic operations parallel to each other, and can perform coordinate transformations (including perspective transformations for transforming three dimensional images into two dimensional images), light source calculations, matrixes, or vectors at a high speed in response to a request from the CPU 251. Specifically, the GTE 261 can calculate the coordinates of a maximum of 1.5 million polygons per second for a flat shading process to plot one triangular polygon with one color, for example. With the GTE 261, the entertainment apparatus 12 is able to reduce the burden on the CPU 351 and perform high-speed coordinate calculations.

According to an image generating instruction from the CPU 251, the GPU 262 generates and stores the data of a polygon or the like in the frame buffer 263. The GPU 262 is capable of generating and storing a maximum of 360 thousand polygons per second.

The frame buffer 263 comprises a dual-port RAM, and is capable of simultaneously storing image data generated by the GPU 262 or image data transferred from the main memory 53, and reading image data for display.

The frame buffer 263 has a storage capacity of 1 Mbytes, for example, and is handled as a 16-bit matrix made up of a horizontal row of 1024 pixels and a vertical column of 512 pixels. The frame buffer 263 has areas for selectively storing image data and outputting the stored image data as video output data, a CLUT (color look-up table) area for storing a color look-up table which will be referred to by the GPU 262 when it generates a polygon or the like, and a texture area for storing texture data to be subjected to coordinate transformations when a polygon is generated and mapped onto a polygon generated by the GPU 262. The CLUT area and the texture area are dynamically varied as the areas for selectively storing image data and outputting the stored image data as video output data are varied.

The GPU 262 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 261 can perform coordinate calculations for a maximum of about 500,000 polygons per second.

The image decoder 264 is controlled by the CPU 251 to decode image data of a still or moving image stored in the main memory 253, and store the decoded image into the main memory 253.

Image data reproduced by the image decoder 264 is transferred to the frame buffer 263 by the GPU 262, and can be used as a background for an image plotted by the GPU 262.

The sound system 270 comprises an SPU 271 for generating music sounds, sound effects, etc. based on instructions from the CPU 251, a sound buffer 272 for storing waveform data from the SPU 271. Music sounds, sound effects generated by the SPU 271 are outputted by a speaker 18B of the monitor 18.

The SPU 271 has an ADPCM (adaptive differential PCM) function for reproducing 16-bit sound data which has been encoded as 4-bit differential sound data by ADPCM, a reproducing function for reproducing the waveform data stored in the sound buffer 272 to generate sound effects, etc., and a modulating function for modulating and reproducing the waveform data stored in the sound buffer 272.

The sound system 270 can be used as a sampling sound source which generates music sounds, sound effects, etc. based on the waveform data stored in the sound buffer 272 according to commands from the CPU 251.

The optical disk controller 280 comprises an optical disk drive 281 for reproducing application programs and data recorded on the optical disk 20, a decoder 282 for decoding programs and data that are recorded with an error correcting code (ECC) added thereto, and a buffer 283 for temporarily storing data read from the optical disk drive 281 so as to allow the data from the optical disk 20 to be read at a high speed. An auxiliary CPU 284 is connected to the decoder 282.

Sound data recorded on the optical disk 20 which is read by the optical disk drive 281 includes PCM data converted from analog sound signals, in addition to the ADPCM data. The ADPCM data, which is recorded as 4-bit differential data of 16-bit digital data, is decoded by the decoder 82, supplied to the SPU 271, converted thereby into analog data, and applied to drive the speaker 18B. The PCM data, which is recorded as 16-bit digital data, is decoded by the decoder 282 and then applied to drive the speaker 18B.

The communication controller 290 comprises a communication controller 291 for controlling communication with the CPU 251 via the bus BUS. The communication controller 291 is connected to the manual controller 16 for entering commands from the user, the memory card 14 as an auxiliary memory device for storing game settings, etc. and an unillustrated portable electronic device.

As shown in FIGS. 1 and 2, the manual controller 16 has more than 10 command keys for entering commands from the user, and transmits statuses of the command keys about 60 times per second to the communication controller 291 by way of synchronous communication according to an instruction from the communication controller 291. The communication controller 291 transmits the statuses of the command keys to the CPU 251.

In this manner, commands from the user are applied to the CPU 251, which carries out a process according to the commands based on the game program being executed.

A large amount of image data needs to be transferred at high speed between the main memory 253, the GPU 262, the image decoder 264, and the decoder 282 for reading a program, displaying an image, or generating and storing image data.

In the entertainment apparatus 12, data is transferred directly between the main memory 253, the GPU 262, the image decoder 264, and the decoder 282 according to the DMA data transfer under the control of the peripheral device controller 252, rather than the CPU 251. Therefore, the burden on the CPU 251 can be reduced for data transfer, and high-speed data transfer can be achieved between the main memory 253, the GPU 262, the image decoder 264, and the decoder 282.

When setting data of a game being executed need to be stored, the CPU 251 transmits the setting data to the communication controller 291, which writes the transmitted setting data into the memory card 14 or the unillustrated portable electronic device which is inserted in the slot 30B, 32B.

The memory card 14 is provided with a main body interface for connection to the entertainment apparatus 12, and a memory interface for outputting data to and inputting data from a nonvolatile memory incorporated therein.

The communication controller 291 (see FIG. 3) has a built-in protection circuit for protection against electric breakdown. The memory card 10 and the portable terminal 100 are separate from the bus BUS, and can be connected and disconnected while the entertainment apparatus 12 is being energized. Therefore, when the memory card 14 suffers a storage capacity shortage, a new memory card can be connected without having to turn off the entertainment apparatus 12. Consequently, any game data that need to be backed up can be stored in a new memory card 14 connected to the entertainment apparatus 12, without the danger of being lost.

As shown in FIG. 3, the entertainment apparatus 12 further includes a parallel I/O interface (PIO) 296 and a serial I/O interface (SIO) 297 which serve to connect external extended devices to the entertainment apparatus 12. For example, the parallel I/O interface 296 can be connected to a compact disk player or a DAT (digital audio tape recorder) for playing back music data. The operations (power ON/OFF, music reproduction, stop, skip, and music selection) of the compact disk player and DAT can be controlled by the CPU 251. The serial I/O interface 297 can be connected to a personal digital assistant such as the unillustrated portable electronic device.

The entertainment apparatus 12 is capable of executing a program stored in the optical disk 20 by means of the optical disk drive 281, while reading digital audio signals from a music player 298 via the PIO 296 simultaneously.

Figure 4:
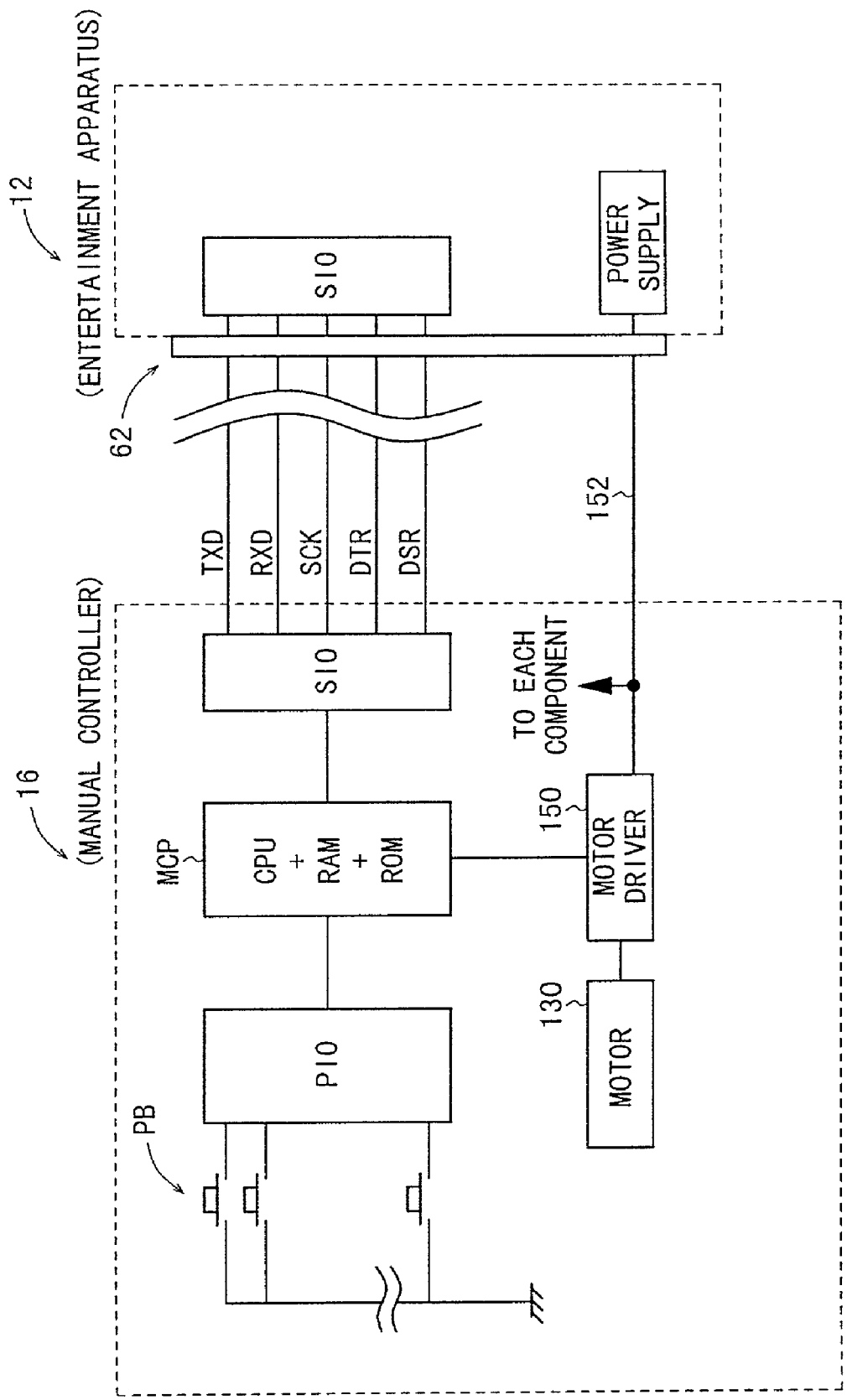
FIG. 4 is a block diagram showing a circuit configuration of the manual controller.

As shown in FIG. 4, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a motor driver 150 for energizing the motors 130 of the vibration imparting mechanisms. Each of the motors 130 is energized for rotation by a voltage and a current supplied from the motor driver 150.

As described above, the manual controller 16 has more than 10 control buttons PB such as the up button 110a, the right button 110b, the left button 110c, the down button 110d, the Δ button 112a, the ○ button 112b, the X button 112c, the □ button 112d, the L1 button 114a, the L2 button 114b, the R1 button 116a, the R2 button 116b.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12.

Other structural details of the entertainment apparatus 12 are omitted from illustration in FIG. 4.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 4, this cable further includes a power line 152 extending from a power supply in the entertainment apparatus 12 and connected to the motor drivers 150 in the manual controller 16 for supplying electric energy to energize the motors 130 and other components of the manual controller 16.

A process of bidirectional serial communication between the manual controller 16 and the entertainment apparatus 12 will be described below. In order for the entertainment apparatus 12 to communicate with the manual controller 16 to read control data of the control buttons (button information) of the first and second control pads 34, 36 and the L button 38L and the R button 38R, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data produced by a control button via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data of control buttons PB to the entertainment apparatus 12, and the entertainment apparatus 12 can send a vibration generating command for energizing the motors 130 of the vibration imparting mechanisms 128 via the data transfer signal line TXD to the manual controller 16.

The vibration generating command for energizing the motors 130 is established in advance in a CD-ROM set in the entertainment apparatus 12.

Figure 5:
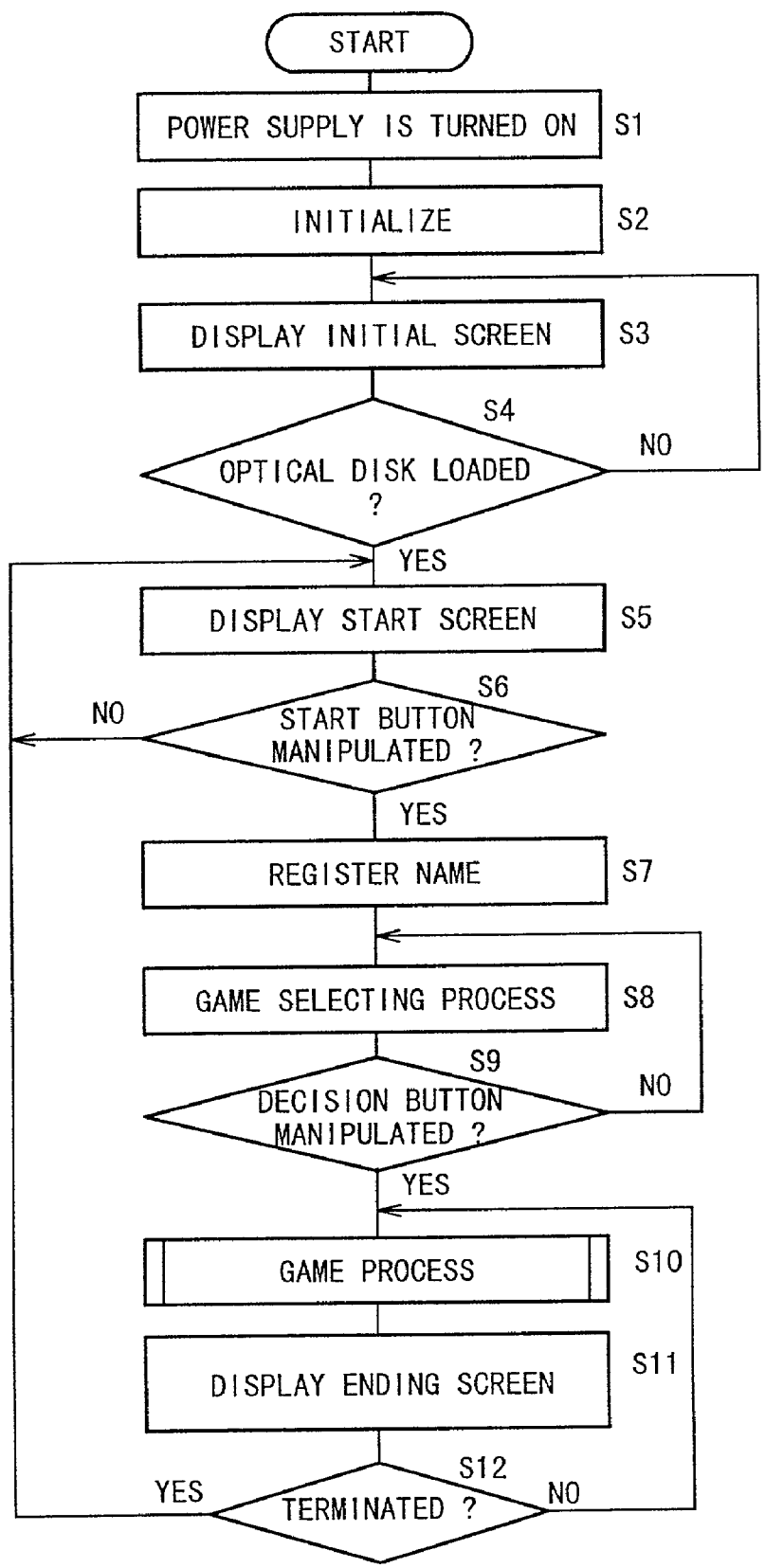
FIG. 5 is a flow chart for explaining the operation of the entertainment system as a whole.

A description will be made with reference to the flow chart shown in FIG. 5 on functions and operations characteristic of the entertainment system 10 of the present embodiment.

First, the monitor 18, memory card 14 and manual controller 16 are connected to the entertainment apparatus 12. Further, the optical disk 20 is loaded in the disk loading unit 22. The optical disk 20 is a recording medium such as a CD-ROM in which various functions are recorded as programs and data.

In this state, when the power supply switch 28 is pressed at step S1, power is supplied to the entertainment apparatus 12 from an AC power source (not shown).

When power is supplied, the CPU 251 starts operating on the operating system stored in the ROM 254 at step S2 to perform initialization such as writing of required programs and data (including initial screen data and initial music data) read from the ROM 254 in the main memory 253.

At step S3, the initial screen data is drawn in the frame buffer 263 through the image decoder 264 and the GPU 262 under the control of the peripheral device controller 252, and the drawn initial screen data is supplied through the GPU 262 to the display 18A of the monitor 18 as video output to display an initial screen on the display 18A. At this time, the initial music data stored in the ROM 254 is supplied to the sound buffer 272 through the SPU 271, and the stored initial screen data is supplied through the SPU 271 to the speaker 18B of the monitor 18 as audio output to generate music (pieces of music) from the speaker 18B in synchronism with the initial screen.

Next, at step S4, the state of the decoder 282 is checked by, for example, the CPU 251 to confirm the presence of the optical disk 20 in the disk loading unit 22 by checking whether writing of programs and data read from the optical disk drive 281 in the buffer 283 through the decoder 282 has occurred as a result of automatic activation caused by loading of the optical disk 20 which is a CD-ROM.

Actually, while the optical disk 20 is not being loaded in the disk loading unit 22, the display of the initial screen at step S3 continues. When the optical disk 20 is loaded into the disk loading unit 22, the process proceeds to the next step S5.

At the process of step S5, the programs and data read from the optical disk 20 are directly stored in the memory 253 through the decoder 282 under the control of the auxiliary CPU 284 or stored in the main memory 253 through the buffer 283.

In the following description, images are processed by CPU 251 or GPU 262.

Figure 6:
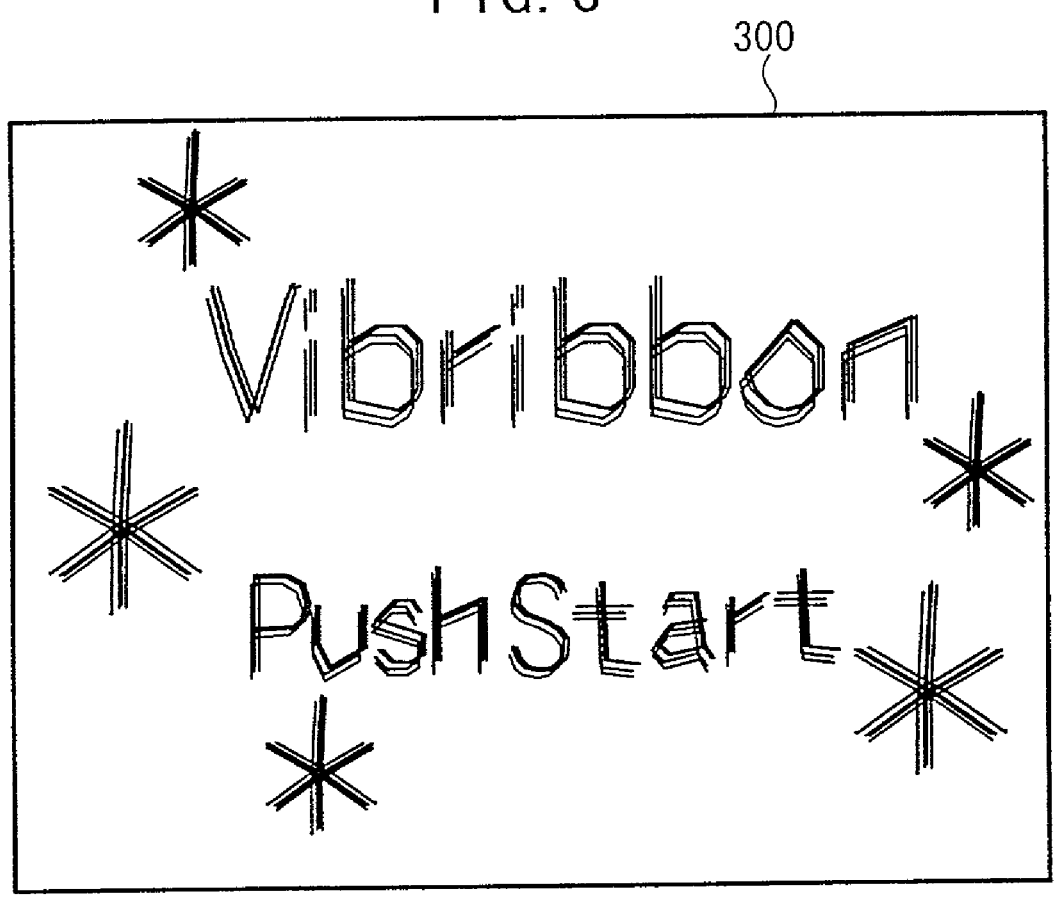
FIG. 6 is an illustration of a game starting screen.

FIG. 6 shows a start screen 300 displayed on the display 18A at the process of step S5.

In the start screen 300, vibrating images of an alphabetical expression "Vibribbon", English words "Push Start", and several asterisks or the like are displayed. Each of these images is a three-dimensional line drawing image having a predetermined length or a three-dimensional image which is separated into parts having predetermined lengths. In this state, for example, the expression "Vibribbon" rotates along a circumferential wall of a virtual transparent column about the axis thereof in the lateral direction of the screen at a predetermined time interval such that the expression "Vibribbon" integrally moves to the further side of the screen and then returns to the front side of the screen.

A detailed description will be made later on a process of generating a three-dimensional vibrating line drawing image having a predetermined length or a three-dimensional vibrating line drawing image which is separated into parts having predetermined lengths, the process being a fundamental feature of the display process according to the invention (the process is also referred to as "a three-dimensional line drawing image irregular display process").

When it is determined at step S6 that the start button 40 of the manual controller 16 has been pressed with the start screen 300 displayed as shown in FIG. 6, a process of registering the name of the user (game player) is performed at step S7.

Figure 7:
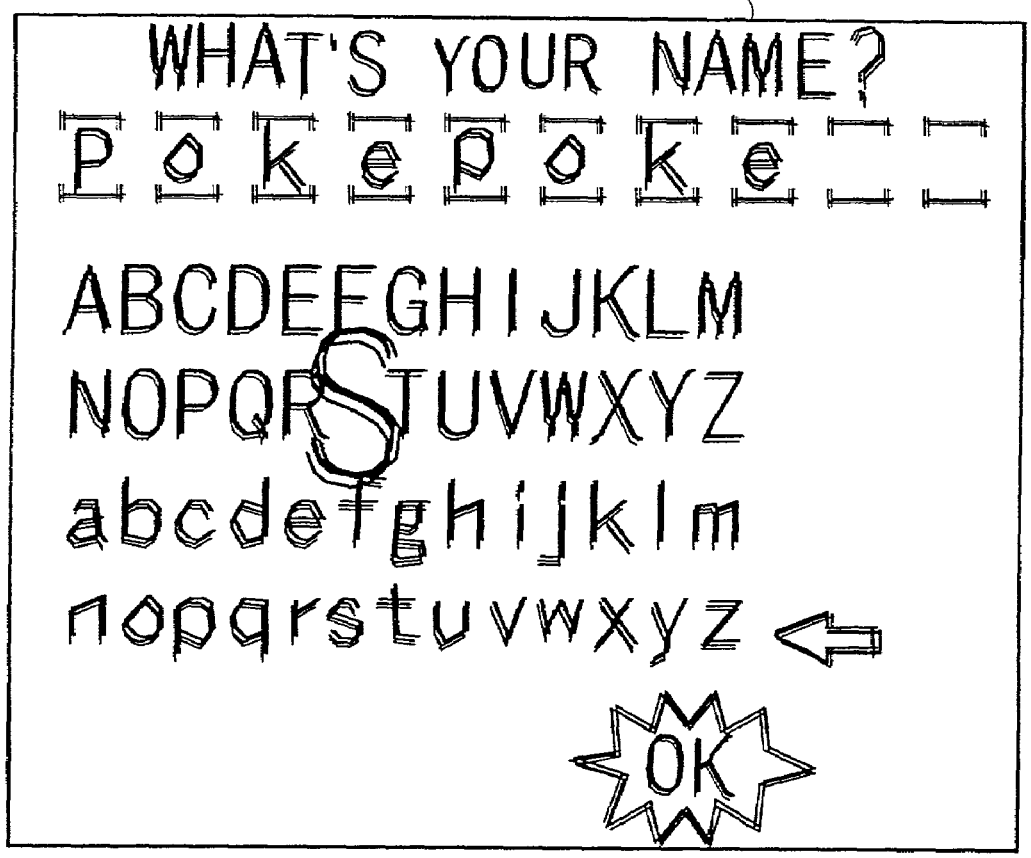
FIG. 7 is an illustration of a name registration screen.

At the step S7, a name registration process screen 302 as shown in FIG. 7 is displayed on the display 18A. On the name registration process screen 302, a presently selected region (see the alphabet "S" in FIG. 7) is enlarged, and each character or symbol is displayed using irregular display of three-dimensional line drawing images. The name of the user, e.g., "POKEPOKE" is then alphabetically input by manipulating the control buttons PB of the manual controller 16. The control buttons PB are manipulated to move a cursor to the position of "OK" as shown on a screen 304 in FIG. 8 (the cursor is displayed in a position which is enlarged and displayed using irregular display of three-dimensional line drawing images), and the "○" button 112*b* is pressed to store (register) the input name in the main memory 253.

Figure 9:
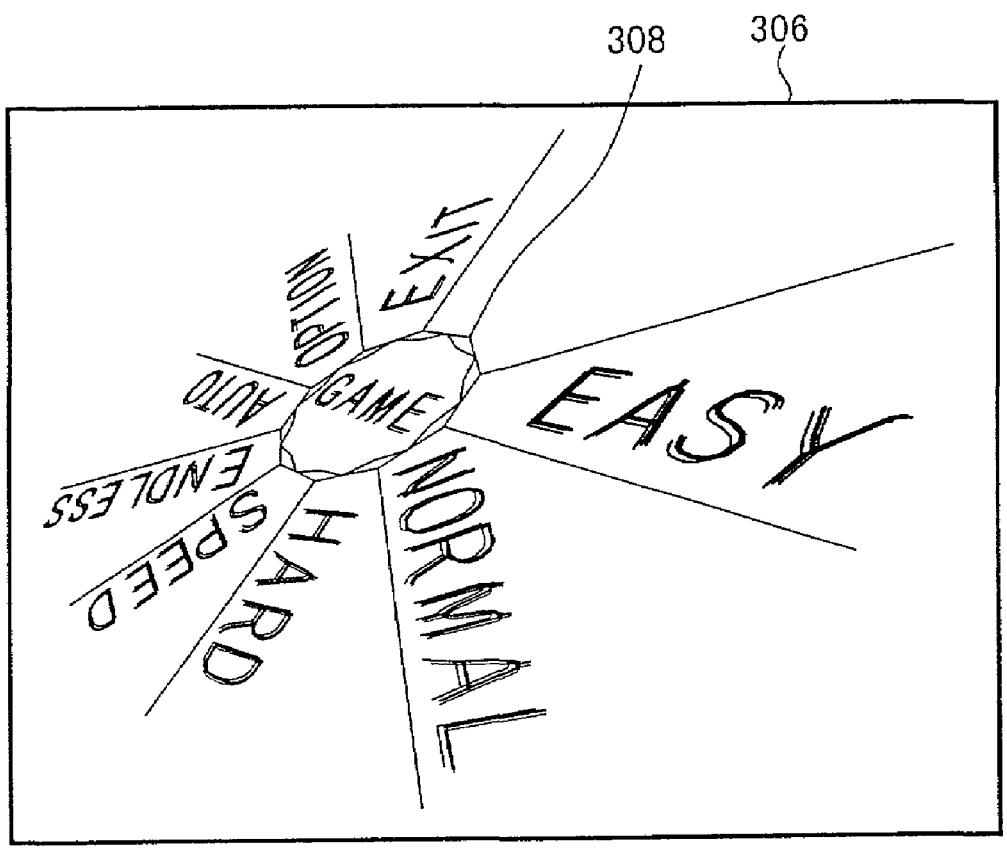
FIG. 9 is an illustration of a game selection screen.

At step S8, as shown in FIG. 9, a game selection screen 306 for a game selecting process is displayed on the display 18A. On this screen, a three-dimensional line drawing image is displayed. The three-dimensional line image comprises a decagonal object 308 and names of the selectable types of games or the like positioned on straight lines extending outwardly from vertices of the decagonal object 308. In this "vibribbon game" ("vibribbon" means a vibrating ribbon), three types (levels) of games at different difficulties such as "easy", "normal" and "hard" are available, for example. The type of the presently selected game is "easy". In the vibribbon game, a game character is controlled according to music stored in advance in the optical disk 20. Specifically, two pieces of music are selectably recorded in the optical disk 20 for each of the three types of games.

Further, when an "endless" mode is selected on the game selection screen 306 in FIG. 9, a music CD may be used for such music. In this case, an indication is shown on the display 18A to notify the user of a need for a music CD. When the user loads a music CD into the disk loading unit 22 instead of a CD-ROM in which programs are stored, pieces of music recorded on the music CD are shuffled to randomly select a piece of music for allowing the user to enjoy the vibribbon game endlessly. The vibribbon game will be described later in detail.

Obviously, if a music CD is loaded in the music player 298 in advance, the vibribbon game can be executed when the "endless mode" is selected without removing the optical disk 20 in which the program and data of the vibribbon game are recorded from the disk loading unit 22. In this case, the real-time characteristics of the game is further improved. Specifically, when a music CD is loaded in the music player 298 in advance, pieces of music recorded on the music CD are shuffled at a point (step) instructed by the program to randomly select a piece of music and the selected piece of music is read and stored into the entertainment apparatus 12 through the music player 298 substantially in real time.

Figure 10:
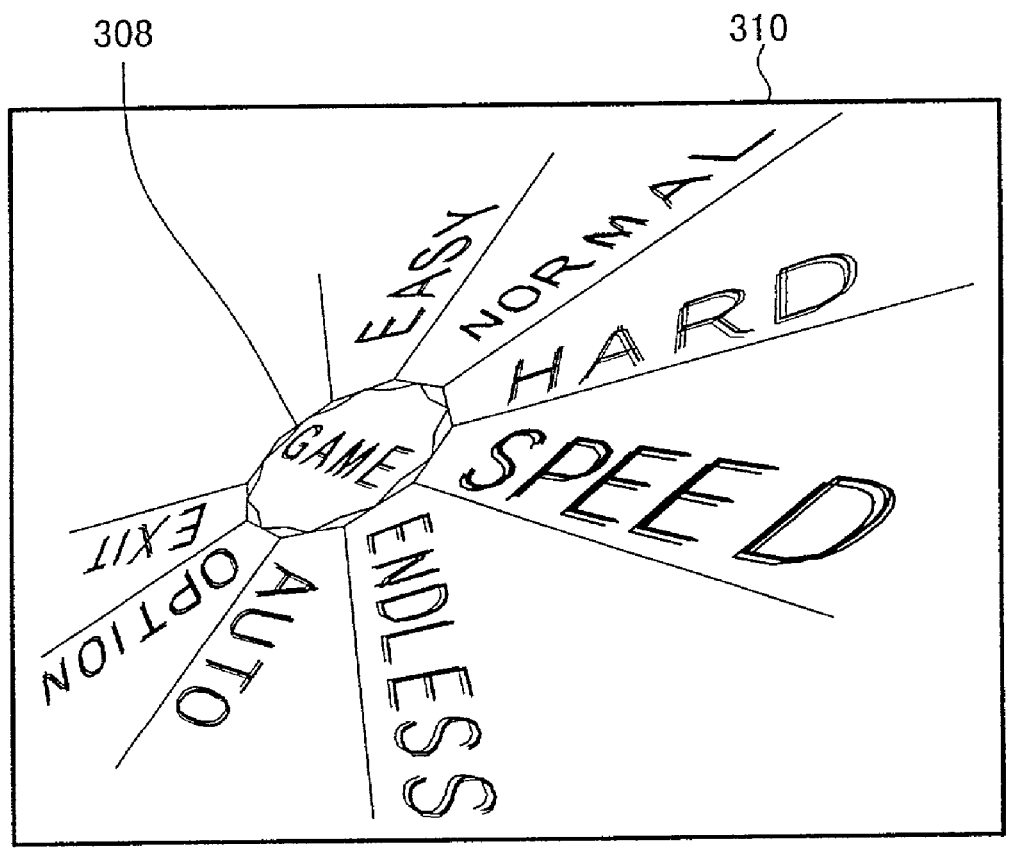
FIG. 10 is an illustration of the game selection screen.

Each time either the up button 110*a* or down button 110*d* is pressed when the game selection screen 306 is displayed, the decagonal object 308 and names of selectable game modes or the like are rotated as shown on a game selection screen 310 in FIG. 10 to allow selection of other desired games. In FIG. 9, a "Speed" mode in which music is played at a fast tempo is highlighted. In this state, the user can select the "Speed" mode by pressing the decision button 112*b*.

Figure 8:
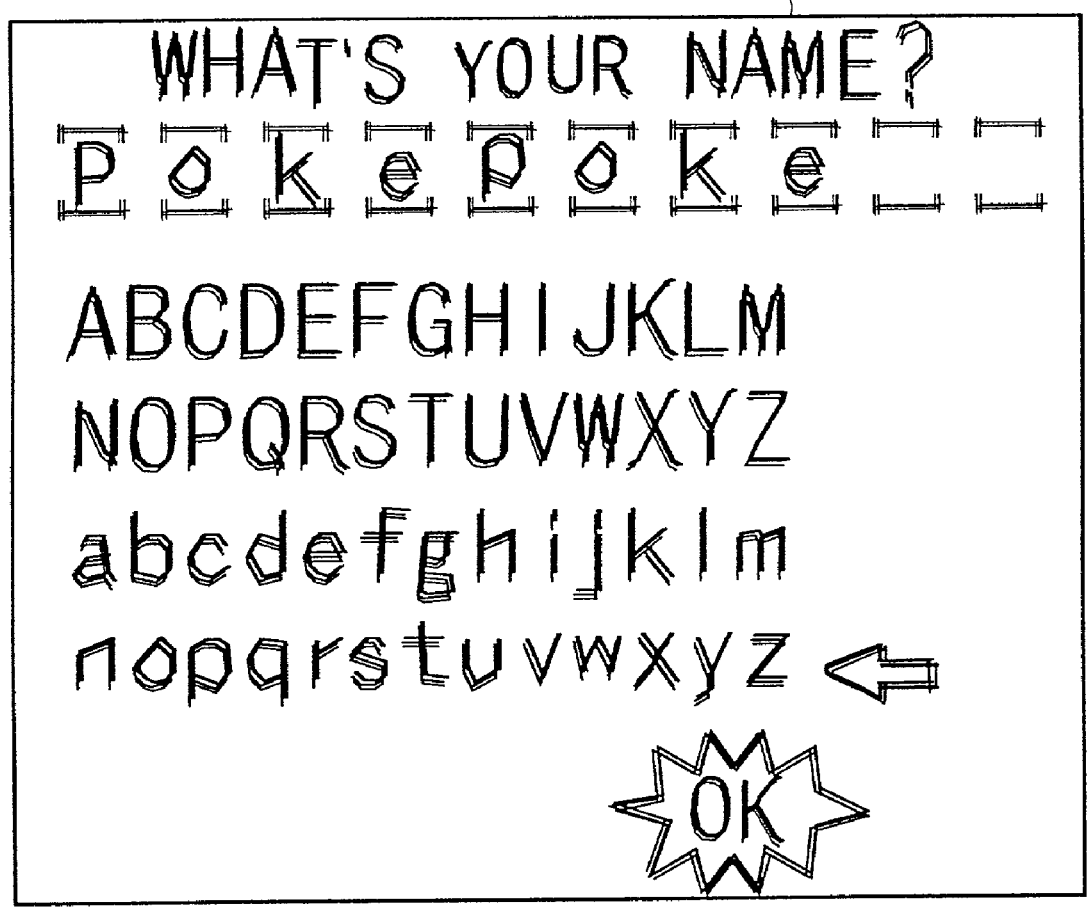
FIG. 8 is an illustration of the name registration screen.

When an "Exit" mode is selected on the game selection screen 306 in FIG. 8 or 9, the process returns to the vibribbon game start screen 300 shown in FIG. 6.

The present embodiment is on an assumption that the ○ button 112*b* as a decision button is pressed at step S9 in the state of the game selection screen 306 (see FIG. 9). When the decision is made, the vibribbon game in the "easy" mode is started, and a game process at step S10 is performed.

Figure 11:
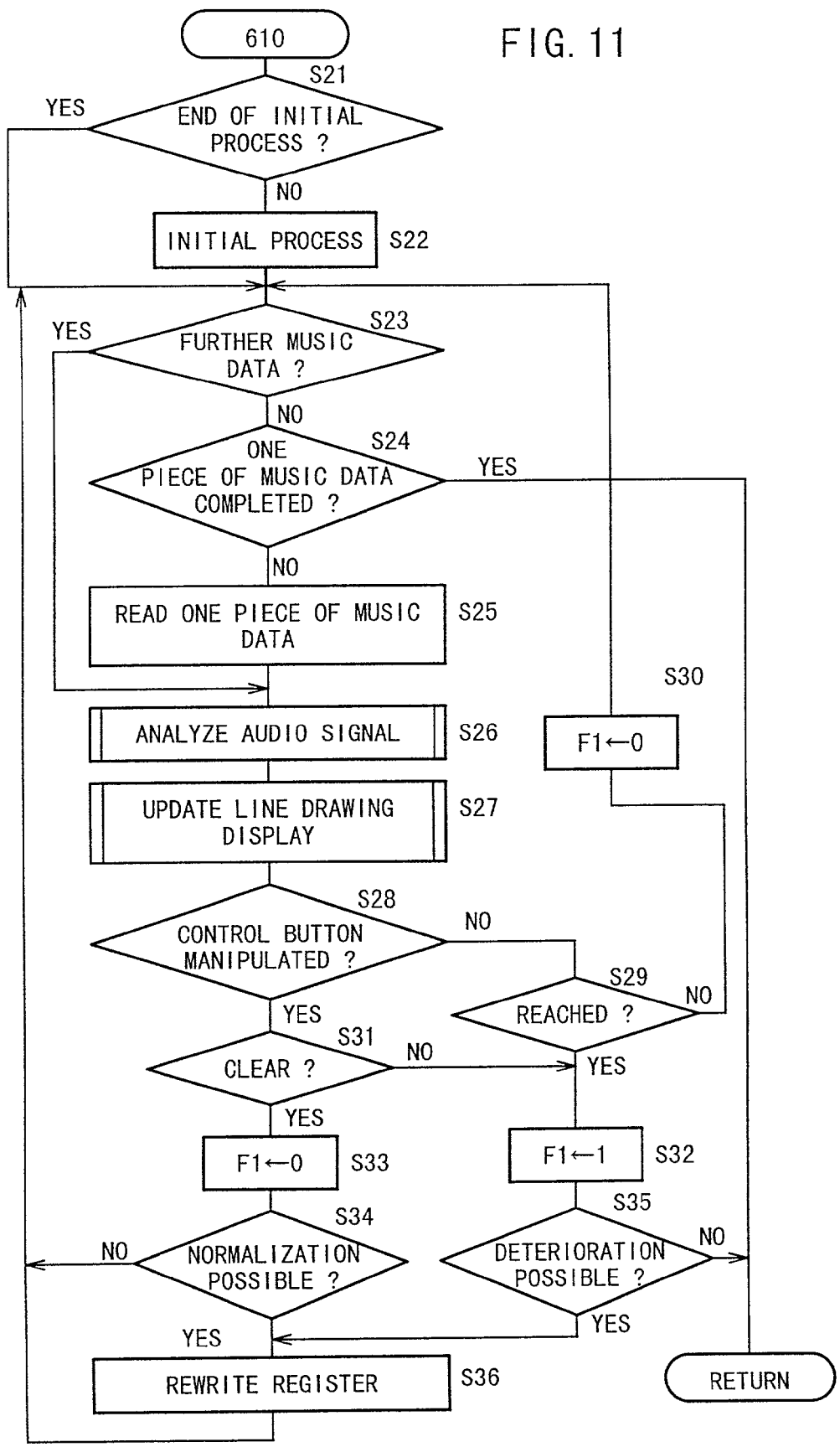
FIG. 11 is a flow chart showing details of game processing.

A detailed flow of the game process at step S10 is shown in FIG. 11.

First, it is checked at step S21 whether an initial process of a game process as described at the next step S22 has been carried out or not.

Figure 14:
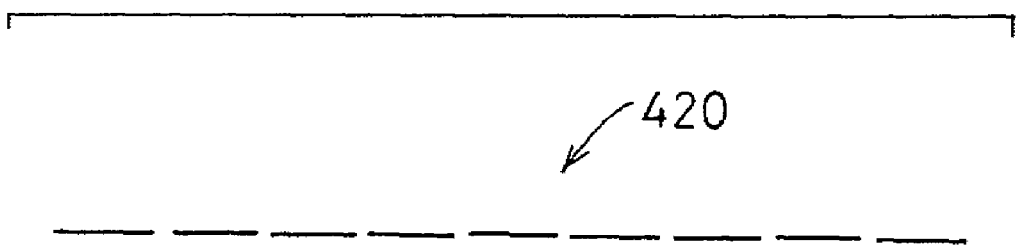
FIG. 14 is an illustration of a virtual road object.

In the initial process of the game process at step S22, three types of character objects 401, 402 and 403 shown in FIG. 12, four types of obstacle objects 411, 412, 413 and 414 shown in FIG. 13 and a movement path (also referred to as "virtual road") object 420 shown in FIG. 14 stored in the optical disk 20 are read and stored in the main memory 253 using a world coordinate system.

The character objects 401, 402 and 403 are modified representations of animals such as a rabbit, a frog and a snake. The obstacle objects 411, 412, 413 and 414 are modifications of a quadrangle (a square or boxy shape), a circle, a V-shape (an inverted triangle) and a zigzag (a symbol for a resistor), respectively. Further, the virtual road object 420 is a virtual road (a three-dimensional line drawing image) on which the character objects 401, 402 and 403 move. The obstacle objects 411, 412, 413 and 414 generated in accordance with results of sound analysis (audio analysis) as described later are inserted in the virtual road object 420.

In this case, each of the character objects 401, 402 and 403, the obstacle objects 411, 412, 413 and 414, and the virtual road object 420 is basically constituted by basic objects 415 as convex shape models (convex polyhedral models) in the form of an elongate rectangular parallelepiped as shown in FIG. 15. FIG. 15 schematically shows a configuration of the obstacle object 411 as an example. Magnification, reduction, coordinate transform (including movement) and the like on the basic object 415 can be performed by the GTE 261.

As shown in FIG. 15, the polygons that constitute the character objects 401, 402 and 403, the obstacle objects 411, 412, 413 and 414 and the virtual road object 420 are separated into polygonal components in the form of, for example, a quadrangle (or a triangle) that constitute the basic objects 415. Those polygons are defined by the three-dimensional coordinates of the vertices thereof and colors of those vertices and are stored in a predetermined area of the main memory 253 (an area for storing the character objects 401, 402 and 403, the obstacle objects 411, 412, 413 and 414 and the virtual road object 420).

In the present embodiment, the color is stored as white (for example, the tone values of R (red), G (green) and B (blue) are stored as R (red)=G (green)=B (blue)=255 when the brightness levels are represented by eight bits). Obviously, a different color may be used.

Figure 16:
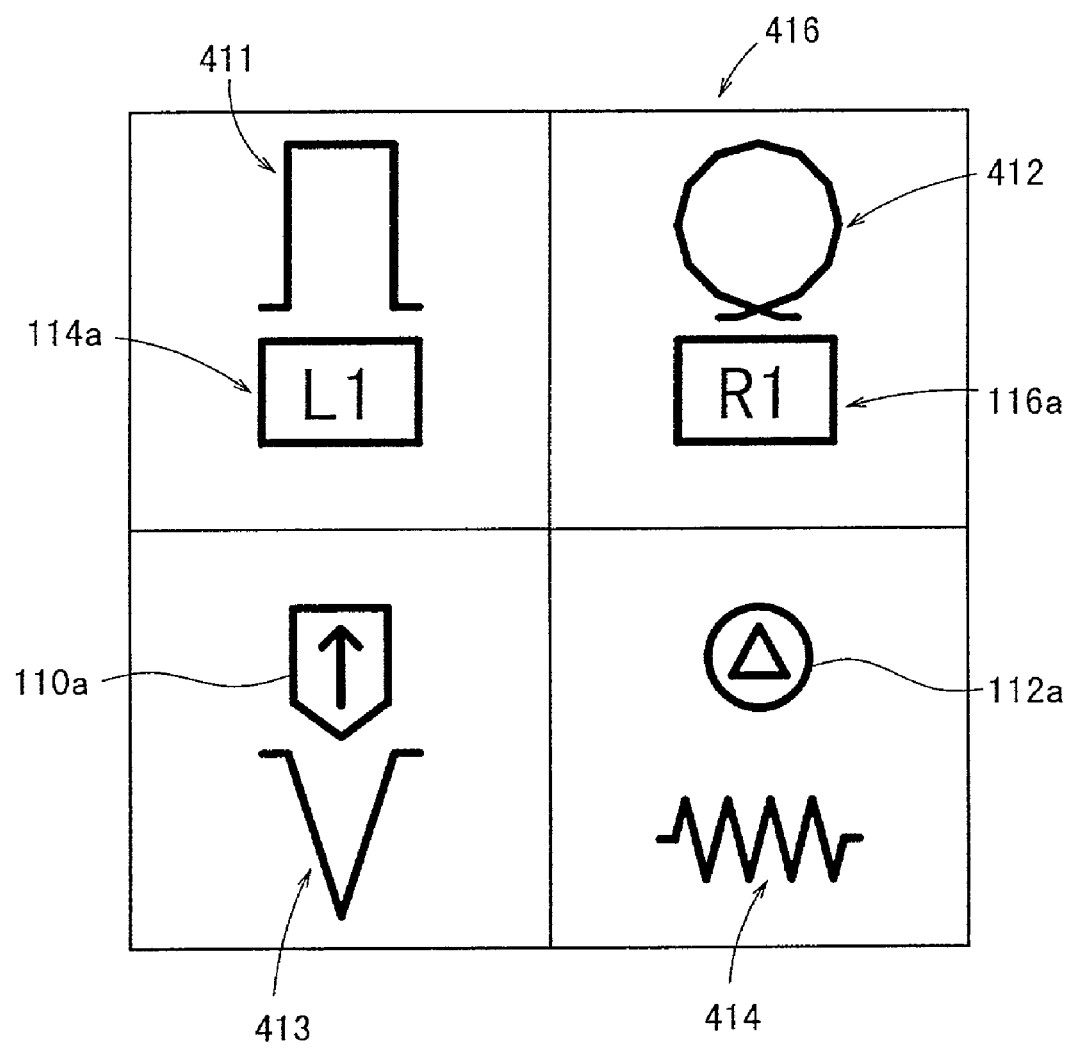
FIG. 16 is an illustration of a table showing correspondence between control buttons and obstacle objects.

Further, in the initial process at step S22, a table 416 of correspondence between control buttons PB and the obstacle objects 411, 412, 413 and 414 (a control buttons/obstacle objects correspondence table) for executing the vibribbon game schematically shown in FIG. 16 is read from the optical disk 20 and stored in a predetermined area of the main memory 253 (a control buttons/obstacle objects correspondence table storing area).

As shown in FIG. 16, on the correspondence table 416, the L1 button 114*a*, R1 button 116*a*, up button 110*a* and Δ button 112*a* are assigned to the obstacle objects 411, 412, 413 and 414, respectively.

Furthermore, in the initial process at step S22, flags as described later (an NG flag F1 and etc.), a register (character object status register) 456 and the like are set in an initial state (which will be also described later).

After the above-described initial process at step S22 is completed, it is checked whether there is any further music data in the buffer 283 or not in a process at step S23. If there is no further music data in the buffer 283, it is checked whether a game for one piece of music data has been completed or not at step S24. If the game for one piece of music data has not been completed, for example, music data for one piece of music in the "easy mode" is read from the optical disk 20 and the read music data is stored in the main memory 253 at step S25. Alternatively, the data may be stored in the buffer 283.

In the above-described endless mode, for example, in the process at step S25, music data for one piece of music is read from a CD or the like loaded in the music player 298 and the read music data is stored in the main memory 253.

Next, an audio signal analyzing process at step S26 and a line drawing display updating process at step S27 are performed in parallel to display a game image on the screen of the display 18A.

Figure 17:
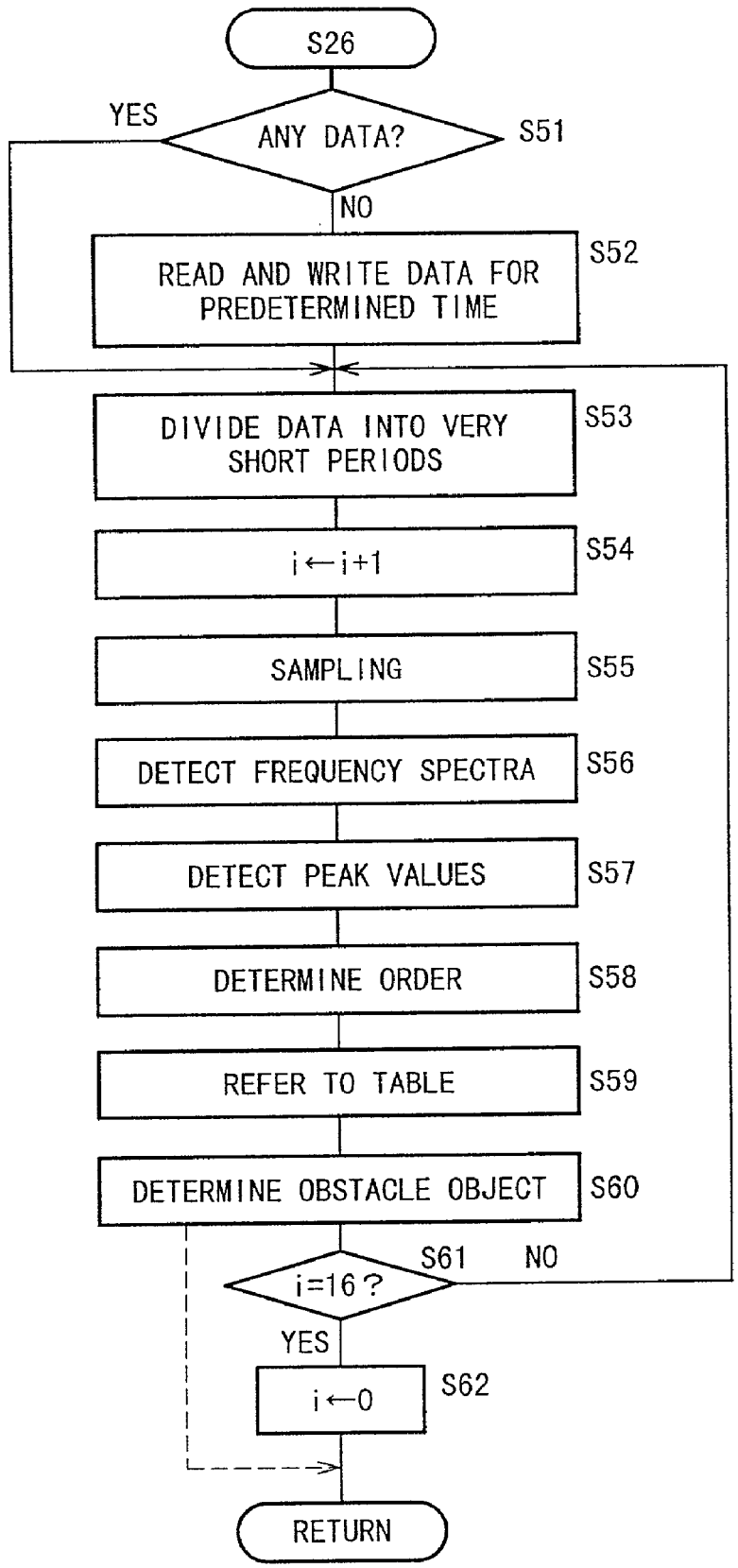
FIG. 17 is a flow chart for explaining an audio signal analyzing process.

FIG. 17 shows a flow chart of the audio signal analyzing process (audio signal analyzing means) at step S26.

In a process at step S51, it is determined whether the music data for a predetermined time of reproduction have been read or not by determining whether the music data is stored in the buffer 283.

If the music data is not stored in the buffer 283, at step S52, the music data for one piece of music is read for the predetermined time from the beginning thereof and is written in the buffer 283. In the present embodiment, the predetermined time is eight seconds (exactly, eight seconds plus marginal time) that is time required for a relative movement of the virtual road object 420 for a distance of one screen from the upper right side to the lower left side of the screen.

A description will now be made on a process of analyzing an audio signal to determine the occurrence of an obstacle object. The music data for eight seconds stored in the buffer 283 (an area for storing music data for the predetermined time) is divided into a predetermined number of parts each of which lasts for a very short period of time (16 parts each of which lasts 0.5 sec. in the present embodiment).

In this case, in order to divide an audio signal (also referred to as "music data") into very small periods of time each of which is 0.5 sec. in the present embodiment, music data for 0.5 sec. is read from the buffer 283 at step S53.

At step S54, a register i is incremented by one (i←i+1) as a counting parameter for the reading operation.

The music data for the very short period is sampled at a certain sampling frequency at step S55, and a frequency spectrum is extracted at step S56. That is, a fast Fourier transform process is performed. The sampling may be followed by a band-pass filtering process in an audio frequency band to eliminate noises.

In a process at step S57, three (this number of peak values may be appropriately changed) peak values (peak values representing the loudness of sounds) are detected in each of a frequency range equal to or higher than a predetermined frequency fc (this frequency may be varied at random) and a frequency range lower than the same in the extracted frequency spectrum. At step S58, the detected peak values in the frequency spectrum are arranged in the order of magnitude in each of the frequency range lower than the predetermined frequency fc and the frequency range equal to or higher than the predetermined frequency fc to determine respective orders of arrangement of the three peak values up to the third peak.

For example, assuming that f11, f12 and f13 represent the three peak frequencies lower than the predetermined frequency fc in an ascending order and that f4, f5 and f6 represent the three peak frequencies equal to or higher than the predetermined frequency fc in an ascending order. Then, since there are six combinations of peak frequencies in each of the frequency region equal to or higher than fc and the frequency region lower than fc, there are 36 possible orders P of arrangement of peak frequencies in total.

At step S59, reference is made to a table 428 of correspondence between the peak frequency arranging orders P and the obstacle objects 411, 412, 413 and 414 (a table of correspondence between results of audio signal analysis and obstacle objects to be generated). At step S60, it is decided which of the obstacle objects 411, 412, 413 and 414 is to be generated based on the present frequency analysis.

Figure 18:
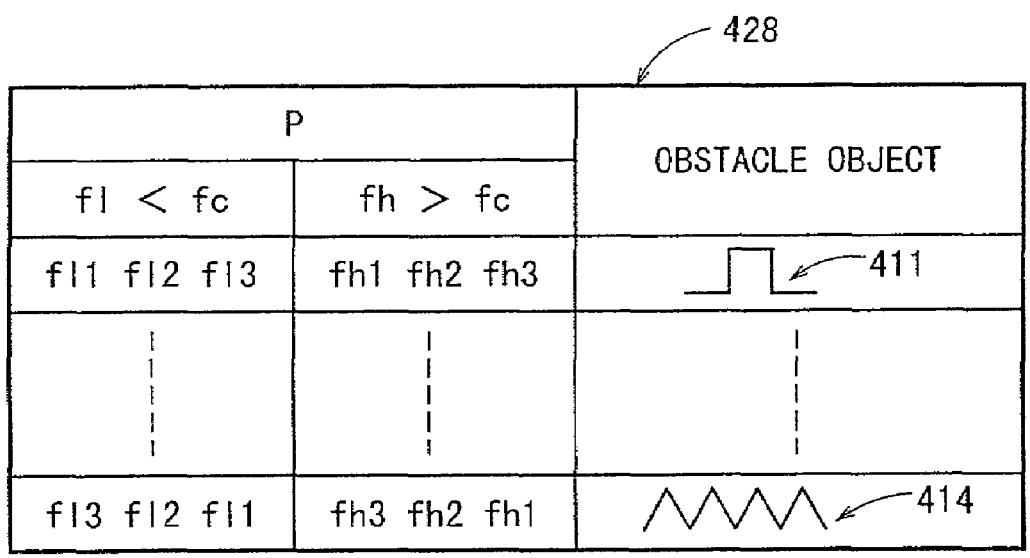
FIG. 18 shows a table of correspondence between results of audio signal analysis and obstacle objects to be generated.

As shown in FIG. 18, for example, it is decided to generate the obstacle object 411 when the peak frequency arranging order P=[fl1, fl2, fl3, fh1, fh2, fh3], and it is decided to generate the obstacle object 414 when P=[fl3, fl2, fl1, fh3, fh2, fh1].

The order of generation of a plurality of obstacle objects may be decided based on a result of one frequency analysis.

Figure 19:
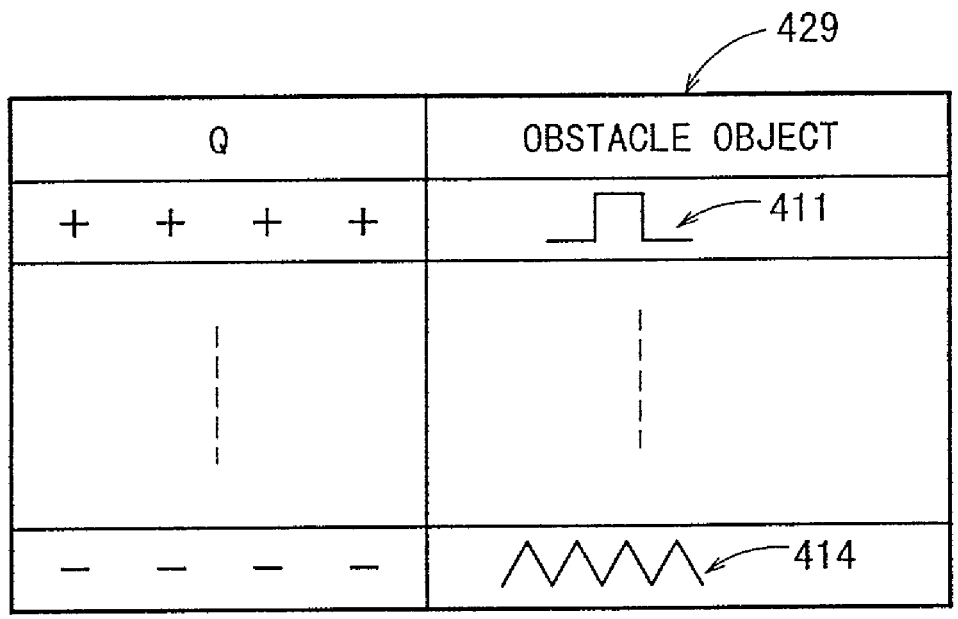
FIG. 19 shows a table of correspondence between results of audio signal analysis and obstacle objects to be generated.

The audio signal analyzing process at steps S53 through S60 is merely an example of an audio signal analyzing process performed using the frequency axis. Alternatively, the audio signal analyzing process can be performed by using the time axis. Specifically, music data may be divided into parts each having a predetermined period of time, e.g., 0.5 sec. Then, peak values of amplitudes of sounds in a divided period of time on the time axis may be extracted in a descending order. Then, gradients Q between adjoining peaks of amplitudes on the time axis may be calculated, and a correspondence table 429 may be provided as permutational combinations of the gradients Q, as shown in FIG. 19. For example, it is decided to select the obstacle object 411 when a combination of gradients Q between peaks consists of four consecutive positive gradients.

In the audio signal analyzing process, the order of appearance of the obstacle objects 411, 412, 413 and 414 may be determined in advance based on data in a table of contents of a CD (the number of pieces of music, playing times thereof, logical addresses of the pieces of music, etc.) instead of the audio signal itself, for example, in the endless mode.

A line drawing display updating process at step S27 (see FIG. 11) is then performed, and processes at steps S61 and S62 are performed in parallel with the line drawing display updating process. The process at step S61 repeats the processes from steps S53 to S60 until the value in the register i associated with the counter parameter set at step S54 becomes an i-value=16 (a value corresponding to eight sec. period described above). When i=16, the value in the register i associated with the counter parameter is set at an i-value=0 at step S62. At this time, all of the music data for eight sec. in the buffer 283 (the area for storing music data for a predetermined time) is read, and the process proceeds to step S27 (see FIG. 11).

Figure 20:
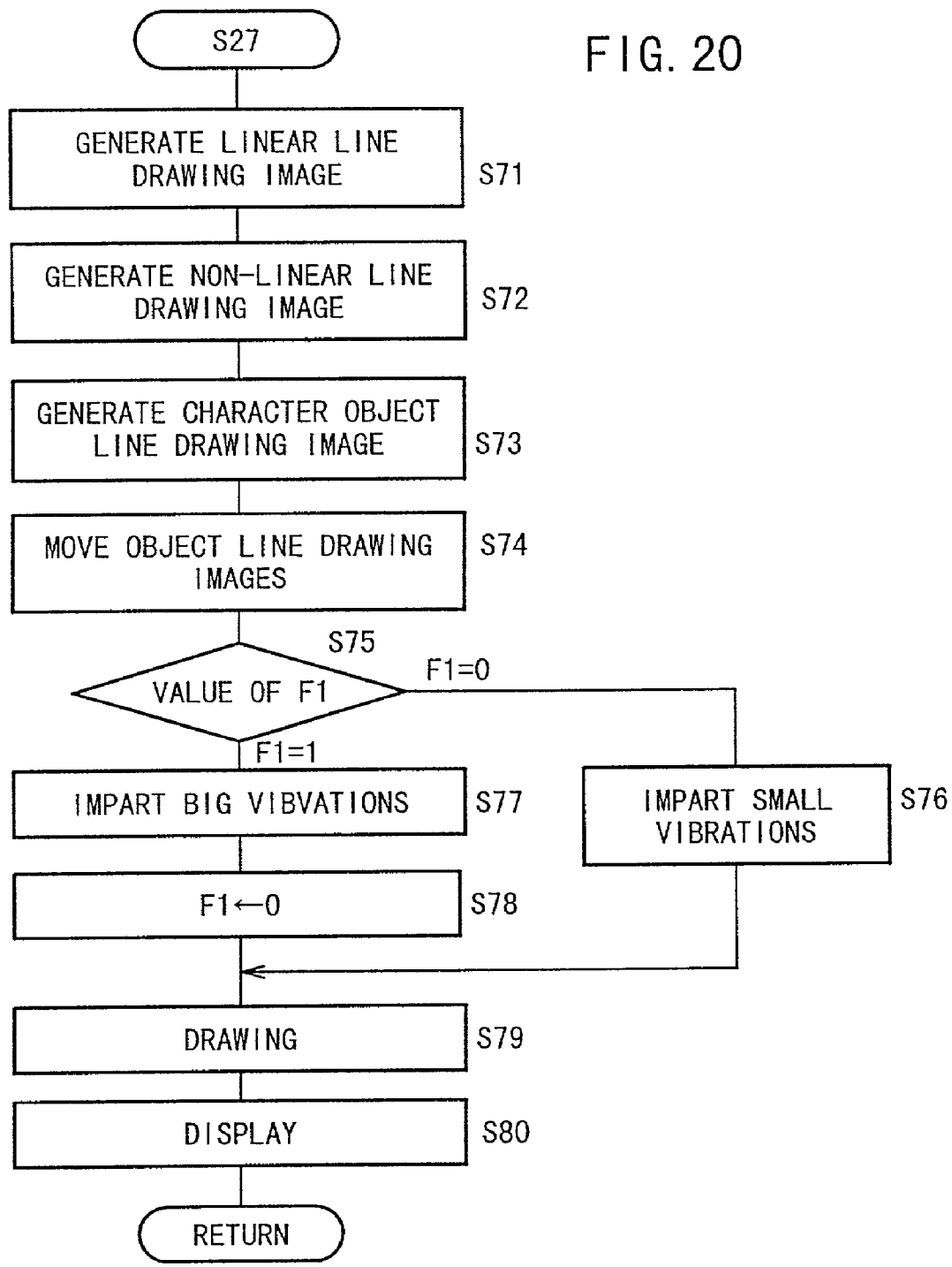
FIG. 20 is a flow chart for explaining a line drawing display updating process.

FIG. 20 is a flow chart of the process of updating line drawing display (including the initial display) at step S27.

At step S71, a single line drawing image in the form of a substantially straight line (which is split straight lines actually) extending from the lower left end to the upper right end of the screen of the display 18A of the display monitor 18 is generated by the GTE 261 from the virtual road object 420 (see FIG. 14). The GPU 262 draws the image in either of drawing regions 265 (i.e., two drawing regions 265A and 265B), e.g., the drawing region 265A in the schematic diagram of the frame buffer 263 shown in FIG. 21. The frame buffer 263 has a size of 1024 pixels and 512 pixels, for example, in x- and y-directions respectively and functions as a two-buffer having drawing regions 265A and 265B each of which is formed by 256 pixels×240 pixels, for example.

At step S72, as will be described later with reference to a drawing, line drawing images of the obstacle objects 411, 412, 413 and 414 which are non-linear line drawing images determined based on a result of analysis of an audio signal at step S58 are similarly drawn in the drawing region 265A of the frame buffer 263 such that they are inserted in the single substantially linear line drawing image in locations deep in the screen on right side thereof in the order in which they are analyzed. Thus, a linear line drawing image and non-linear line drawing images are synthesized.

Further, at step S73, a line drawing image of the predetermined character object 401 (see FIG. 12) is similarly drawn in the drawing region 265A of the frame buffer 263 such that it is drawn on the single substantially linear line drawing image having the non-linear line drawing images in the vicinity of the left end of the screen to be synthesized with the same. The selection of any of the character objects 401, 402, 403, etc. is carried out in accordance with the contents of a character object status register 456 which will be described later with reference to FIG. 32. When the game is started, in the above-described initializing process at step S22, data associated with the character object 401 is set as the contents (data) of the character object status register 456.

In the processes at steps S71, S72 and S73, drawing is performed by rendering processes on basic objects 415 in the form of an elongate rectangular parallelepiped (see FIG. 15) that respectively constitute the virtual road object 420 comprising the substantially linear line drawing image, the obstacle objects 411, 412, 413 and 414 comprising non-linear line drawing images and the character object 401 comprising a non-linear line drawing image. The rendering processes include a coordinate transform from the world coordinate system to a camera coordinate system, a perspective transform to transform the coordinate system further into a screen coordinate system, processes on hidden surfaces and coloring processes on the polygons (a scaling process is also performed appropriately).

FIG. 22 schematically shows a process performed on the virtual road object 420 constituted by a basic object 415 before it is disposed in a camera coordinate system xyz and in a screen coordinate system xy (an x-y plane). Thus, in the example shown in FIG. 22, a single three-dimensional line drawing image in the form of a straight line is displayed such that it extends from the lower left end on the front side of the screen (x-y plane) of the display 18A to the upper right end on the further side of the screen.

For easier understanding, a description will be made on a three-dimensional image which is displayed on the display 18A based on drawing data read from the drawing region 265B in which drawing has been performed in advance, of the drawing regions 265A and 265B.

Figure 23:
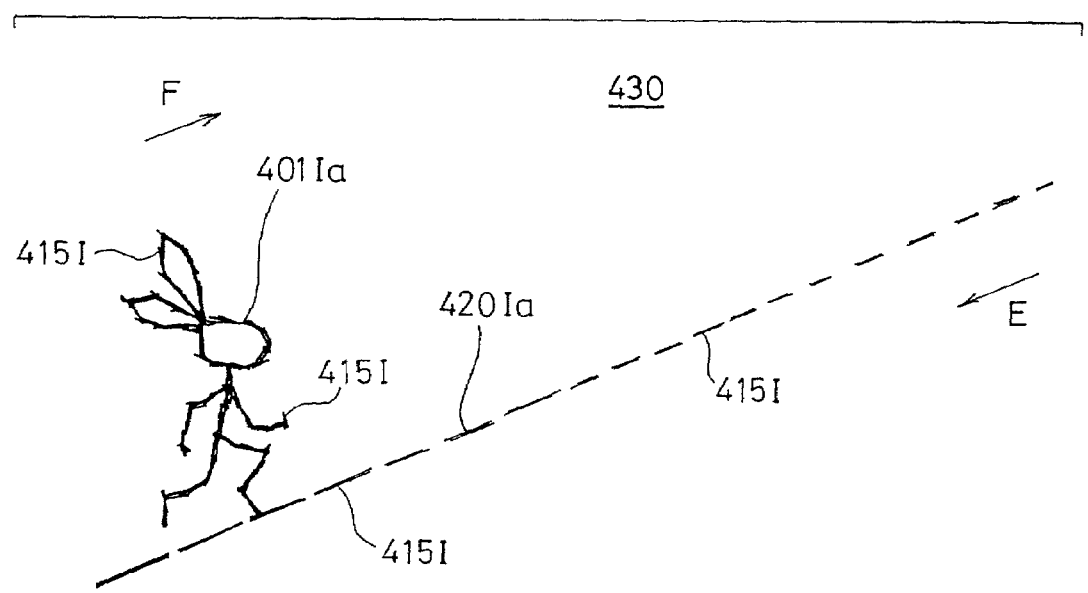
FIG. 23 is an illustration of a screen that appears immediately after the beginning of a game.

FIG. 23 shows a three-dimensional line drawing image 430 which is read from the drawing region 265B and displayed on the screen of the display 18A with a coloring process and the like performed thereon by the GPU 262.

The three-dimensional line drawing image 430 is an image in which a character object line drawing image 401Ia is placed on the left end of a virtual road object line drawing image 420Ia formed by pieces of line drawing images i.e., vibrating basic objects 415. The vibrating objects 415 are separate from each other.

At step S74, the virtual road object line drawing image 420Ia (a virtual line drawing image having obstacle object line drawing images inserted therein in a case wherein obstacle object line drawing images are present) is drawn such that it moves a predetermined distance in the direction of the arrow E at a predetermined time interval, e.g., each time the screen is updated (every ⅓₀ sec. in the case of an NTSC system). At the same time, components that form the character object line drawing image 401Ia such as the arms, legs, etc. of a modified rabbit in this case are drawn such that they are alternately moved back and forth to provide an image in which the character object line drawing image 401Ia seems as if it is in a relative movement (running) in the direction of the arrow F on the screen.

The three-dimensional line drawing image 430 shown in FIG. 23 is an image in which only the character object line drawing image 401Ia and the virtual road object line drawing image 420Ia are displayed. Line drawing images associated with obstacle objects that are in accordance with results of frequency analysis are displayed based on results of frequency analysis after the three-dimensional line drawing image 430 is displayed.

In FIG. 23, a reference numeral 415I represents a line drawing image of a basic object 415 (a basic object line drawing image). In practice, since a basic object 415 is quite thin, only edge lines of the polygons that constitute the object are drawn in white.

Therefore, the three-dimensional line drawing image 430 in the example in FIG. 23 is a quite simple monochromatic image (a monochromatic picture, in practice) in which the background is in black and line drawing portions formed by edge lines of polygons are in white.

In the present embodiment, the time required for the right end of the virtual road object line drawing image 420I to move to the left end of the three-dimensional line drawing image 430 is set at eight sec. as described above.

In practice, when an obstacle object line drawing image as described later appears in the virtual road object line drawing image 420Ia on the screen of the display 18A of the monitor 18, the user (game player) can perform operations on the control buttons PB as prescribed in the control buttons/obstacle objects correspondence table 416 in FIG. 16 at predetermined timing according to various elements of music outputted from the speaker 18B of the monitor 18 or headphones to clear the obstacle object line drawing image. The terms "clear" indicates a state in which the character object line drawing image gets over an obstacle object line drawing image or rolls over the same to move relative to the same at proper timing according to music. When the user fails to perform a prescribed operation on the control buttons PB at predetermined timing to enter a non-clear state, a particular image is generated as described later. The vibribbon game proceeds in such a manner.

In the present embodiment, a clear state is determined at step S74 based on a state of an NG flag F1 as described later. When the NG flag F1 is 0 (the clear state), a small vibration imparting process is performed to impart small vibrations (relatively small vibrations) to the next three-dimensional line drawing image to be drawn. When the NG flag F1 is 1 (the non-clear state or NG state), a big vibration imparting process is performed at step S77 to impart big vibrations (relatively big vibrations) to the next three-dimensional line drawing image to be drawn.

In general, small vibrations give the user (operator) a pleasant feel and a sense of rhythm, and big vibrations give the user (operator) a surprise and the like. The speaker 18B generates pleasant music with a sense of rhythm synchronously with small vibrations and generates sounds such as loud blasts synchronously with big vibrations. The music may be muted.

In this case, the terms "small vibrations" and "big vibrations" represent a difference in the degree of vibrations. In the present embodiment, the term "small vibrations" indicates a level of vibrations (small vibrations) which does not make it difficult for the user to recognize the original shape of an object. The term "big vibrations" indicates a level of vibrations (big vibrations) which makes it difficult for the user to recognize the original shape of an object.

When a big vibration imparting process is performed at step S77, the NG flag F1 is reset to F1←0 (F=0) (flag is taken down) at step S78.

At step S79, a new three-dimensional line drawing image which has been subjected to a vibration imparting process (a process of imparting small or big vibrations) is drawn in the drawing region 265A in which drawing is presently performed instead of the drawing region 265B which is presently being read for display by a process at step S78.

The vibration process at steps S76 and S77 will now be described.

The vibration process is a process in which after a random number is added to each of the vertices of the polygons that form each of basic objects 415 which are pieces of line drawing images forming all objects provided in a three-dimensional space, images constituted by only edge lines of the polygons are drawn again.

In a mathematical description, relatively small random numbers RDS are generated for the small vibration process, and relatively big random numbers RDB are generated for the big vibration process. When the NG flag F1 is 0, relatively small random numbers RDS ($\Delta xs$, $\Delta ys$, $\Delta zs$) are added to the coordinates (x, y, z) of the respective vertices of a basic object 415 to transform the vertex coordinates into vertex coordinates (x+$\Delta xs$, y+$\Delta ys$, z+$\Delta zs$), and straight lines are drawn between the transformed vertex coordinates to define the edge lines of a new polygon.

When the NG flag F1 is 1, relatively big random numbers RDB ($\Delta xb$, $\Delta yb$, $\Delta zb$) are added to the coordinates (x, y, z) of the respective vertices to transform the vertex coordinates into vertex coordinates (x+$\Delta xb$, y+$\Delta yb$, z+$\Delta zb$), and straight lines are drawn between the transformed vertex coordinates to define the edge lines of a new polygon.

Referring now to FIG. 24 for a graphical description, the small vibration process creates a basic object 415*a* by slightly moving (i.e., rotating, enlarging or displacing) a basic object 415 which is initially drawn in a quantity represented by the arrows SV and SV' in the three-dimensional space, and the big vibration process creates a basic object 415*b* by moving the basic object 415 in a larger quantity represented by the arrows LV and LV' in the three-dimensional space.

At step S77, the three-dimensional object to which vibrations have been imparted is drawn in the drawing region 265 (265A or 265B) in which no drawing is presently performed. When it is drawn in the drawing region 265, since no texture is applied to the surfaces of the polygon that constitutes the basic object 415, no change occurs in the quality and the feel of the material of the basic object 415 even if it is enlarged or reduced. In other words, an advantage is achieved in that the simplicity of the image is not deteriorated even if it is enlarged or reduced.

The three-dimensional line drawing image 430 shown in FIG. 23 is an image in which small vibrations are imparted to each of the basic object line drawing images 415Ia.

At step S79, the three-dimensional line drawing image to which vibrations have been imparted is drawn in the drawing region 265B which is not presently being displayed. At step S80, display is presented from the drawing region 265A in which drawing has already been completed. As described above, the display process at step S80 and other processes are performed in parallel. The other processes indicate processes at step S26 (steps S51 through S60) and at steps S71 through S79 and processes from step S28 through step S23 up to step S26.

For convenience in understanding, a description will now be made with reference to FIGS. 25 through 32 on a three-dimensional line drawing image displayed on the screen of the display 18A and the progress of a game.

FIG. 25 shows a three-dimensional line drawing image 432 having small vibrations imparted thereto which is obtained after the game process flow at step S10 shown in FIG. 11 is repeated for several seconds.

While separate pieces of line drawing images that form a game character represent the character as if it is running in the three-dimensional line drawing image 432, the entire image is presented as an image in which an obstacle object line drawing image 411Ib, an obstacle object line drawing image 414Ib and an obstacle object line drawing image 412Ib inserted in a virtual road object line drawing image 420Ib are sequentially moved from the further right side of the screen to the front left side of the screen (in the direction of the arrow E) relative to a character object line drawing image 401Ib which is relatively stationary in the vicinity of the left end of the screen.

Specifically, in the three-dimensional line drawing image 432, figuratively speaking, a rabbit (the character object line drawing image 401Ib) seems as if it is running while moving up and down at the positions of a quadrangular obstacle object (the obstacle object line drawing image 411Ib), a zigzag obstacle object (the obstacle object line drawing image 414Ib), a V-shaped obstacle object (the obstacle object line drawing image 414Ib) and a circular obstacle object (the obstacle object line drawing image 412Ib) which are moving toward the rabbit.

Figure 26:
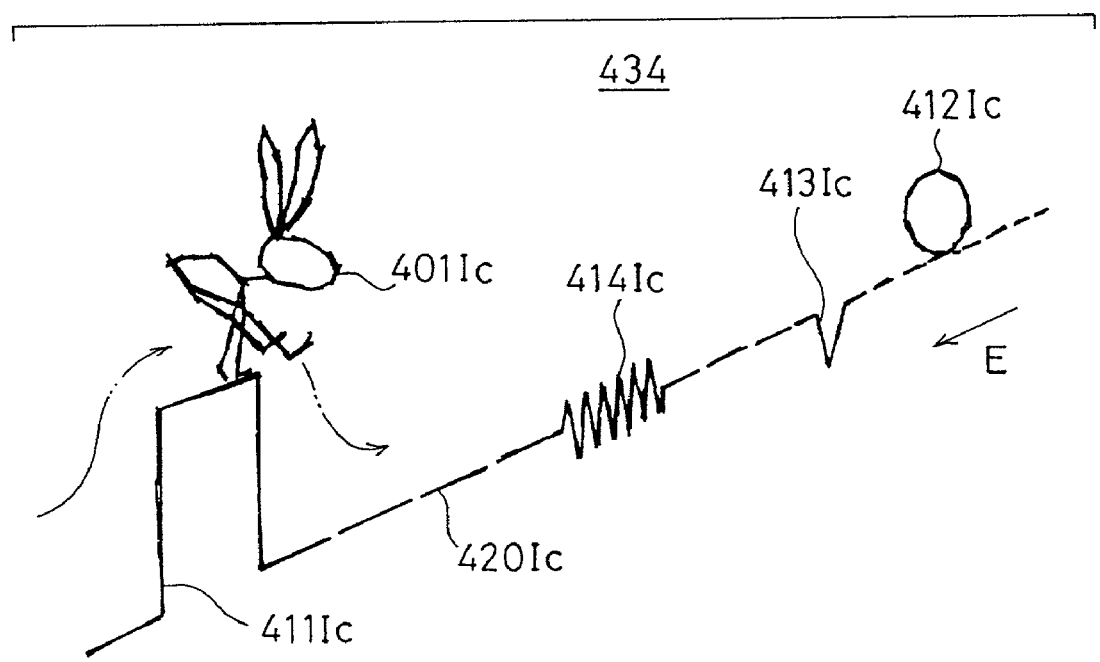
FIG. 26 is an illustration of a screen in which a character object gets over an obstacle object.

In a three-dimensional line drawing image 434 shown in FIG. 26, when the L1 button 114*a* is pressed at predetermined timing (in a predetermined range) in response to a movement of an obstacle object line drawing image 411Ic toward the front left end of the screen and a resultant increase in the size of its quadrangular configuration, a character object line drawing image 401Ic gets over the quadrangular obstacle object line drawing image 411Ic in a manner like leapfrog. Thus, the quadrangular obstacle object line drawing image 411Ic can be cleared.

At this time, a virtual road object line drawing image 420Ic, an obstacle object line drawing image 414Ic, an obstacle object line drawing image 413Ic and an obstacle object line drawing image 412Ic also move in the direction of the arrow E while gradually increasing in size.

Figure 27:
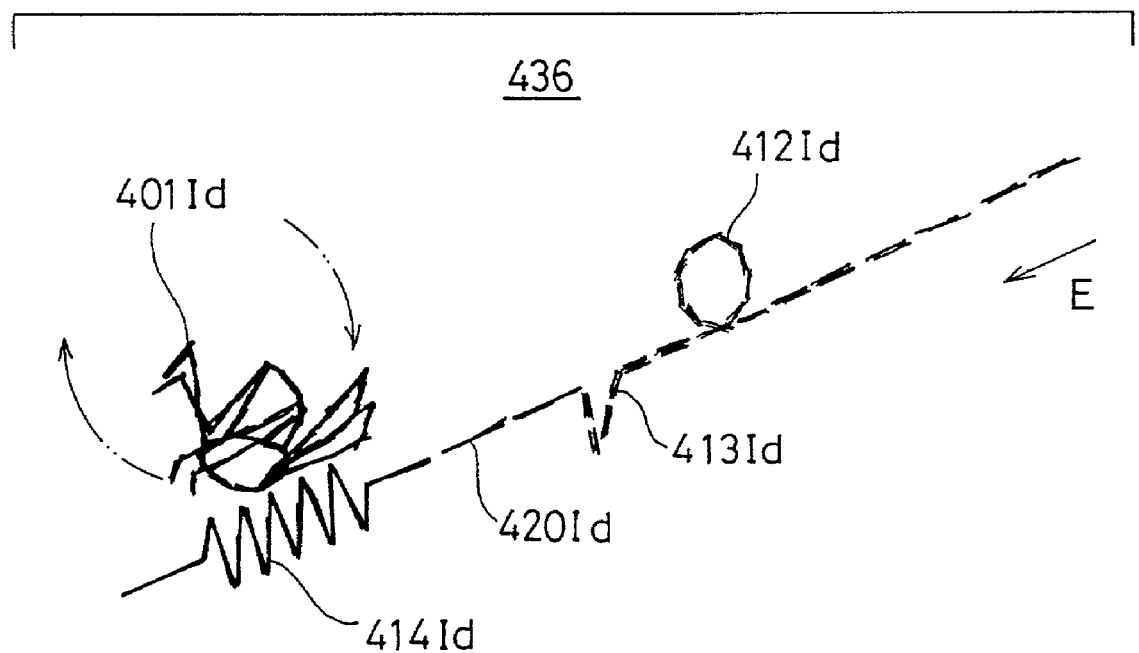
FIG. 27 is an illustration of a screen in which the character object rolls over an obstacle object.

In a three-dimensional line drawing image 436 shown in FIG. 27, when the Δ button 112*a* is pressed at predetermined timing (in a predetermined range) in response to a movement of an obstacle object line drawing image 414Id toward the front left end of the screen and a resultant increase in the size of its zigzag configuration, a character object line drawing image 401Id moves over the zigzag obstacle object line drawing image 414Id by making a so-called forward roll on the same. Thus, the zigzag obstacle object line drawing image 414Id can be cleared.

At this time, a virtual road object line drawing image 420Id, an obstacle object line drawing image 413Id and an obstacle object line drawing image 412Id also move in the direction of the arrow E while gradually increasing in size.

Figure 28:
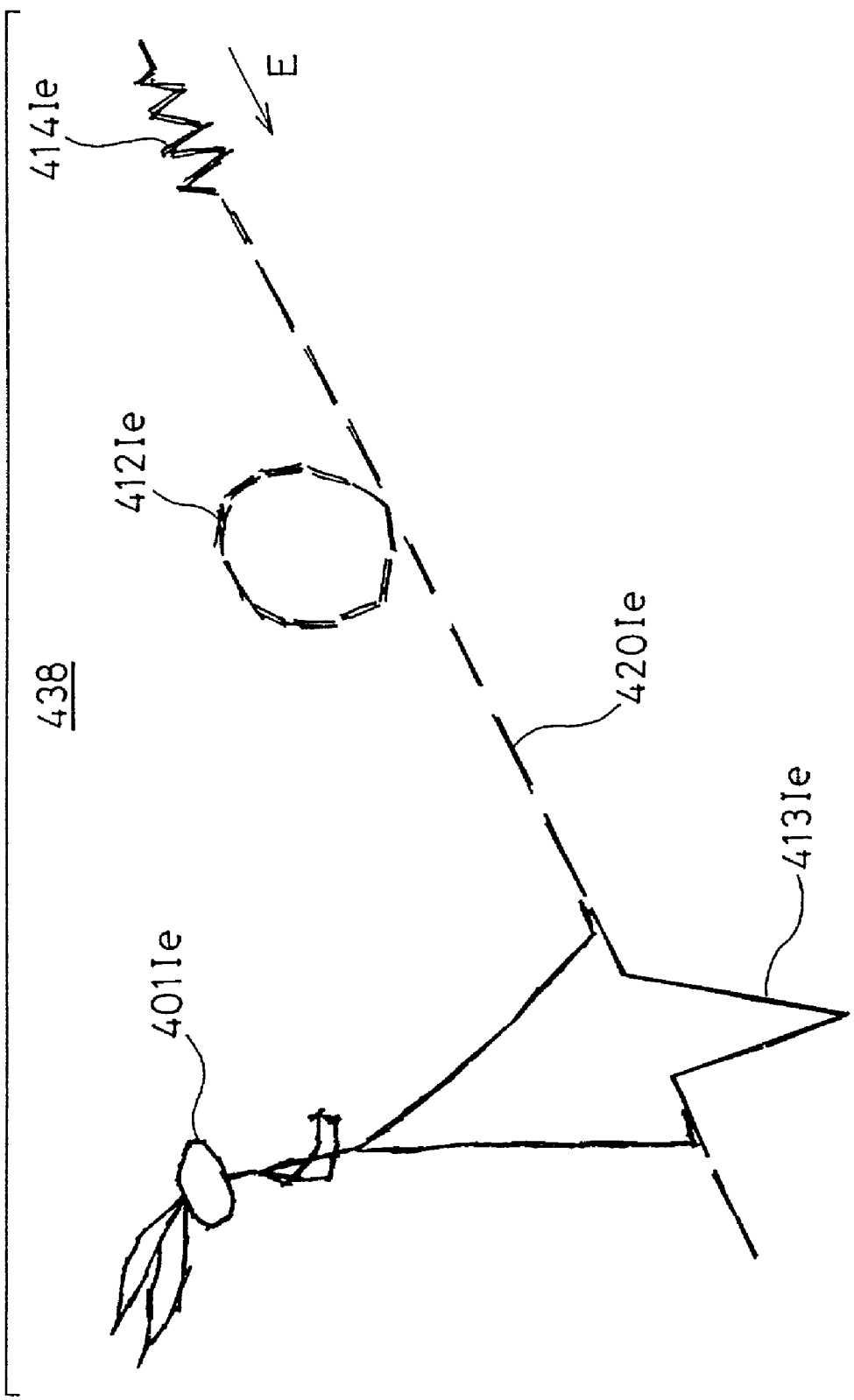
FIG. 28 is an illustration of a screen in which the character object strides over an obstacle object.

In a three-dimensional line drawing image 438 shown in FIG. 28, when the up button 110a is pressed at predetermined timing (in a predetermined range) in response to a movement of an obstacle object line drawing image 413Ie toward the front left end of the screen and a resultant increase in the size of its V-shaped configuration, a character object line drawing image 404Ie moves over the V-shaped obstacle object line drawing image 413Ie in such a matter that it strides over the same. Thus, the V-shaped obstacle object line drawing image 413Ie can be cleared.

At this time, a virtual road object line drawing image 420Ie and an obstacle object line drawing image 412Ie also move in the direction of the arrow E while gradually increasing in size.

In the three-dimensional line drawing image 438, a new obstacle object line drawing image 414Ie which is generated as a result of an audio signal analyzing process performed concurrently with the display process is drawn on the right end of the virtual road object line drawing image 420Ie.

Figure 29:
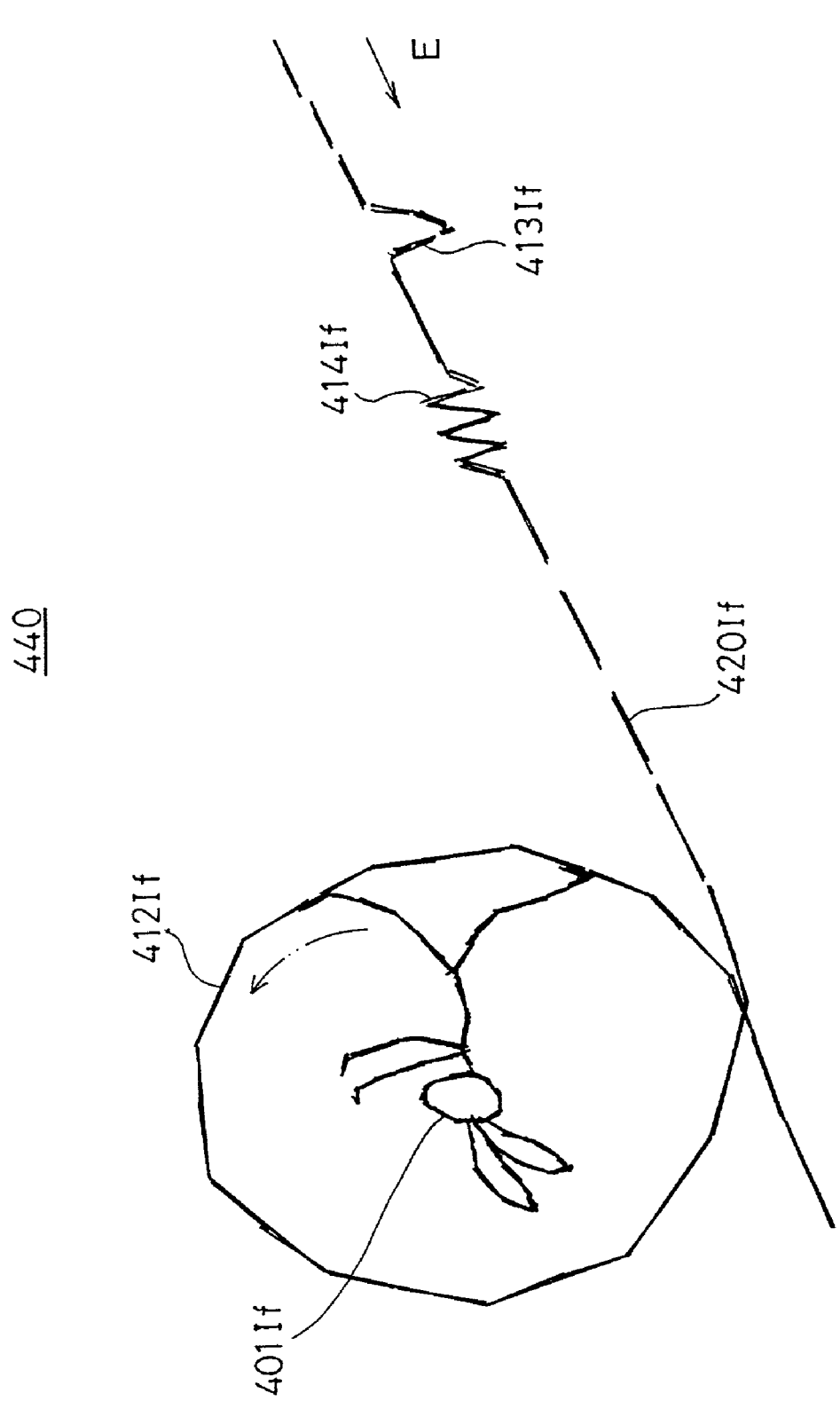
FIG. 29 is an illustration of a screen in which the character object rolls in an obstacle object.

In a three-dimensional line drawing image 440 shown in FIG. 29, when the R1 button 116a is pressed at predetermined timing (in a predetermined range) in response to a movement of an obstacle object line drawing image 412If toward the front left end of the screen and a resultant increase in the size of its circular configuration, a character object line drawing image 401If moves in the circular obstacle object line drawing image 412If in such a manner that it seems like walking. Thus, the circular obstacle object line drawing image 412If can be cleared.

At this time, a virtual road object line drawing image 420If, an obstacle object line drawing image 414If and a newly generated obstacle object line drawing image 413If also move in the direction of the arrow E while gradually increasing in size.

FIGS. 26 through 29 show line drawing images in which the character object 401 clears the obstacle objects 411, 412, 413 and 414, respectively.

Figure 30:
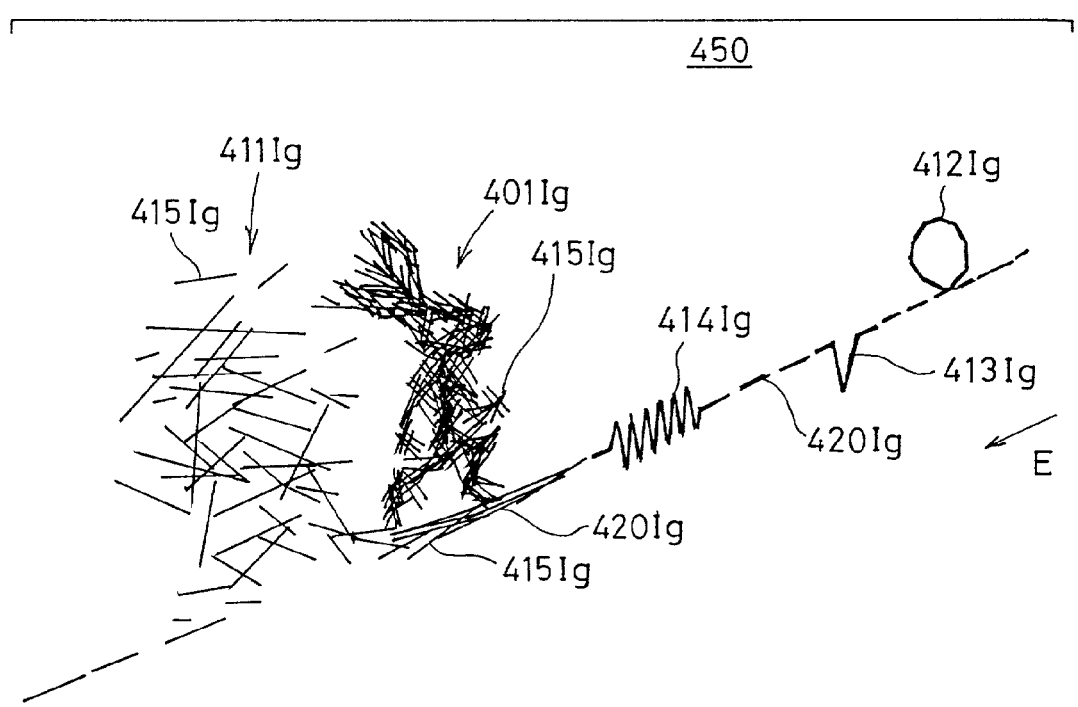
FIG. 30 is an illustration of a screen which appears immediately after the character object fails in getting over an obstacle object.

FIG. 30 shows a three-dimensional line drawing image 450 that appears immediately after a so-called non-clear state which occurs when the L1 button 114a is not pressed at the predetermined timing (in the predetermined range) relative to the obstacle object line drawing image 411b in the display of the three-dimensional line drawing image 432 shown in FIG. 25 or when a control button PB other than the L1 button 114a is pressed even though at the predetermined timing (in the predetermined range).

As shown in FIG. 30, big vibrations (explosive vibrations) described in the process at step S77 are imparted to each of basic object line drawing images 415Ig that form an obstacle object line drawing image 411Ig to display it as an image of broken pieces. Such big vibrations also affect a character object line drawing image 401Ig and a virtual road object line drawing image 420Ig in the vicinity of the same. As shown in FIG. 30, this results in an image in which relatively big vibrations are imparted also to basic object line drawing images 401Ig that form the character object line drawing image 401Ig and virtual road object line drawing image 420Ig, although the vibrations are still categorized as small vibrations according to the process at step S76.

At this time, vibrations may be imparted to the joysticks 44 and 46 through the motor driver 150 and motor 130.

The three-dimensional line drawing image 450 including the broken object shown in FIG. 30 clearly indicates that the user could not clear the obstacle object line drawing image 411Ig (the non-clear or NG state).

FIG. 31 shows a three-dimensional line drawing image 452 that appears within a predetermined time (e.g., within one second) after a failure in clearing the obstacle object line drawing image 411Ig.

As shown in FIG. 31, when the obstacle object line drawing image 411Ib (or any one of the other obstacle object line drawing images 414Ib, 413Ib and 412Ib) shown in FIG. 25 was not cleared, an image appears in which vibrations have been imparted to enhance small vibrations slightly. Further, in such a non-clear state, the moving speed of the virtual road object line drawing image 420Ig in the direction of the arrow E may be increased to reduce predetermined timing (a predetermined range) that allow a character object 401Ih to clear an obstacle object 414Ih, thereby increasing the difficulty of the game.

Figure 32:
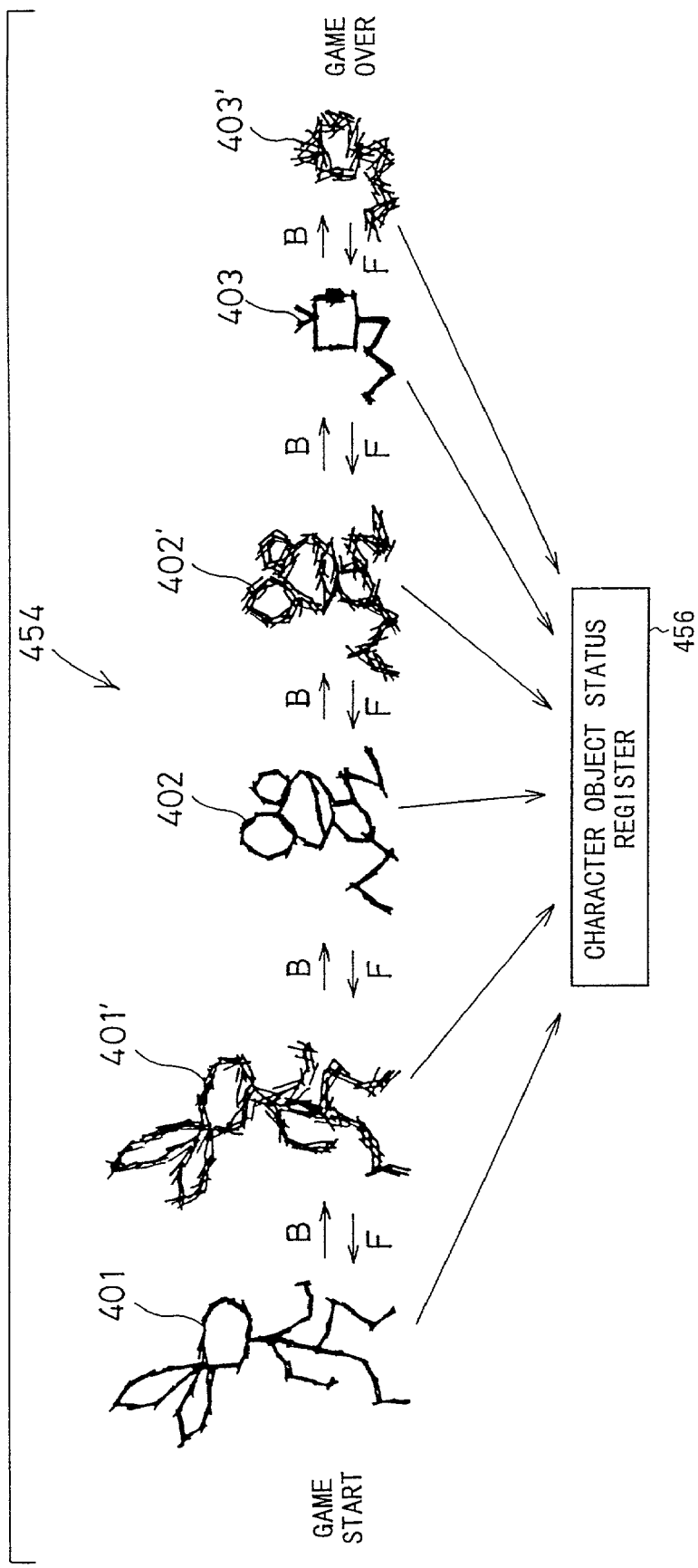
FIG. 32 shows a table of character status.

FIG. 32 is a character status table 454 showing changes in the statuses (metaphorically speaking, degeneration and evolution) of the character objects 401, 402 and 403 shown in FIG. 12 in the "easy" mode.

As shown in the character status table 454, the character object that appears first (at the time when the game is started) in the "easy mode" of the vibribbon game is the character object 401 which is a modification of a rabbit and to which very slight vibrations (small vibrations at step S76) are imparted. When the character object 401 fails to clear any one of the obstacle objects 411, 412, 413 and 414, the above-described big vibrations are imparted to the character object to break up the same, and a character object 401' having slightly bigger vibrations appears thereafter.

When the character object 401' having bigger vibrations (vibrations that still leave the original shape as described at step S76) fails to clear an obstacle object again, the above-described big vibrations are imparted to break up the same and to cause it to change (transform itself) into a character object 402 which is a modification of a frog and to which very small vibrations are imparted.

When failures in clearing are similarly repeated, the change of the character object is repeated. Specifically, the above-described big vibrations are imparted to break up the character object 402 to change it into a character object 402' to which slightly bigger vibrations are imparted. Then, the character object 402' is caused to transform itself into a character object 403 which is a modification of a snake and to which still smaller vibrations are imparted. Thereafter, the character object 403 is changed to a character object 403' to which slightly bigger vibrations are imparted. In this manner, each time the character object fails in clearing an obstacle object, the appearance of the character object gets miserable. In the end, when the obstacle objects 411, 412, 413 and 414 can not be cleared over a predetermined number of trials, that is, when the character object fails in clearing an obstacle object after the character object is changed to the character object 403', the game is terminated, i.e., the game is over.

Even when the character object 401 once changes (degenerates) in the direction of the arrow B, i.e., when the character object 401 sequentially changes to the character objects 401', 402, 402', 403 and 403', changes in the direction of the arrow F that is opposite to the direction of the arrow B (evolution) occurs if the clear state consecutively occurs or the probability of clearance increases thereafter.

For example, re-transformation from the character object 403 into the character object 402' and the like can occur.

Algorithm for defining what state of clearance triggers a transformation and so on is determined in advance for each of the game modes, and the number and pattern of such clear states are prescribed in the relevant program.

When a piece of music is terminated while the character object is in any of the states represented by 401, 401', 402, 402', 403 and 403', the game mode is terminated in a clear state, and a point is displayed in accordance with the states of clearance of the obstacle objects 411, 412, 413 and 414 at that time.

The character object statuses 401, 401', 402, 402', 403 and 403' are stored in a register in the CPU 251 (a character object status register (character object status storing region) 456 schematically shown in FIG. 32) as character object statuses. When the game is started in the "easy" mode, the contents of the character object status register 456 are data representing the character object 401.

A description has been made above on the three-dimensional line drawing image displayed on the screen of the display 18A and the progress of the game in accordance with the manual controller 16.

A description will now be made on the progress of the game in relation to the flow chart shown in FIG. 11.

When the three-dimensional line drawing image 432 or the like shown in FIGS. 25 through 31 is shown, e.g., when the three-dimensional line drawing image 432 shown in FIG. 25 is displayed, it is checked at step S28 whether any control button PB has been manipulated.

If no manipulation is determined, it is checked at step S29 whether the character object line drawing image 401Ib has reached a predetermined position of the obstacle object line drawing image 411Ib, e.g., the leading position of the obstacle object line drawing image 411Ib. If the character object line drawing image 401Ib has not reached the predetermined position of the obstacle object line drawing image 411Ib, NG flag F1 is set at 0 at step S30 because it is not an NG state, and processes at step S23 and the subsequent steps are performed, i.e., the audio signal analyzing process at step S26 and the line drawing display updating process at step S27 are performed if there is any further music data.

During the line drawing display updating process at step S27, display with small vibrations is maintained because F1=0 at the determination of the NG flag F1 at step S75 (see FIG. 20).

When it is determined at step S28 that a control button PB has been manipulated, it is determined at step S31 whether the obstacle object has been cleared. Specifically, it is determined with reference to a predetermined pixel-number table (not shown) and the control buttons/obstacle objects correspondence table 416 shown in FIG. 16 whether a predetermined part of the character object line drawing image 401Ib, e.g., the part of a front leg is located within a predetermined range from a predetermined position of the obstacle object line drawing image 411Ib (e.g., the leading position of the obstacle object line drawing image 411Ib) at the time of manipulation (the determination is actually made based on a certain number of pixels) and whether the appropriate control button PB, i.e., the L1 button 114a to get over the obstacle object line drawing image 411Ib has been manipulated or not.

When both of these conditions are satisfied, at step S31, it is determined that the obstacle object is cleared. At step S32, the NG flag F1 is set in a state representing successful clearance, i.e., F1←0. When the obstacle objects 411, 412, 413 and 414 are cleared, points are added to an unillustrated point register.

When either of those conditions is not satisfied, step S31 determines that the obstacle object is not cleared. At step S33, the NG flag F1 is set in a state representing unsuccessful clearance, i.e., F1←1.

When it is determined at step S29 that no control button PB has been manipulated, the NG flag F1 is set in the F1←1 (NG) state based on a judgement that the manipulation of the control buttons PB has been delayed even if the character object line drawing image 401Ib or the like has reached a predetermined position of the obstacle object line drawing image 411Ib or the like.

After the process (F1←0) at step S33, it is determined at step S34 whether the normalization of the character objects 401, 402 and 403 (i.e., a change in the direction of the arrow F in FIG. 32) is possible in the present state of display. For example, the term "normalization" means a change of the character object 401' (see FIG. 32) into the character object 401 having smaller vibrations and a change of the character object 402 into the character object 401' in the direction of the arrow F.

When the determination at step S34 is YES, in other words, when it is determined with reference to the data in the character object status register 456 that the character object is in any of the statuses indicated by the 401', 402, 402', 403 and 403' excluding 401, at step S36, the data of the character object status register 456 is rewritten with data representing a character object in the direction of the arrow F.

Obviously, the determination at step S34 is NO when the data of the character object status register 456 is data representing the character object 401.

As assumed from the processes at steps S32, S34 and S36, after the process (F1←1) at step S32, it is determined at step S35 whether the deterioration of the character objects 401, 402 and 403 (i.e., a change in the direction of the arrow B in FIG. 32) is possible in the present state of display. For example, the term "deterioration" means a transformation of the character object 401' (see FIG. 32) into the character object 402 and a transformation of the character object 402 into the character object 402' having bigger vibrations in the direction of the arrow B.

When the determination at step S35 is YES, in other words, when it is determined with reference to the data in the character object status register 456 that the character object is in any of the statuses indicated by the 401, 401', 402, 402'and 403, at step S36, the data of the character object status register 456 is rewritten with data representing a character object in the direction of the arrow B.

When the determination at step S35 is NO, the data of the character object status register 456 is data representing the character object 403'. Then, the process proceeds to step S11 (see FIG. 5).

The process proceeds to step S11 as well when it is determined at step S24 that the game has been finished for one piece of music.

Figure 33:
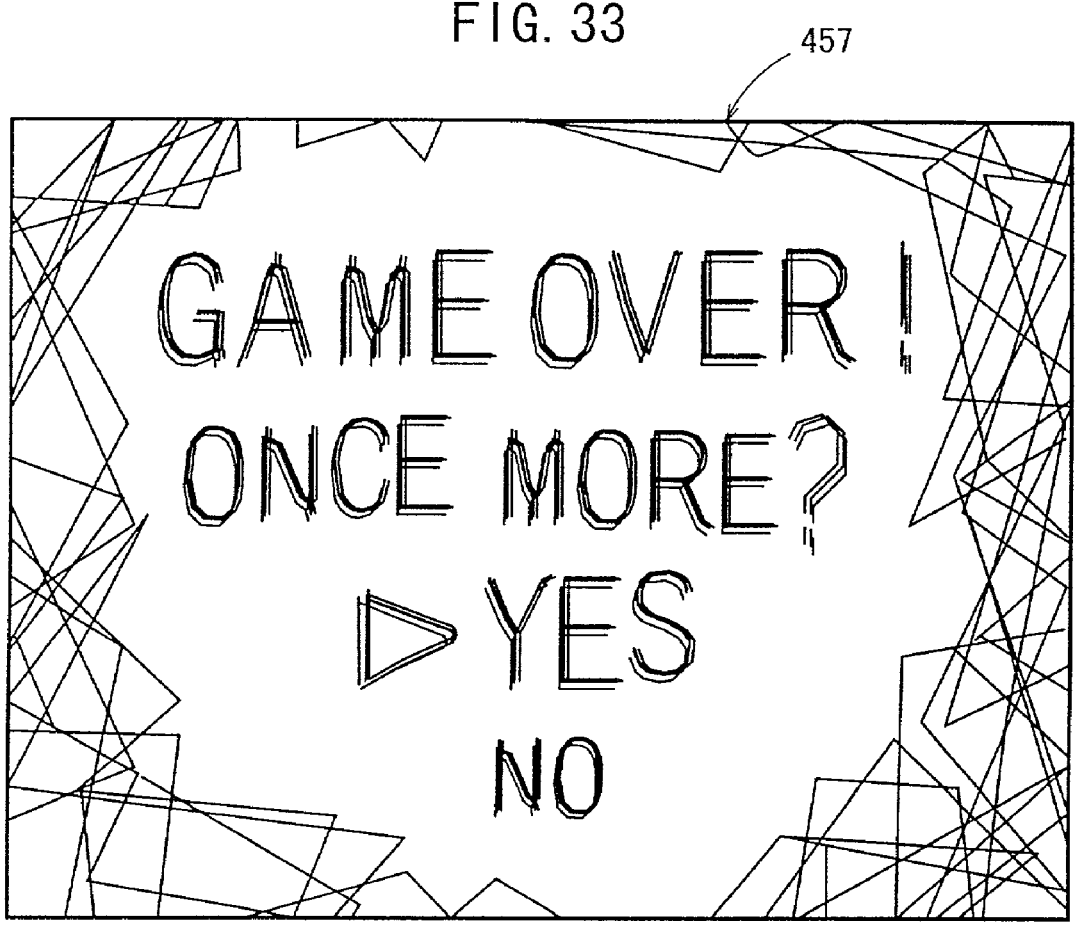
FIG. 33 is an illustration of a Game Over screen.
Figure 34:
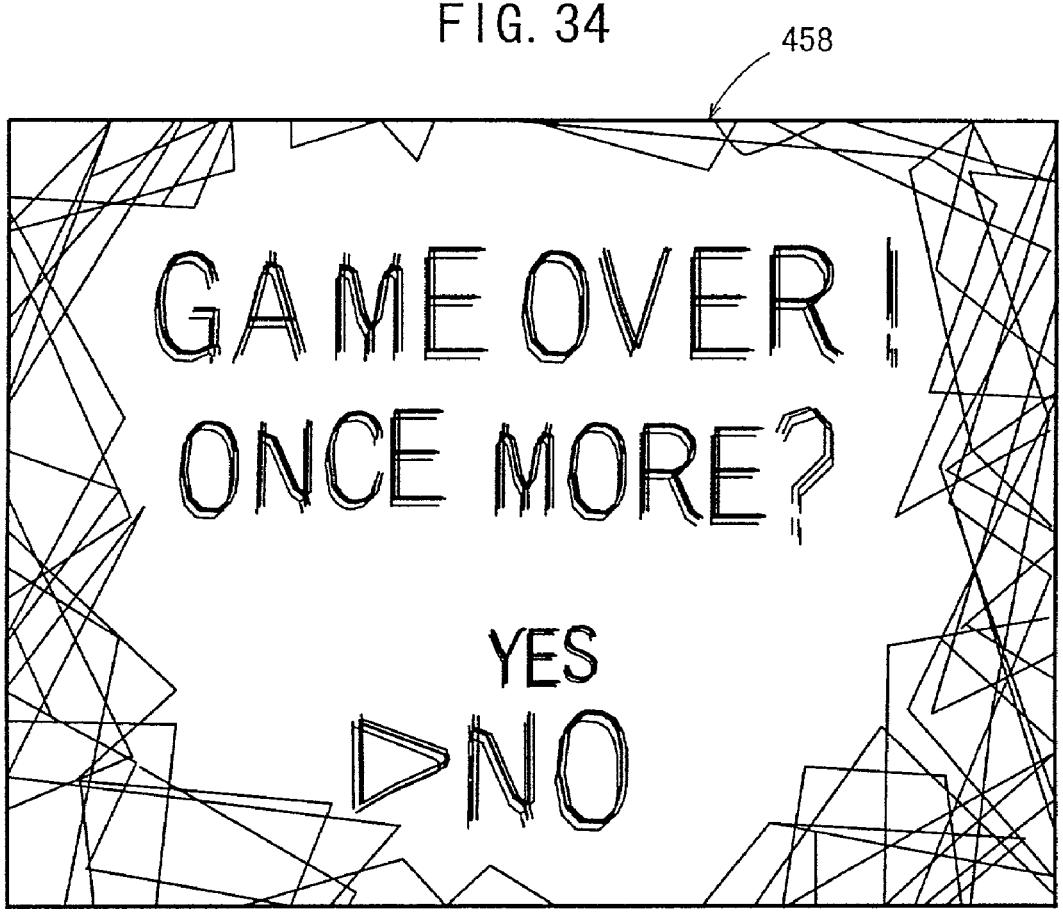
FIG. 34 is an illustration of the Game Over screen.
Figure 35:
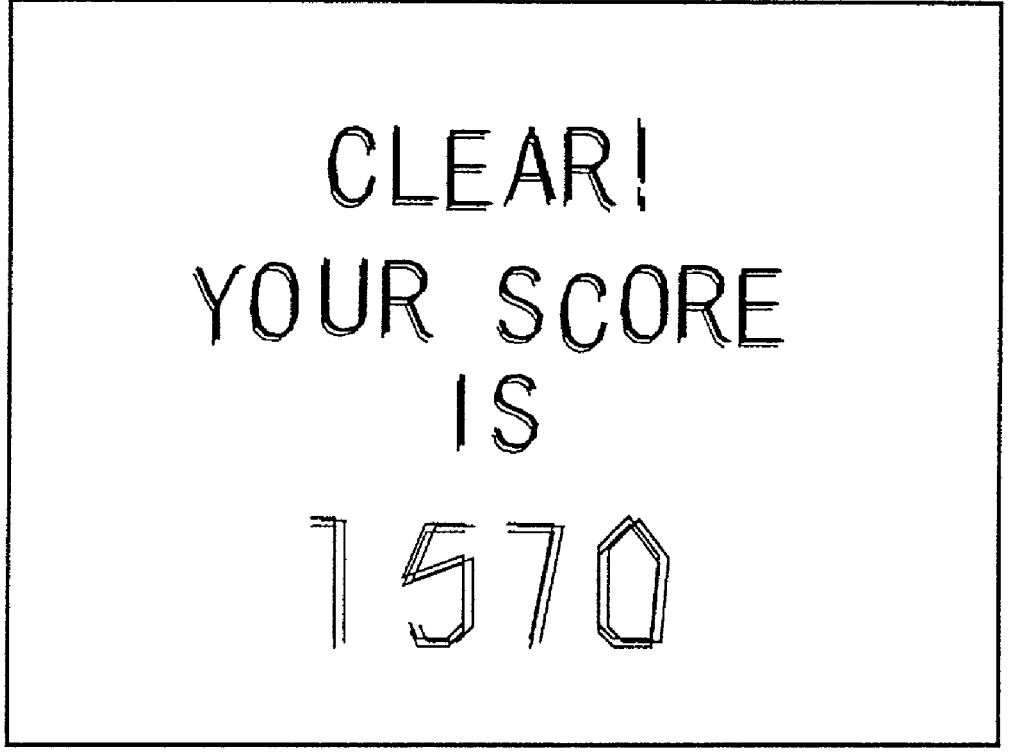
FIG. 35 is an illustration of an Ending screen.

FIGS. 33, 34 and 35 respectively show ending screens 457, 458 and 460 used in the process at step S11 of the termination process at step S12.

Specifically, when the determination at step S35 is negative, the ending screen 457 shown in FIG. 33 is displayed.

On the ending screen 457, characters that read "game over! (meaning the end of the game)", "once more? (asking whether the player wishes to play the game once more)", "Yes" and "No" are displayed with small vibrations imparted thereto. When the ◯ button 112b is pressed in this state, the game can be played again. That is, step S12 results in a negative determination and the game process at step S10 is started. Then, the game selection screen 306 shown in FIG. 9 is displayed.

When "Exit" is selected on the game selection screen 306, the start screen 300 shown in FIG. 6 appears.

The ending screen 458 shown in FIG. 34 is a screen that appears when "No" is selected on the ending screen 457 shown in FIG. 33 using the down button 110c. When the ○ button 112b is pressed in this state, step S12 results in a positive determination. Then, the start screen 300 shown in FIG. 6 is displayed.

When step S24 results in a positive determination, the ending screen (game clear screen) 460 shown in FIG. 35 is displayed.

On the ending screen 460, characters that read "clear!" and "your score is 1570" are displayed with small vibrations imparted thereto. When the ○ button 112b is pressed in this state, the game can be played again. That is, step S12 results in a negative determination and the game process at step SIO is started. Then, the game selection screen 306 shown in FIG. 9 is displayed.

Figure 36:
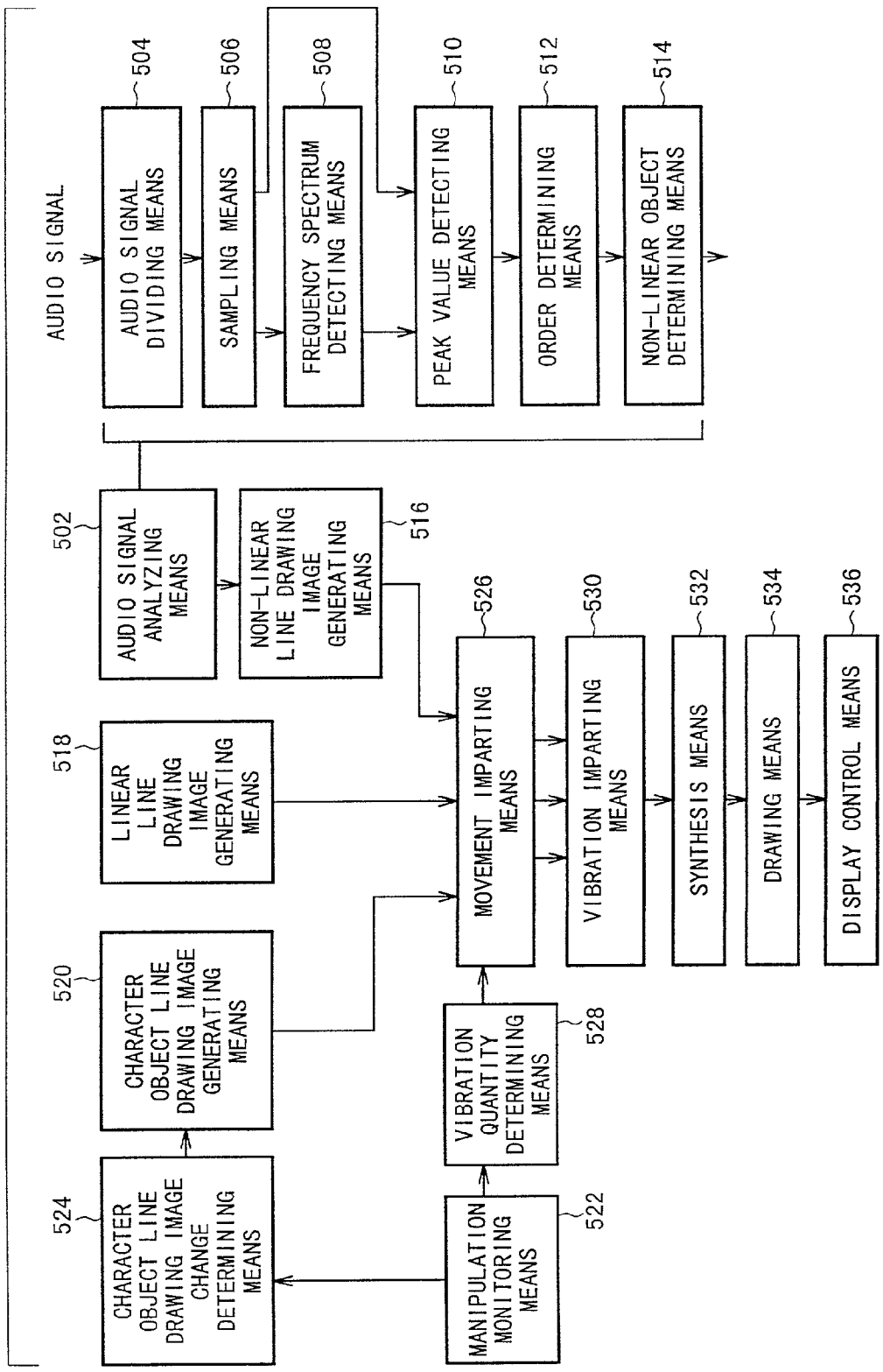
FIG. 36 is a block diagram showing an image processing/audio processing function.

FIG. 36 shows a functional block diagram for image processing and audio processing according to the above-described embodiment.

Referring to FIG. 36, audio signal analyzing means 502 has audio signal dividing means 504 for dividing an audio signal read from the optical disk 20 or a music CD or the like at predetermined time intervals, sampling means 506 for sampling the audio signal divided at the predetermined time 25 intervals, frequency spectrum detecting means 508 for detecting frequency spectra from the result of the sampling, peak value detecting means 510 for detecting a peak value of each of the detected frequency spectra or detecting a peak value of a signal directly from the result of the sampling, order determining means 512 for determining a certain order by processing the detected peak values and non-linear object determining means (obstacle object determining means) 514 for determining the obstacle object 411 and the like based on the determined order.

The process of determining an order performed by the order determining means 512 will be described below. In a process on the frequency axis (frequency analysis process) which uses the frequency spectrum detecting means 508, the detected peak values are categorized into peak values in frequency bands lower and higher than, for example, 500 Hz. Then, the detected frequencies are arranged in the order of the magnitude of the peak values in each of the high and low frequency bands. The arrangement of the detected frequency is used as the above order. In a process on the time axis (amplitude analysis process) which does not use the frequency spectrum detecting means 508, peak values adjacent to each other on the time axis among the five greatest detected peak values are connected. Then, the gradient (differential value) between a peak value and the next peak value is defined as positive or negative. The arrangement of the positive and negative gradients is used as the above order.

The non-linear object determining means 514 refers to the table 428 or 429 showing correspondence between results of audio signal analysis and obstacle objects to be generated, determines a predetermined non-linear object (obstacle object) which is determined in advance in accordance with an order decided as described above and transmits the same to non-linear line drawing image generating means 516.

In the functional block diagram for image processing and audio processing in FIG. 36, linear line drawing image generating means 518 and character object line drawing image generating means 520 are provided as line drawing image generating means in addition to the non-linear line drawing image generating means 516. In this case, the character object line image drawing generating means 520 generates a predetermined character object line drawing image based on a determination made by character object line drawing image change determining means 524 which determines a change to be made on a character object line drawing image from a result of monitoring supplied by manipulation monitoring means 522 which monitors the manipulation timing of a predetermined control button PB on the manual controller 16.

Movement imparting means 526 imparts a quantity of movement to the linear line drawing image, non-linear line drawing image and character object line drawing image.

Vibration quantity determining means 528 determines a quantity of vibration based on a result of monitoring performed by the manipulation monitoring means 522.

Vibration imparting means 530 imparts different vibrations to each of the linear line drawing image, non-linear line drawing image and character object line drawing image to which a quantity of movement has been imparted based on the quantity of vibration determined by the vibration quantity determining means 528.

The linear line drawing image, non-linear line drawing image and character object line drawing image to which movements and vibrations have been imparted are synthesized by synthesis means 532 and are drawn in the frame buffer 263 by drawing means 534.

The image drawn in the frame buffer 263 is displayed on the screen of the display 18A under control of display control means 536 (GPU 262).

As described above, the entertainment system 10 according to the present embodiment has the entertainment apparatus 12 for executing various programs, the manual controller 16 for inputting a manual control request of a user to the entertainment apparatus 12 and the display 18A for displaying an image outputted from the entertainment apparatus 12. The entertainment apparatus 12 has the audio signal analyzing means 502 for analyzing an audio signal and the line drawing image generating means 516, 518 and 520 for generating a substantially linear line drawing image having a non-linear line drawing image portion on the display monitor 18 by generating a substantially linear line drawing image (420Ib or the like) and by inserting a non-linear line drawing portion (411Ib or the like) based on a result of the analysis of the audio signal in the substantially linear line drawing image 420Ib or the like and for generating a line drawing image of a character object (401Ib or the like) on the substantially linear line drawing image having the non-linear line drawing image portion.

Specifically, a line drawing image of a character object (401Ib or the like) is generated on a substantially linear line drawing image having a non-linear line drawing image portion which has been inserted based on a result of analysis of an audio signal (411Ib and 420Ib or the like). This makes it possible to display a novel line drawing image according to music on the display 18A.

In this case, the movement imparting means 526 may move the line drawing image of the character object (401Ib or the like) such that it makes a relative movement on the substantially linear line drawing image 420Ib having the non-linear line drawing image portion 411Ib, which makes it possible to provide a more entertaining line drawing image.

Further, the character object line drawing image change determining means (character object line drawing image changing means) 524 may change the character object line drawing image 401Ib or the like to a line drawing image of a different character object (402Ib or the like) depending on how the character object line drawing image moves on the substantially linear line drawing image 420Ib or the like having the non-linear line drawing image portion 411Ib or the like, which makes it possible to provide a more entertaining line drawing image.

Furthermore, the vibration imparting means 530 may impart vibrations to the substantially linear line drawing image 420Ib or the like having the non-linear line drawing image portion 411Ib or the like and the character object line drawing image 401Ib or the like, which makes it possible to provide a quite entertaining line drawing image.

In this case, each of the line drawing images may be drawn as a three-dimensional line drawing image to provide a highly entertaining image which is less likely to become tiresome.

An audio signal may be used which is supplied to the entertainment apparatus 12 from a recording medium (the optical disk 20 or a music CD) or which is downloaded thereto as a result of communication.

Each of the above-described audio signal analyzing means 502, the line drawing image generating means 516, 518 and 520, the movement imparting means 526, the character object line drawing image change determining means (character object line drawing image changing means) 524 and the vibration imparting means 530 may be stored in a recording medium such as the optical disk 20 as a program.

For example, the operation of the game of the present embodiment may be described with reference to FIG. 26. The L1 button 114a (the predetermined control button PB on the manual controller 16) is pressed at predetermined timing to cause the character object line drawing image 401Ic to clear the virtual road object line drawing image 420Ic having the obstacle object line drawing images 411Ic, 414Ic, 413Ic and 412Ic which move from the further right side of the screen toward the front left side of the screen (in the direction of the arrow E).

In this case, when the player misses the timing for pressing the control button PB or presses a control button PB of a wrong type, as shown in FIG. 30, the obstacle object line drawing image 411 to be cleared becomes the obstacle object line drawing image 411Ig which is broken in such a manner that the original shape is indistinct, and the character object 401 changes to the character object line drawing image 401Ig having considerably big vibrations.

The game operated in such a manner can be regarded quite entertaining.

The present invention is not limited to the above-described embodiment, and various configurations may obviously be employed without departing from the principle of the invention.

Figure 37:
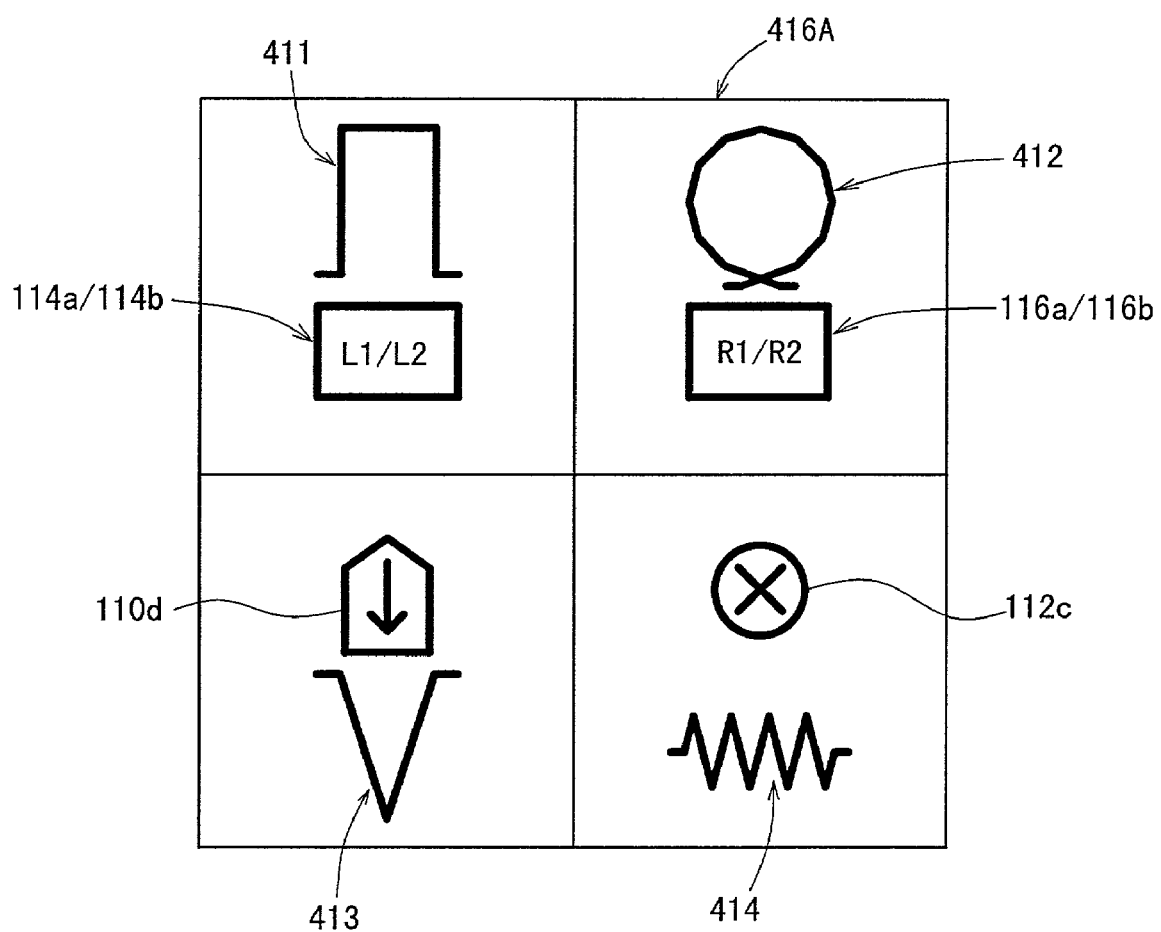
FIG. 37 shows an example of a table of correspondence between control buttons and obstacle objects according to another embodiment of the invention.

(1) For example, as an alternative example of the control buttons/obstacle objects correspondence table 416, i.e., so-called key assignment shown in FIG. 16, an control buttons/obstacle objects correspondence table 416A shown in FIG. 37 may be stored in addition. On the control buttons/obstacle objects correspondence table 416A, either the L1 button 114a or L2 button 114b, either the R1 button 116a or R2 button 116b, the down button 110d and the X button 112c are assigned to the obstacle objects 411, 412, 413 and 414, respectively. Such an arrangement makes it possible to satisfy preference of a user (game player) and the like.

Figure 38:
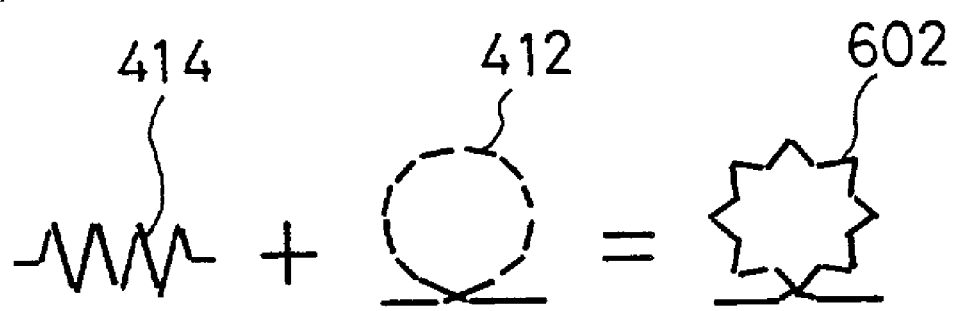
FIG. 38 is an illustration for explaining creation of an obstacle object according to the embodiment.

(2) For example, an obstacle object 602 obtained by synthesizing the obstacle objects 414 and 412 with the synthesis means as shown in FIG. 38 may be generated in the tables 428 and 429 of correspondence between results of audio signal analysis and obstacle objects to be generated shown in FIGS. 18 and 19, as the obstacle object generated based on the audio signal analyzing process at step S26. The user may need to press the R1 button 116a and X button 112c simultaneously at predetermined timing (in a predetermined range) to allow the character object 401 or the like to clear the obstacle object 602.

Various synthesized obstacle objects 604, 606, 608, 610 and 612 as shown in FIG. 39 may be generated (created) as synthesized obstacle objects in addition to the synthesized obstacle object 602.

(3) In order to simplify the operation of the game, the name registration process may be omitted by displaying the game selection screen 306 shown in FIG. 9 without performing the name registration process (step S7) described with reference to FIGS. 7 and 8 when the start button 40 is pressed with the start screen 300 being displayed.

(4) Furthermore, a special movement may be added to the obstacle objects 411, 412, 413 and 414 and the virtual road object 420. First, for example, the moving speed of the virtual road object line drawing image 420Ib can be abruptly changed by setting the game program accordingly in relation to the element of music (a piece of music) or regardless of the element of music. Second, for example, the speed of the obstacle object drawing image 412Ib in FIG. 25 may increase such that the obstacle object drawing image 412Ib passes the obstacle object line drawing image 413Ib located in front of the same. Third, as seen on a three-dimensional line drawing image 622 displayed on a screen 620 of the display 18A in FIG. 40, obstacle object line drawing images 602Iia and 602Iib may be displayed such that they rotate to the right and (or) left about a virtual road object line drawing image 420Ii while moving in the direction of the arrow E.

As described above, the present invention makes it possible to display a novel line drawing image on a display screen or the like.

Further, according to the invention, a line drawing image of a character object is generated on a substantially linear line drawing image having a non-linear line drawing image portion based on a result of audio signal analysis. This makes it possible to display a novel line drawing image on a display screen or the like according to music.

The invention further makes it possible to display a line drawing image having vibrations on a display screen.

Games in which line drawing images are displayed on a screen can be accepted by people in different generations including children and old people because they give a heartwarming feeling.

Each of the line drawing images may be drawn as a three-dimensional line drawing image to provide a highly entertaining image which is less likely to become tiresome associated with music.

Next, an audio signal analyzing process according to another embodiment of the present invention will be described in the following explanations (A. BRIEF EXPLANATION, B. DETAILED EXPLANATION).

A. Brief Explanation

The audio signal analyzing process comprises the following four steps (steps A1 through A4).

A1: Reading an audio signal in the optical disk (music CD) 20 and storing the read audio signal in the buffer (long buffer) 283 or the main memory 253

A2: Emphasizing attacks in the music (audio sound) expressed by the audio signal stored in the long buffer 283

A3: Selecting audio events

A4: Shadowing unnecessary audio events from the selected audio events and determining the resulting audio events as the final events (event shadowing)

Firstly, the process in step A1 will be described. Specifically, an audio signal is read from a music CD or the like via the optical disk drive 281 and the decoder 282. The read audio signal is stored in the long buffer 283. The audio signal in the long buffer 283 is delayed for a predetermined period of time.

The delay time allows audio events in the read audio signal to be detected and displayed as road parts such as the obstacle object line drawing image 411I on the display 18A in synchronism with the output of the corresponding audio sound from the speaker 18B via a D/A converter (not shown) in the SPU 271.

That is, the delay time is sufficient for the CPU 251 to detect distinctive attacks (hereinafter also referred to as the distinctive points or the potential events) in the audio signal for determining road parts corresponding to the detected attacks in the audio signal.

The audio signal comprises a sinusoidal wave signal having a variably changing value (the audio signal has different values on the time axis). Each of positive values and negative values extracted as a sampling value constitutes an audio event. That is, positive audio events and negative audio events are alternately repeated in the audio signal. In particular, distinctive events (attacks) in the audio events in the audio signal are referred to as the distinctive points or the potential events.

Next, the process in step A2 will be described. The audio signal is preprocessed to emphasize the attacks in the music (audio sound). The emphasized audio signal can be expressed by the ratio (Ps/Pl) of a short term power Ps to a long term power Pl in the audio signal. The short term power Pl is calculated based on a short term Ns before an analysis point and the long term power Pl is calculated based on a long term Nl before the analysis point.

More specifically, a certain point in the audio signal is determined as the analysis point. Then, a short period of time, for example, about 23 ms before the analysis point is determined as the short term Ns. Similarly, a long period of time, for example, about 186 ms before the analysis point is determined as the long term Nl.

Generally, a plurality of audio events are included in each of the short term Ns and long term Ls. The short term Ns and long term Nl are also referred to as the short term block and a long term block, respectively.

The short term power Ps and the long term power Pl can be calculated in the following manner. The short term power Ps is taken to be the sum of the squares of the short term block's sampling values. The long term power Pl is taken to be the sum of the squares of the long term block's sampling values.

The squares are used for emphasizing sampling values. For example, a sampling value greater than 1 is made much greater by multiplying itself. A sampling value smaller than 1 is made much smaller by multiplying itself. Further, the squares are used for converting negative sampling values into positive sampling values which are suitable as power values.

That is, the emphasized signal is the ratio of the present (short term power Ps) to the recent past (long term power Pl). The long term power Pl is smallest at the start of an audio event, and rises as the event enters the long term block. As a result, the start of an audio event is boosted by the long term power Pl in the denominator, and this boost tapers off as the event persists, Therefore, this algorithm tends to emphasize attacks in the music.

Next, the process in step A3 will be described. Event selection is controlled by a "select period". At most one event will be generated per select period. The length of the select period determines the maximum event rate.

In order to be considered for event selection, the emphasized signal must be greater than a threshold value. After thresholding, the peak emphasized signal (short term power Ps/long them power Pl) during each select period is chosen as a potential event. The ratio of the short term power Ps to the long term power Pl of the potential event is its "peak ratio".

Next, the process in step A4 will be described. To prevent overlapping road parts on the screen of the display 18A, the game's geometry dictates a minimum spacing between potential events. Event shadowing drops potential events that would violate this constraint. The remaining events are defined as final events.

An event's time extent is its "road part period". The minimum time between two events is taken to be two times the first event's road part period—this is called the event's "shadow period". No event may occur in another event's shadow period.

When a potential event is selected, the potential event is temporarily stored in a memory. If its shadow period does not pass before another potential event is selected, the peak ratios of two events are compared and the event with the smaller ratio is dropped. Thus, the potential event with the larger ratio is determined to be the final event.

In this manner, a final event signal (final event array) having a series of final events is generated. When each of the final events is reproduced, one road part is displayed. The shape of the road part displayed in each of the final events is determined based a predetermined sequence distribution or weight random distribution.

In summary, according the audio analyzing process, the delay buffer gives time for analysis and graphic display in step A1, the emphasis algorithm highlights interesting events in the audio signal in step A2, event selection produces events with a desired maximum event rate in step A3, and, event shadowing drops events that violate spacing constraints in step A4.

The audio analyzing process comprising the combination of these steps can be effectively performed to generate interesting events from an audio signal.

B. Detailed Explanation

Next, each process performed in steps A1 through A4 will be described specifically in the following sections (B1 Object, B2 Brief explanation of waveform processing, B3 Detailed explanation of waveform processing (B3a Emphasize process, B3b Event selection process, B3c Shadowing process)) with reference to drawings illustrating waveforms.

B1. Object

Figure 41:
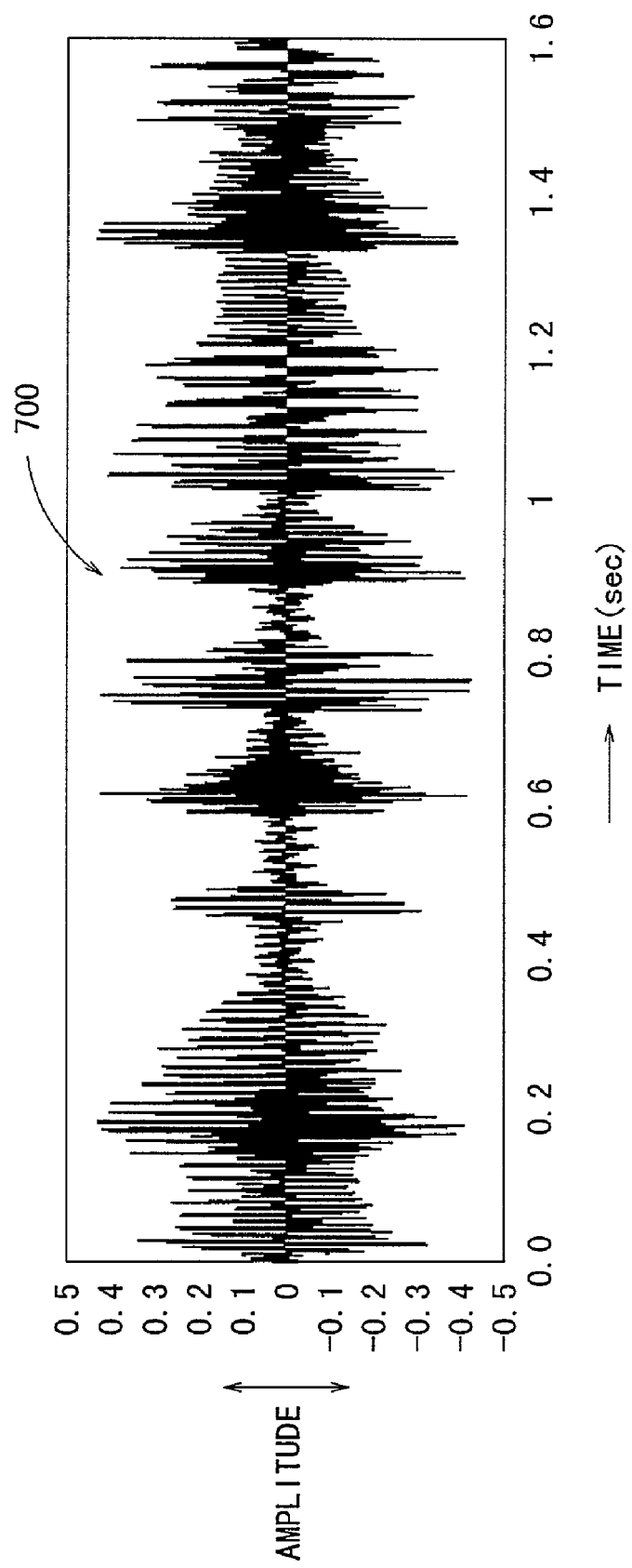
FIG. 41 is a view showing a waveform of a digital audio signal.

FIG. 41 shows a digital audio input signal 700 of an original sound used in a game. The audio signal 700 is read from a music CD or the like and stored in the long buffer 283. The audio signal 700 is shown in an analog waveform for the purpose of brevity. In this example, amplitude values are shown in the range form the minimum value −0.5 to the maximum value of +0.5 as defined by the vertical axis. The horizontal axis is a time axis for 1.6 seconds. As described above, the audio signal 700 includes positive audio events and negative audio events which are repeated alternately.

In this game, it is necessary to extract distinctive points in music and display road parts (obstacle objects) corresponding to the extracted distinctive points on the display 18A synchronously with the music.

Therefore, a system for analyzing a waveform of music for identifying distinctive points in the music is needed.

Figure 42:
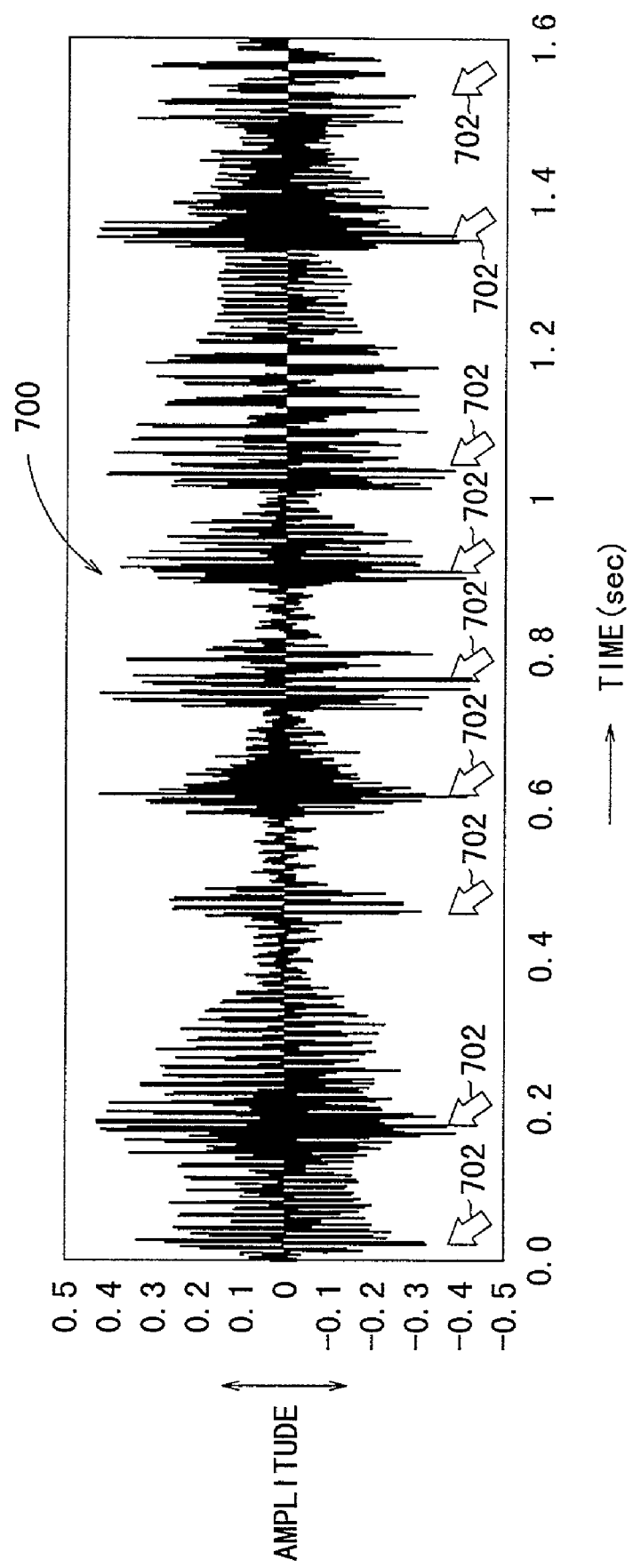
FIG. 42 is a view showing distinctive points in the waveform of the digital audio signal.

As shown in FIG. 42, the audio signal 700 has distinctive points indicated by arrows 702. In reproducing the audio signal 700, these distinctive points can be emphasized as attacks in the music. Therefore, it is preferable to extract audio events at the respective distinctive points indicated by the arrows 702 by a suitable process.

That is, the audio analyzing process according to the present embodiment is intended to analyze music (the waveform of the audio signal 700 shown in FIG. 41) so as to identify attacks in the music (the distinctive points indicated by the arrows 702 in FIG. 42). In the game, positions for displaying road parts on the display 18A are determined based the identified distinctive points.

When the audio analyzing process is applied to the game according to the present invention, it is necessary to select suitable points from the distinctive points indicated by the arrows 702 in FIG. 42 and eliminate the remaining unsuitable points depending on game level settings or the like.

That is, the purpose of the audio analyzing process according to the present embodiment is to extract certain final events based on attacks (distinctive points) in the audio signal (music) recorded in a music CD or the like for utilizing the final events in the game according to the present invention.

B2. Brief Explanation of Waveform Processing

As described above, FIG. 41 shows a waveform of an audio signal 700 which is read from a music CD or the like and stored in the long buffer 283.

Figure 43:
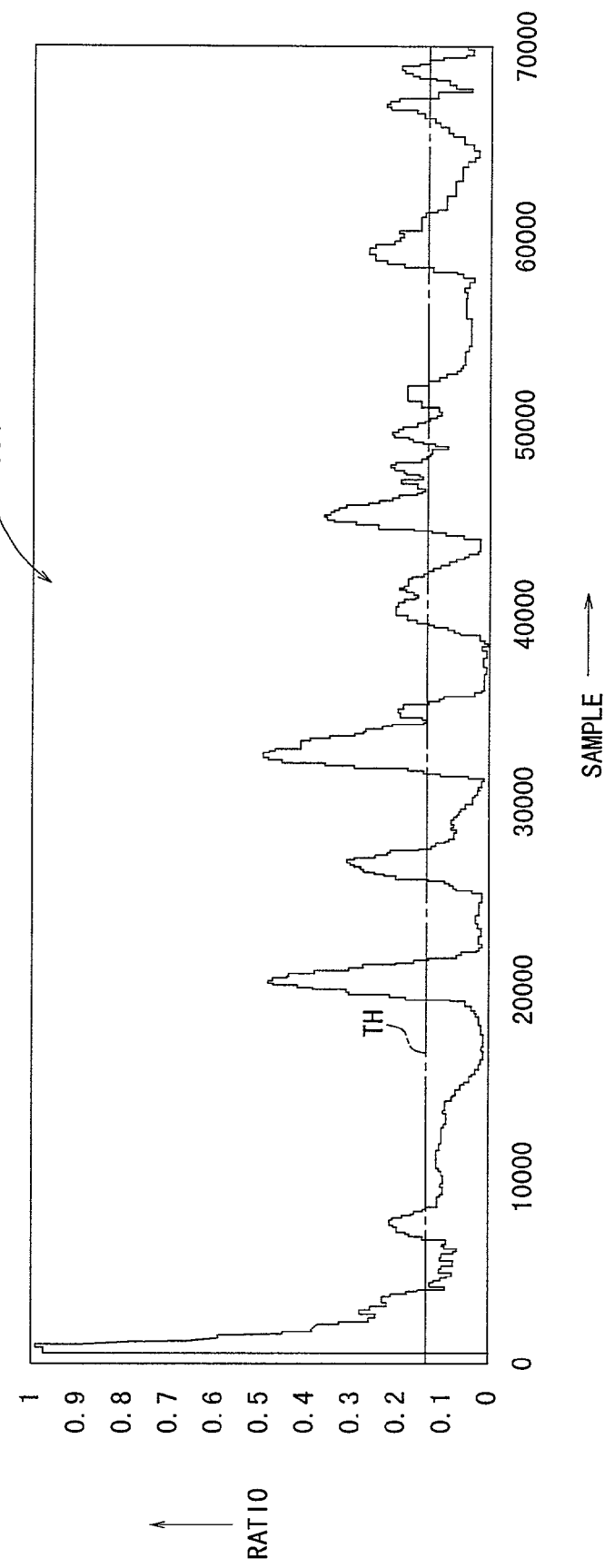
FIG. 43 is a view showing a waveform of an emphasized signal generated by emphasizing the digital audio signal in a predetermined process.

FIG. 43 shows a waveform of an emphasized signal 704. The emphasized signal 704 is obtained by emphasizing rising parts of the waveform, i.e., by emphasizing attacks in the music. The emphasizing process will be described later in detail. In FIG. 43, amplitude values are shown in the positive range from 0 to the maximum value of 1.0 as normalized by the vertical axis. The horizontal axis is a time axis indicating respective sampling points.

Figure 44:
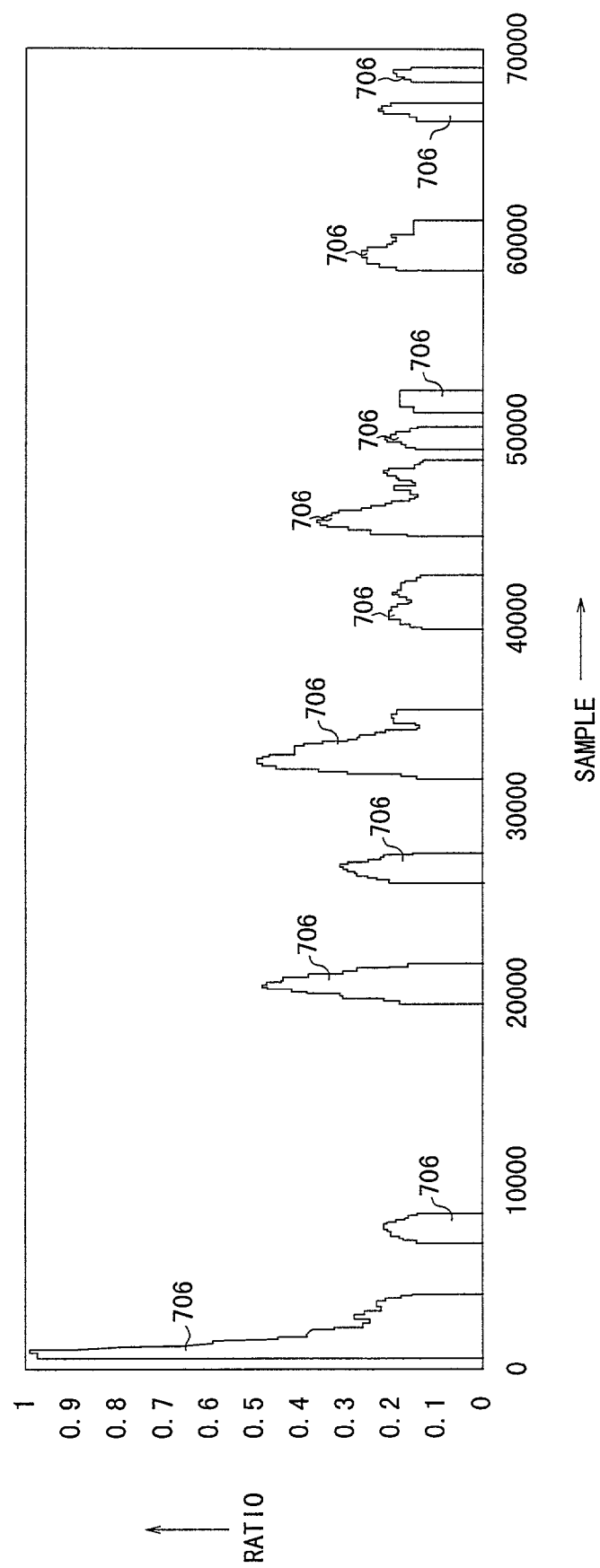
FIG. 44 is a view showing a waveform of a signal (attack events) generated by converting the emphasized signal with a threshold to eliminate unnecessary parts of the waveform.

FIG. 44 shows a waveform of a signal indicating attack events 706. The signal is obtained by converting the emphasized signal 704 with a threshold TH (see FIG. 43) to eliminate unnecessary parts of the waveform.

Figure 45:
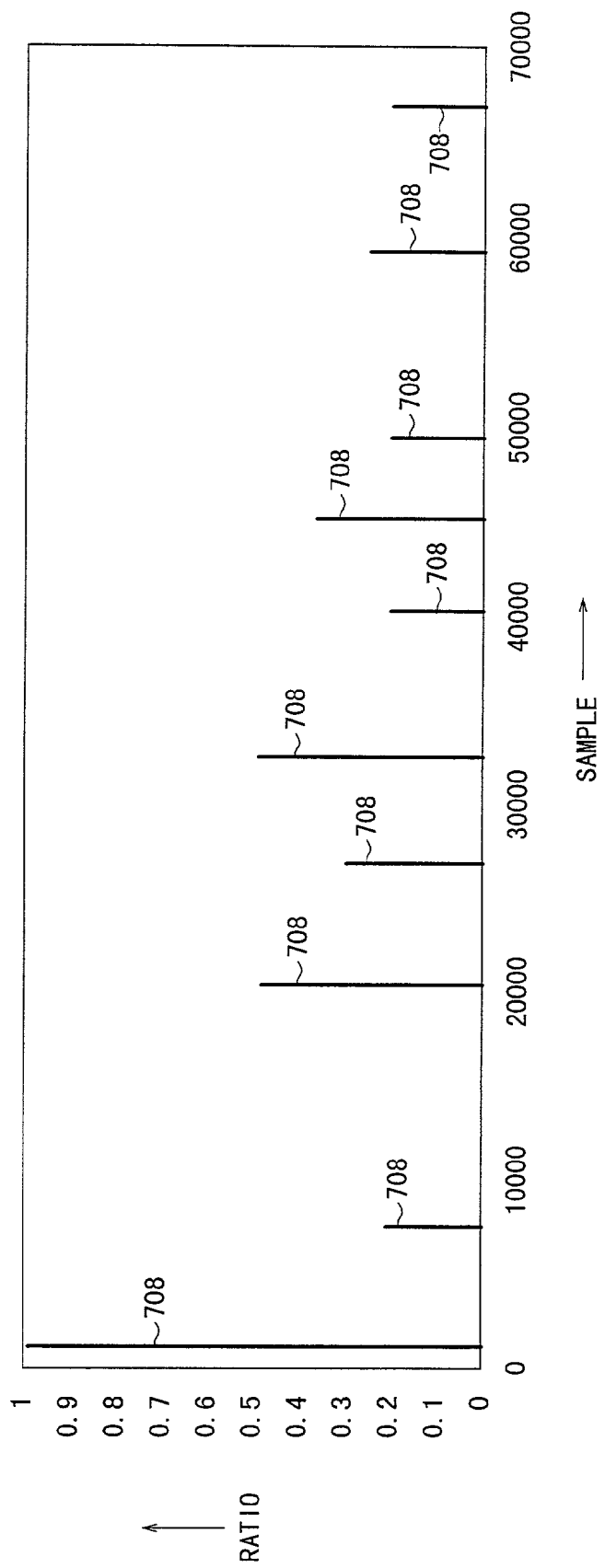
FIG. 45 is a view showing peaks of the respective attack events (potential events) in the waveform.

FIG. 45 shows a waveform of a signal indicating potential events 708. The signal is obtained by dividing the time axis into a plurality of blocks (select periods) and extracting a peak in each of the divided blocks.

It is to be understood that the potential events 708 correspond to the distinctive points indicated by the arrows 702 in FIG. 42.

Figure 46:
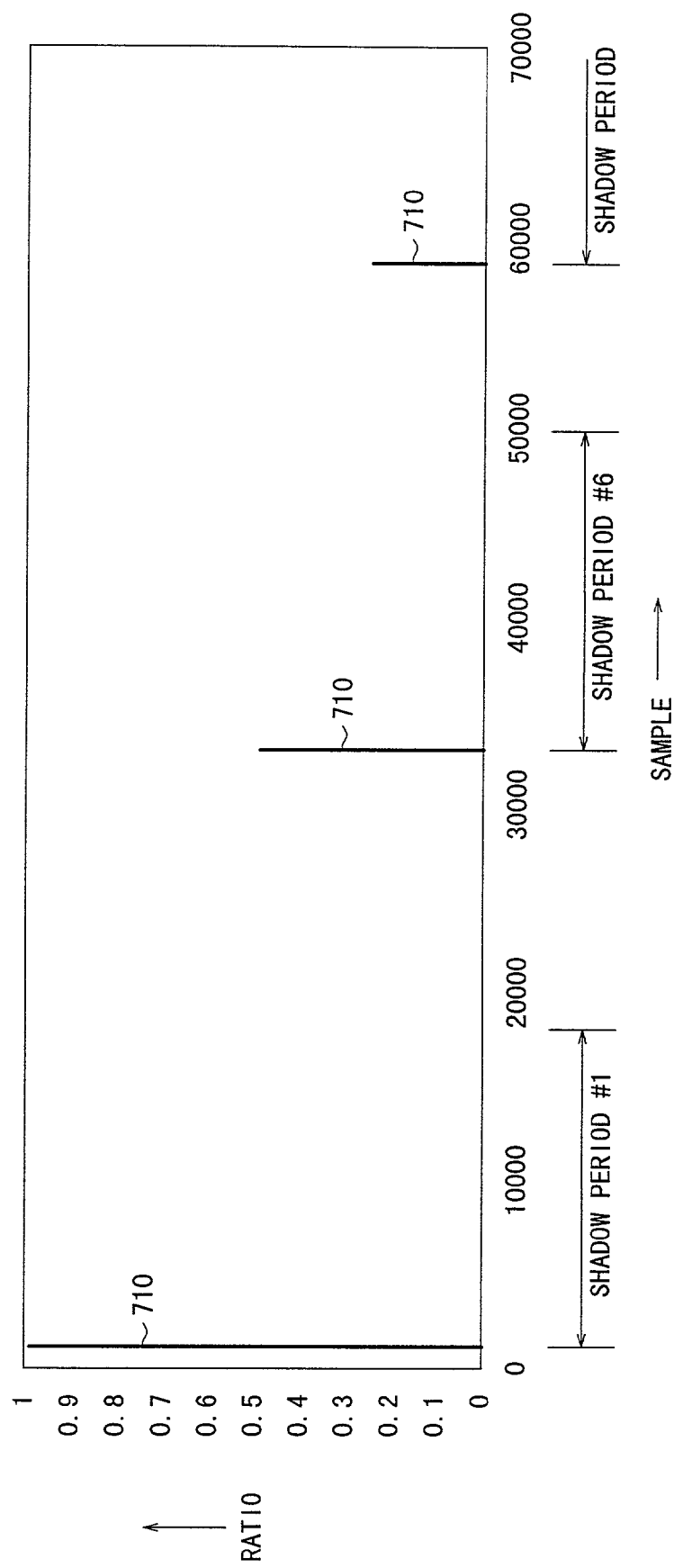
FIG. 46 is a view showing final events selected from the potential events in the waveform by a predetermined process.

FIG. 46 shows a signal indicating final events 710. The final events 710 are selected from the potential events 708 based on the game system.

Figure 47:
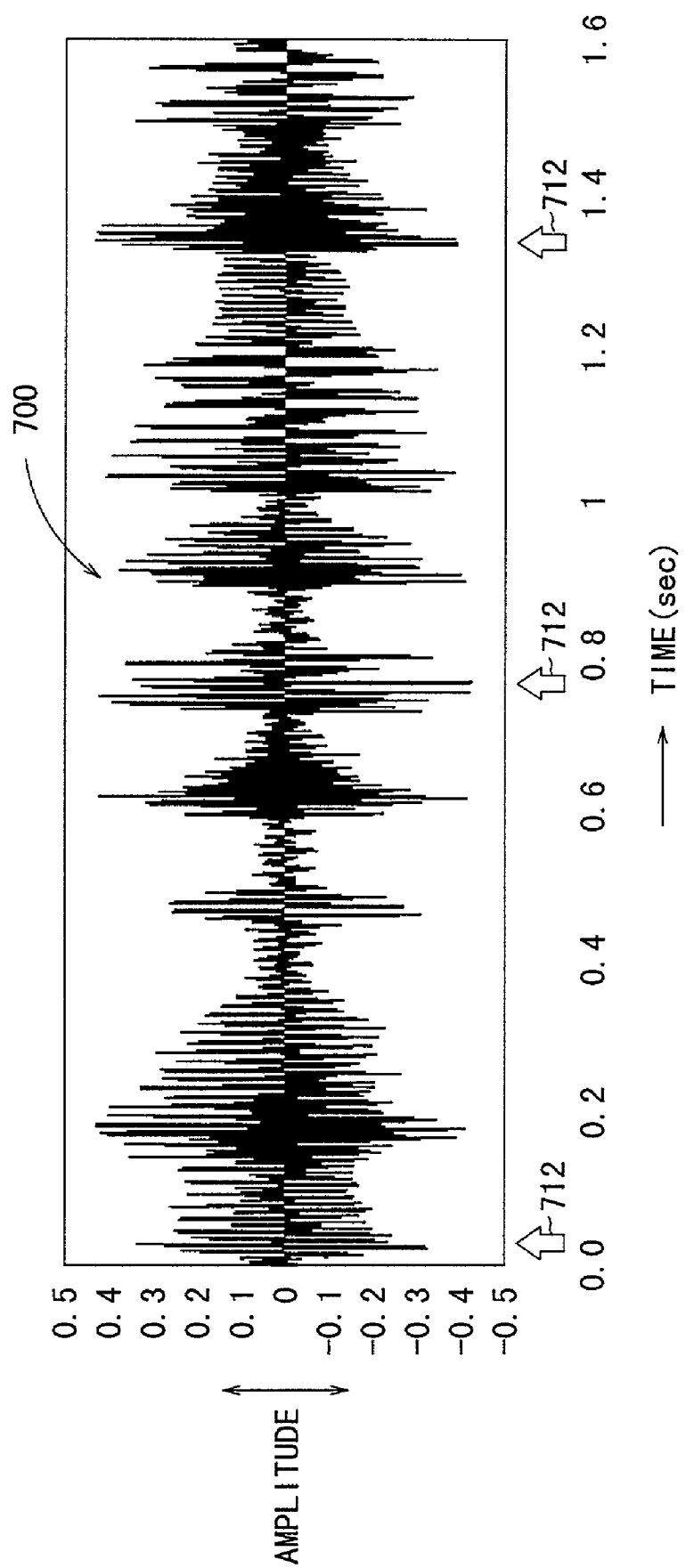
FIG. 47 is a view showing positions of the final events in the waveform of the digital audio signal.

FIG. 47 shows positions of the final events in the music (audio signal of FIG. 41). The final events are extracted from the positions indicated by arrows 712.

B3. Detailed Explanation of Waveform Processing

B3a. Emphasize Process

The emphasize process is intended to obtain the emphasized signal 704 of FIG. 43 from the audio signal 700 of FIG. 41.

Figure 48:
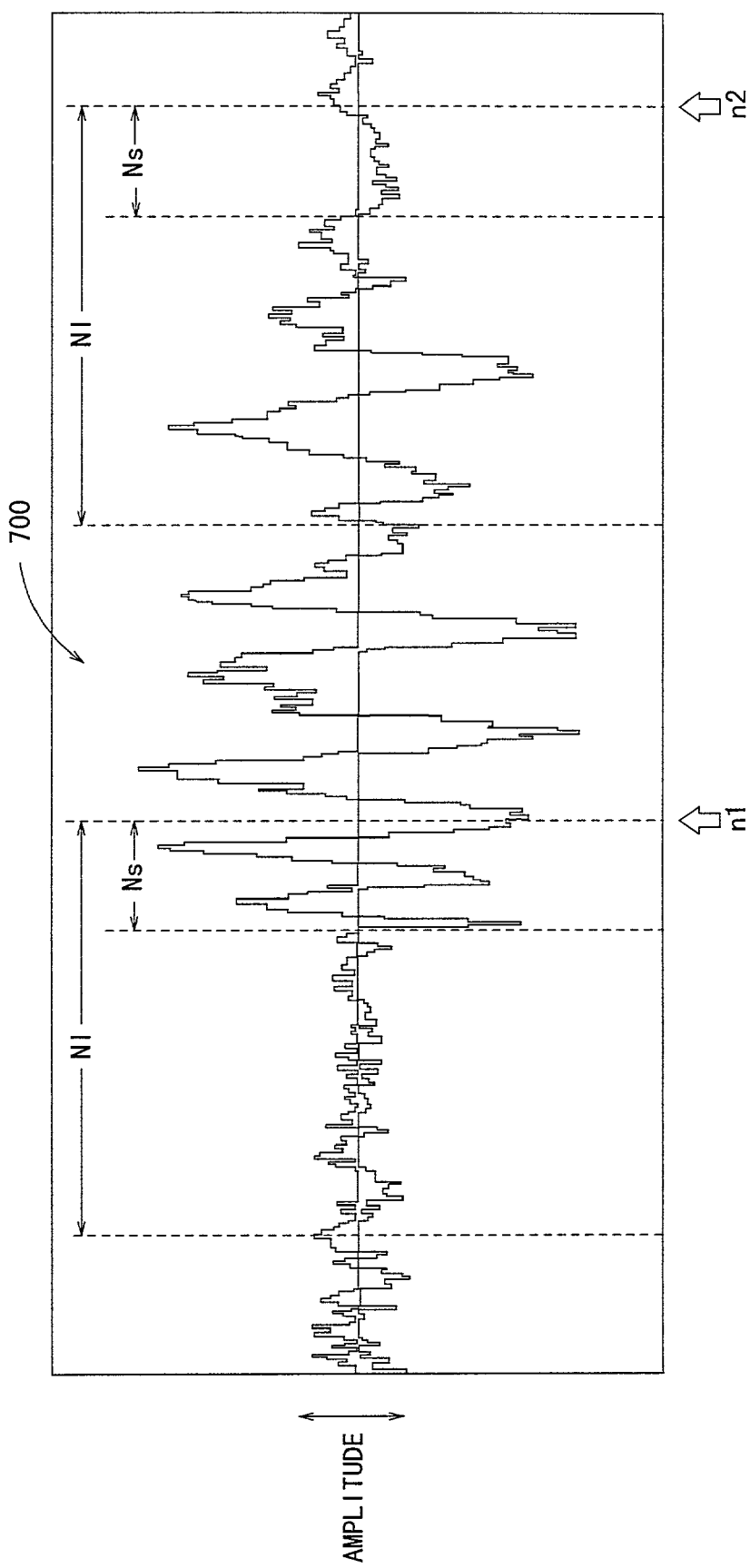
FIG. 48 is a view partially showing the waveform in FIG. 41 which is enlarged on the time axis.

FIG. 48 shows an enlarged view showing a part of the audio signal 700 in FIG. 41. The audio signal 700 is partially extracted and expanded on the time axis.

The emphasis process can be performed each time a sampling value is obtained. However, for the purpose of brevity, the emphasis process at a point of time n1 and the emphasis process at a point of time n2 will be described only.

A short period of time, for example, 23 ms before the time point n1 (or n2) is defined as a short term block Ns of n1 (or n2).

Further, a long period of time, for example, 186 ms before the time point n1 (or n2) is defined as a long term block Nl of n1 (or n2).

In FIG. 48, it is appreciated that the fluctuation of the waveform is large near the time point n1 in comparison with the fluctuation near the time point n2. That is, the time point n1 (the waveform near the time point n1) is considered to be more distinctive than the time point n2 (the waveform near the time point n2).

The total sum of values of the audio events (sampling values of the waveform) near the time point n1, i.e., short term power Ps (n1) is larger than the total sum of values of the audio events near the time point n2, i.e., short term power Ps (n2). Therefore, the waveform near the time point n1 is considered to be distinctive in comparison with the waveform near the time point n2.

Next, the method of emphasizing the waveform around the time points n1 and n2 will be described. In emphasizing the waveform around the time points n1 and n2, the long term blocks Nl are taken into consideration.

The degree of the fluctuation of the present waveform can be effectively considered by comparing the present waveform with the past waveform. That is, if the fluctuation of the past waveform is small, the fluctuation of the present waveform is considered to be comparatively large, i.e., the present waveform is considered to be distinctive.

More specifically, in FIG. 48, the total sum of values of the audio events in the long term block Nl near the time point n1, i.e., long term power Pl (n1) is smaller than the total sum of values of the audio events in the long term block Nl near the time point n2, i.e., long term power Pl (n2). Therefore, the waveform near the time point n1 is considered to be distinctive.

As described above, when the ratio of the short term power Ps to the long term power Pl is large at a time point, the waveform near the time point is considered to be distinctive. In FIG. 48, it is possible to analyze the degree of the fluctuation at the time point n1 from the ratio Ps (n1)/Pl (n1), and analyze the degree of the fluctuation at the time point n2 from the ratio Ps (n2)/Pl (n2). That is, it is possible to emphasize the audio events in the waveform near the time points n1 and n2 from the ratios. The signal emphasized by the above process is defined as the emphasized signal.

In the example of FIG. 48, since Ps (n1)/Pl (n1) is much larger than Ps (n2)/Pl (n2), the waveform near the time point n1 is considered to be much more distinctive than the waveform near the time point n2.

Next, a quantitative method of calculating the total sum of the values of audio events, Ps (n), Pl (n) will be described.

Figure 49:
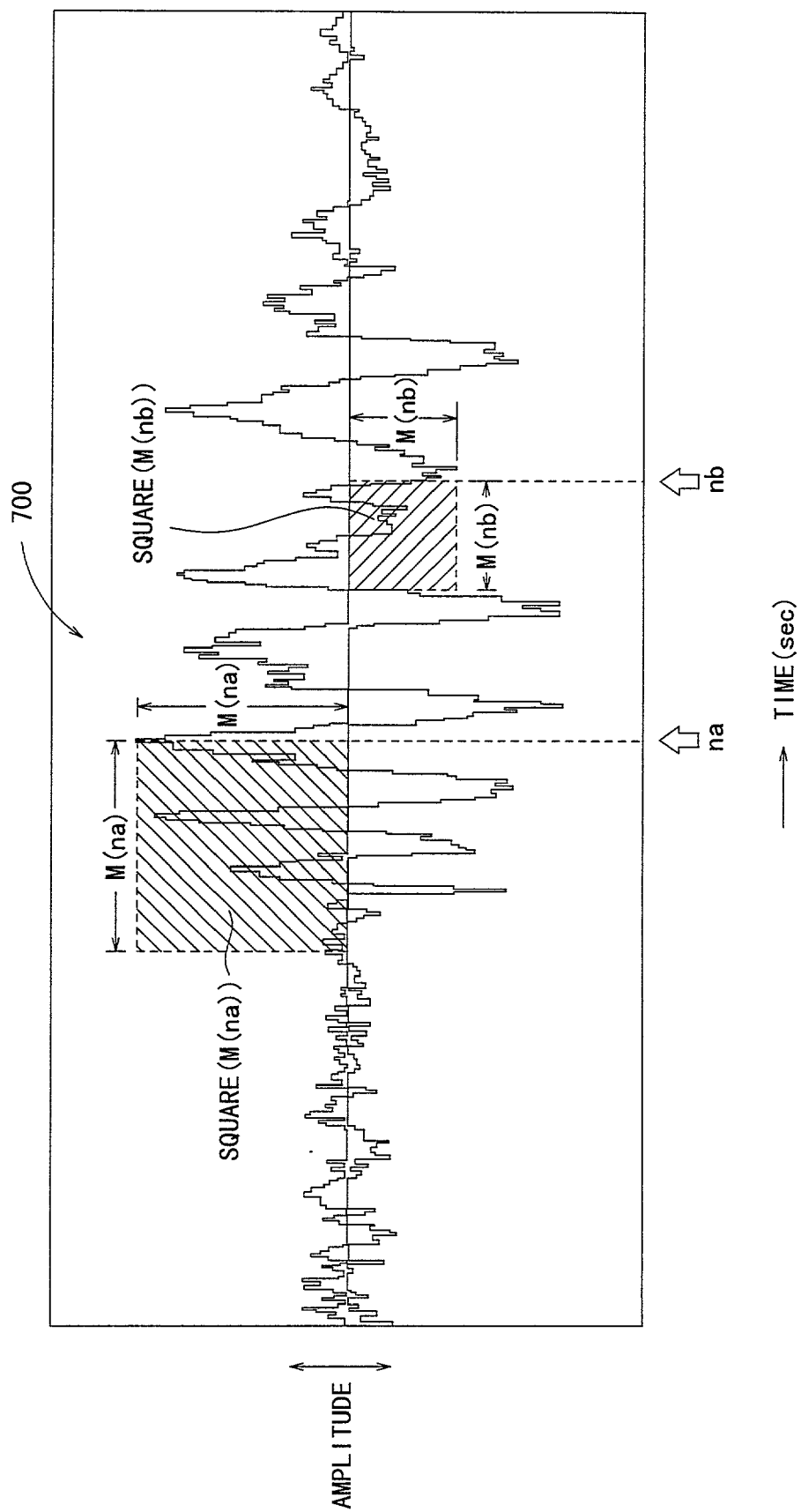
FIG. 49 is a view illustrating a power of an audio event at a certain time point.

In FIG. 49, powers of audio events at respective time points na and nb are defined.

When a value of the audio event at the time point na is M (na), the power of the audio event at the time point na corresponds to the area shown by a shaded portion defined by the following expression:

$$M(na) \times M(na) = \text{SQUARE}(M(na)) > 0$$

Similarly, when a value of the audio event at the time point nb is M (nb), the power of the audio event at the time point nb corresponds to the area shown by a shaded portion defined by the following expression:

$$M(nb) \times M(nb) = \text{SQUARE}(M(nb)) > 0$$

A total sum of powers of audio events in a short term block at a time point n is defined as the short term power Ps (n).

A method of calculating a short term power Ps (n) in a short term block at a time point n is described below.

For example, at the time point n1 shown in FIG. 48, the short term power Ps (n1) is expressed by the total sum of powers obtained at respective sampling points q in the short term block Ns (n1). The short term block Ns (n1) indicates a period of time from the time point n1-Ns to the time point n1. That is, the short term power Ps is the sum of the squares of the short term block's sampling values (SUM SQUARE (M (q))).

A total sum of powers of audio events in a long term block at a time point n is defined as the long term power Pl (n).

A method of calculating a long term power Pl (n) in a long term block at a time point n is described below.

For example, at the time point n1 shown in FIG. 48, the long term power Ps (n1) is expressed by the total sum of powers obtained at respective sampling points q in the long term block Nl (n1). The long term block Nl (n1) indicates a period of time from the time point n1-Nl to the time point n1. That is, the long term power Ps is the sum of the squares of the long term block's sampling values (SUM SQUARE (M (q))).

In this manner, a short term power Ps (n) and a long term power Pl (n) at a time point (n) can be calculated.

Figure 50:
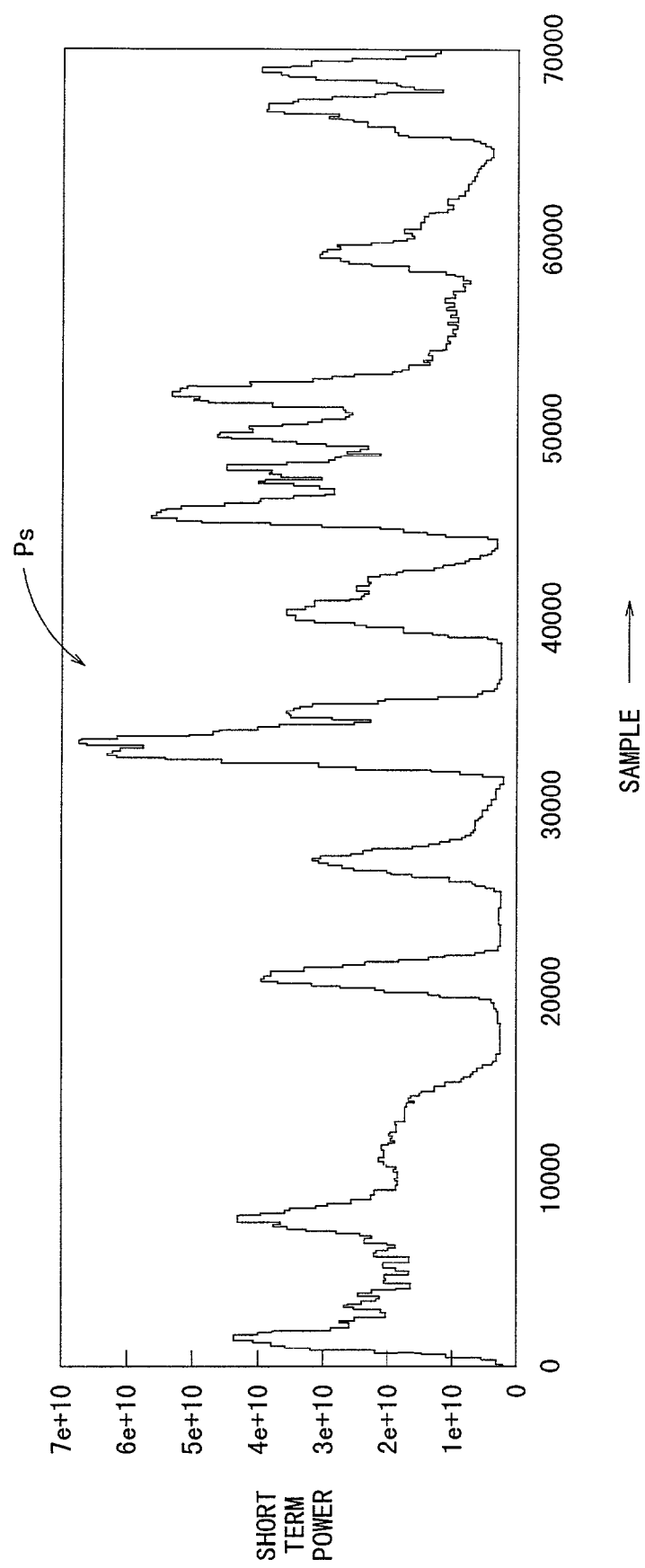
FIG. 50 is a graph showing short term powers.

FIG. 50 is a graph showing short term powers Ps of the audio signal 700 in FIG. 41. In the vertical axis, 1e+10 signifies $1 \times e^{10}$ (e is a base of natural logarithm).

Figure 51:
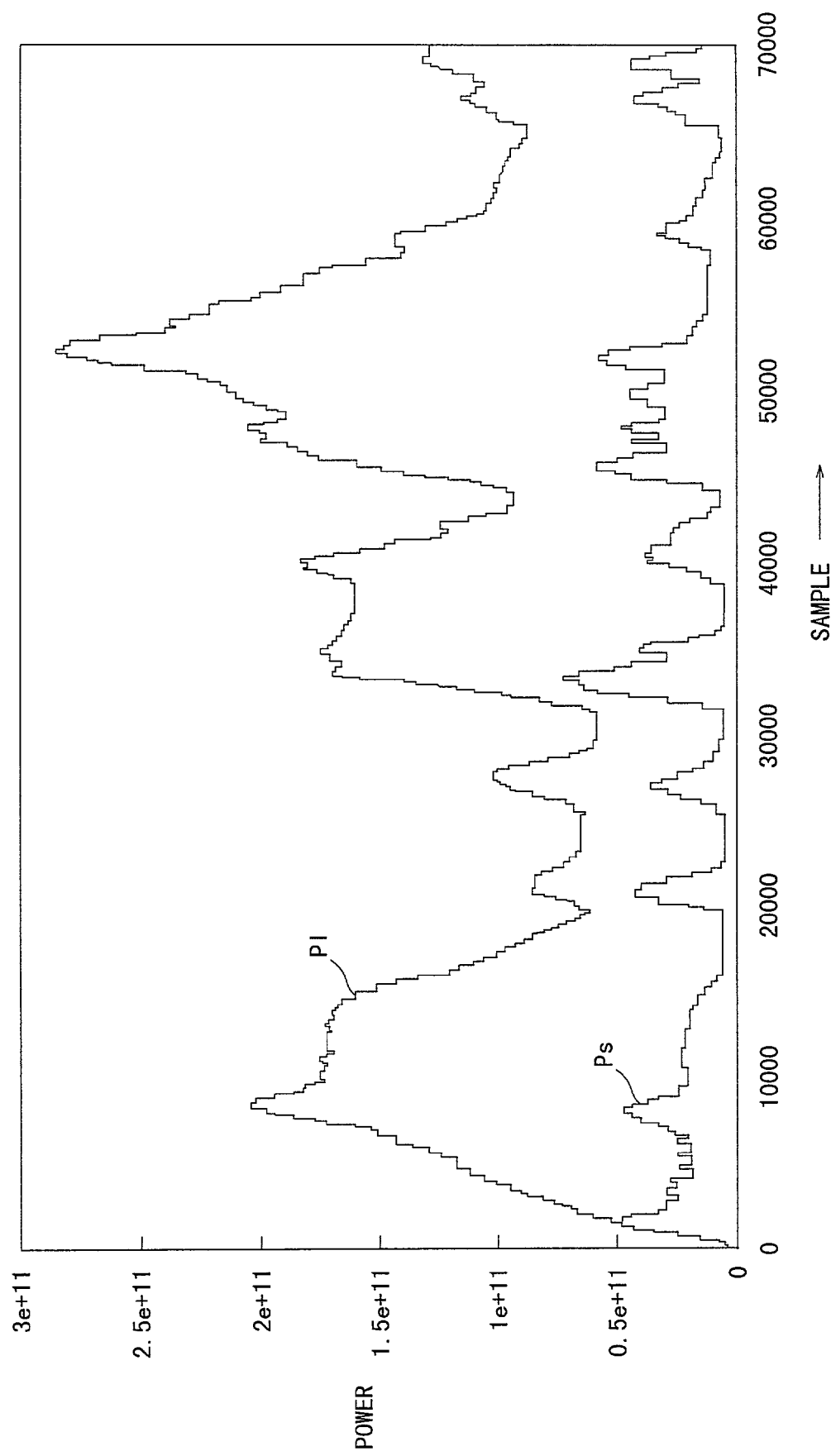
FIG. 51 is a graph showing the short term powers and long term powers.

FIG. 51 is a graph showing long term powers Pl of the audio signal 700 in FIG. 41 in addition to the short term powers Ps in FIG. 50 (scaling of the vertical axis is changed).

Figure 52:
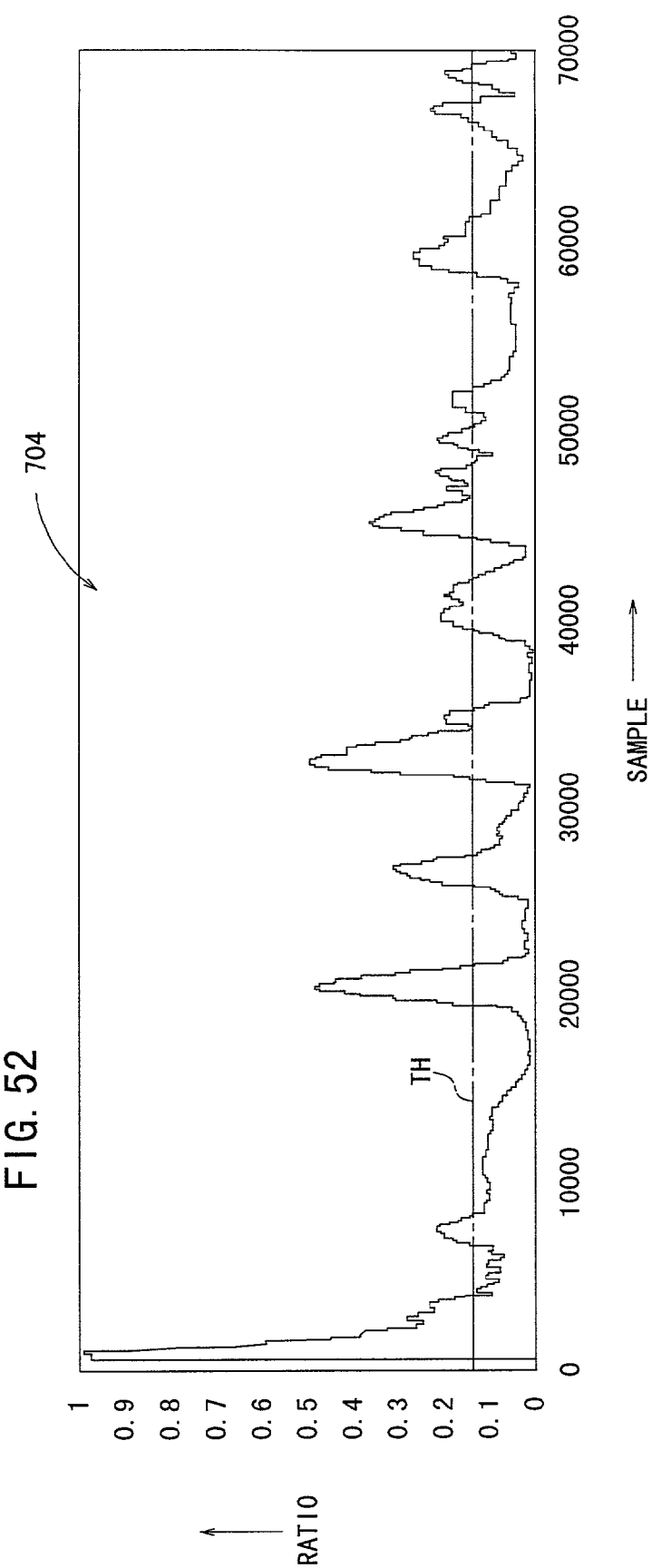
FIG. 52 is a view showing the waveform of the emphasized signal as the ration of the short term power to the long term power.

FIG. 52 is a graph showing an emphasized signal 704. The emphasized signal 704 comprises the ratio (Ps/Pl) of the short term power Ps to the long term power Pl. FIG. 52 and FIG. 43 are the same graph.

B3b. Event Selection Process

The event selection process is intended to partially eliminate the emphasized signal 704 using a threshold TH. That is, parts (ratios Ps/Pl) of the emphasized signal which do not exceed the threshold value TH are eliminated. Further, the time axis is divided into a plurality of select periods. The length of the select period is related to the scrolling speed in the game. Therefore, the length of the select period is determined based on game level settings.

Figure 53:
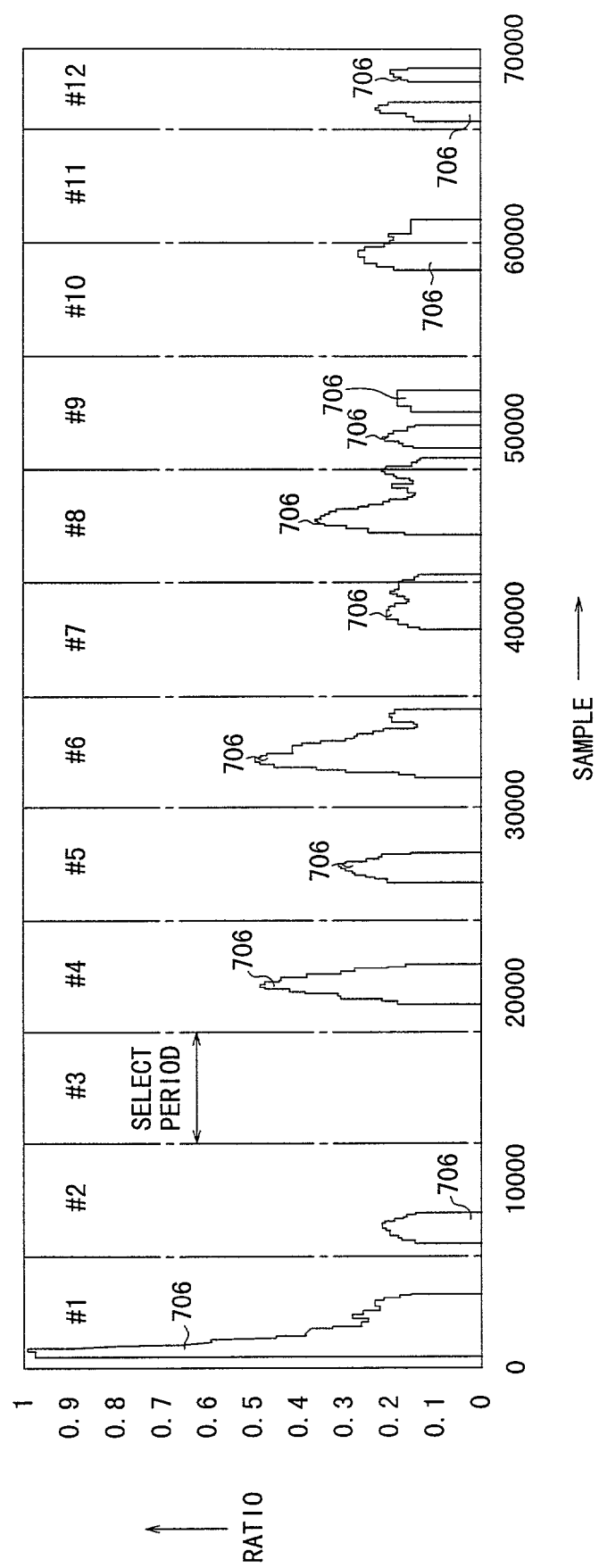
FIG. 53 is a view showing attack events in the waveform which is divided into select periods.

FIG. 53 shows an emphasized signal indicating attack events 706. The signal is obtained by partially eliminating the emphasized signal 704 using the threshold TH. The time axis is divided into twelve select periods #1 thorough #12.

Then, peak ratios are detected in the respective select periods #1 through #12. The peak ratios are defined as the potential events PE. The array of the potential events PE is defined as the potential signal 708.

The positions of the potential events PE constituting the potential signal 708 are substantially corresponding to the positions of the audio events of the audio signal 700 indicated by the arrows 702 in FIG. 42.

B3c. Event Shadowing

The event shadowing process is intended to eliminate unnecessary potential events PE in the game system and to control the game level.

In the event shadowing process, a shadow period SP is determined as a parameter in setting a game level.

Final events FE needed in the game are selected from potential events PE indicating distinctive points of the music.

Specifically, the event shadowing process comprises the following three steps (steps 1 through 3).

In step 1, a potential event PE in the present shadow period is selected. Then, it is determined whether another potential event PE is included in the present shadow period. That is, in step 1, it is determined whether a plurality of potential event PE are included in the same shadow period of the selected potential event PE or not.

If it is determined that another potential event PE is not included in the shadow period of the selected potential event PE in step 1, control passes to step 2.

In step 2, the selected potential event PE is determined as an effective final event. Then, control passes back to step 1 for selecting the next potential event PE on the time axis.

If it is determined that another potential event PE is included in the shadow period of the selected potential event PE in step 1, control passes to step 3.

In step 3, a potential event PE having the largest peak value is selected in the present shadow period as a final event FE. If two or more potential events PE having the same peak ratio are included in the present shadow period, the earliest potential event PE on the time axis is selected as a final event. The remaining potential events PE are eliminated. Then, the control passes back to step 1.

Figure 54:
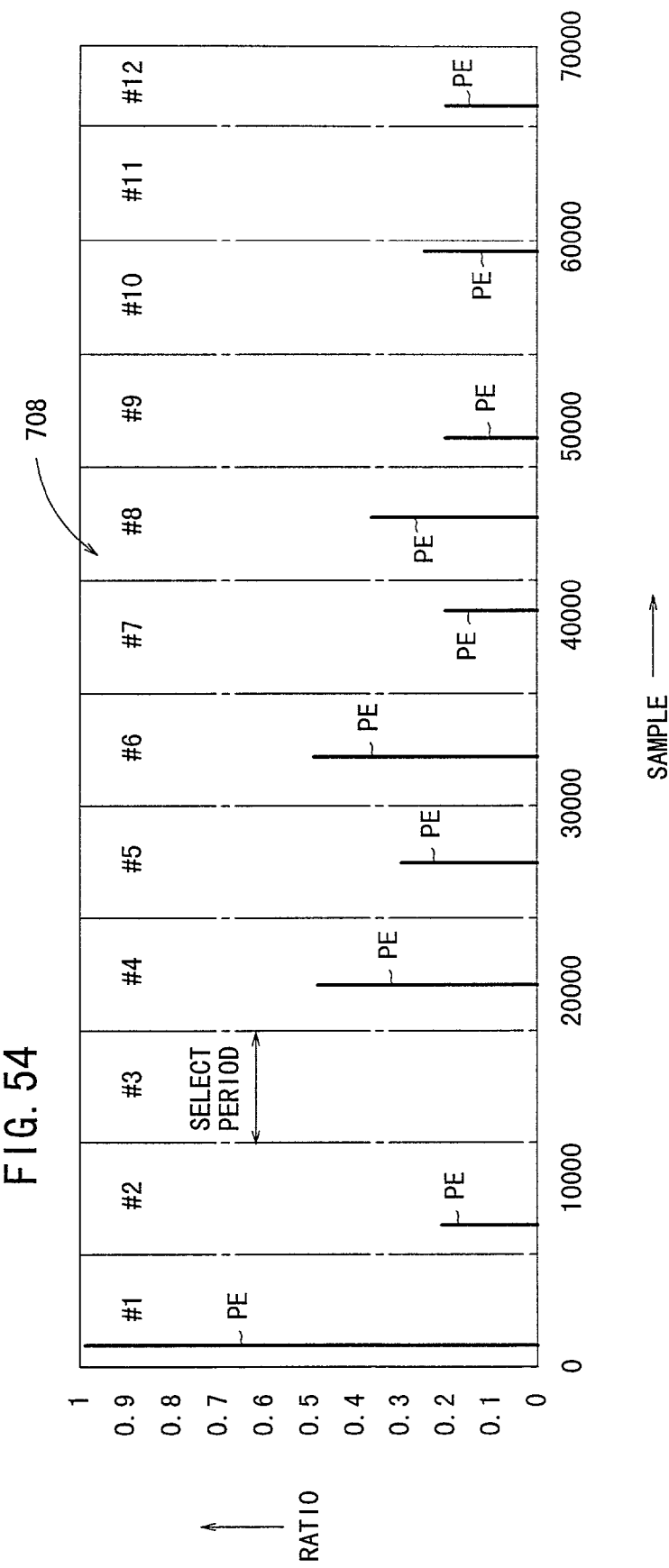
FIG. 54 is a view showing potential events representing peaks in respective select periods of the waveform.
Figure 55:
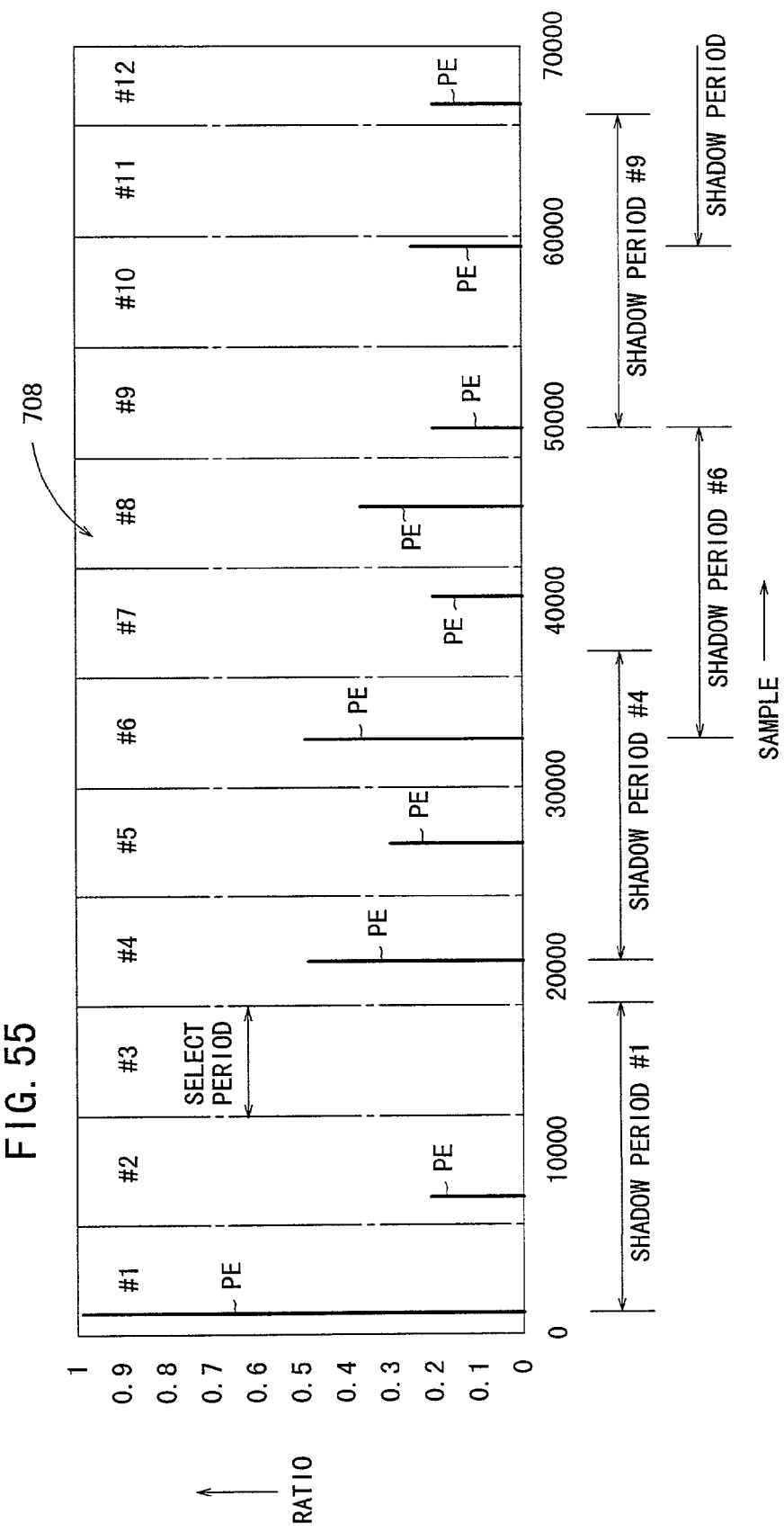
FIG. 55 is a view showing the waveform of potential events in which shadow periods are set on the time axis of the waveform.

The above steps 1 through 3 will be described specifically with reference to FIG. 55 (FIG. 55 and FIG. 54 are the same graph). Firstly, a potential event PE in the first shadow period #1 is selected. The first shadow period #1 includes three select periods #1 through #3. That is, there are two potential events PE (a potential event PE in the first select period #1 and a potential event PE in the second select period #2) in the first shadow period #1.

In this case, as described above, the potential event PE in the first select period #1 is selected and the potential event PE in the second select period #2 is eliminated in step 3. That is, the potential event PE in the first select period #1 is extracted as the effective final event FE in the first shadow period. Next, the potential event PE in the select period #4 is selected as the next final event FE, since the potential event PE in the second select period #2 has already been eliminated as described above. In the shadow period #4, there are three potential events PE (the potential event PE in the select period #4, the potential event PE in the select period #5, and the potential event PE in the select period #6). Then, the potential event PE in the select period #6 is selected as the final event and the other potential events PE in the select periods #4 and #5 are eliminated.

Then, control passes back to step 1. There are three potential events PE in the next shadow period #6 (the potential event PE in the select period #6, the potential event PE in the select period #7, and the potential event PE in the select period #8). In step 3, the potential event PE in select period #6 is selected again as the final event FE and other potential events PE in the select periods #7 and #8 are eliminated. Then, control passes back to step 1.

Figure 56:
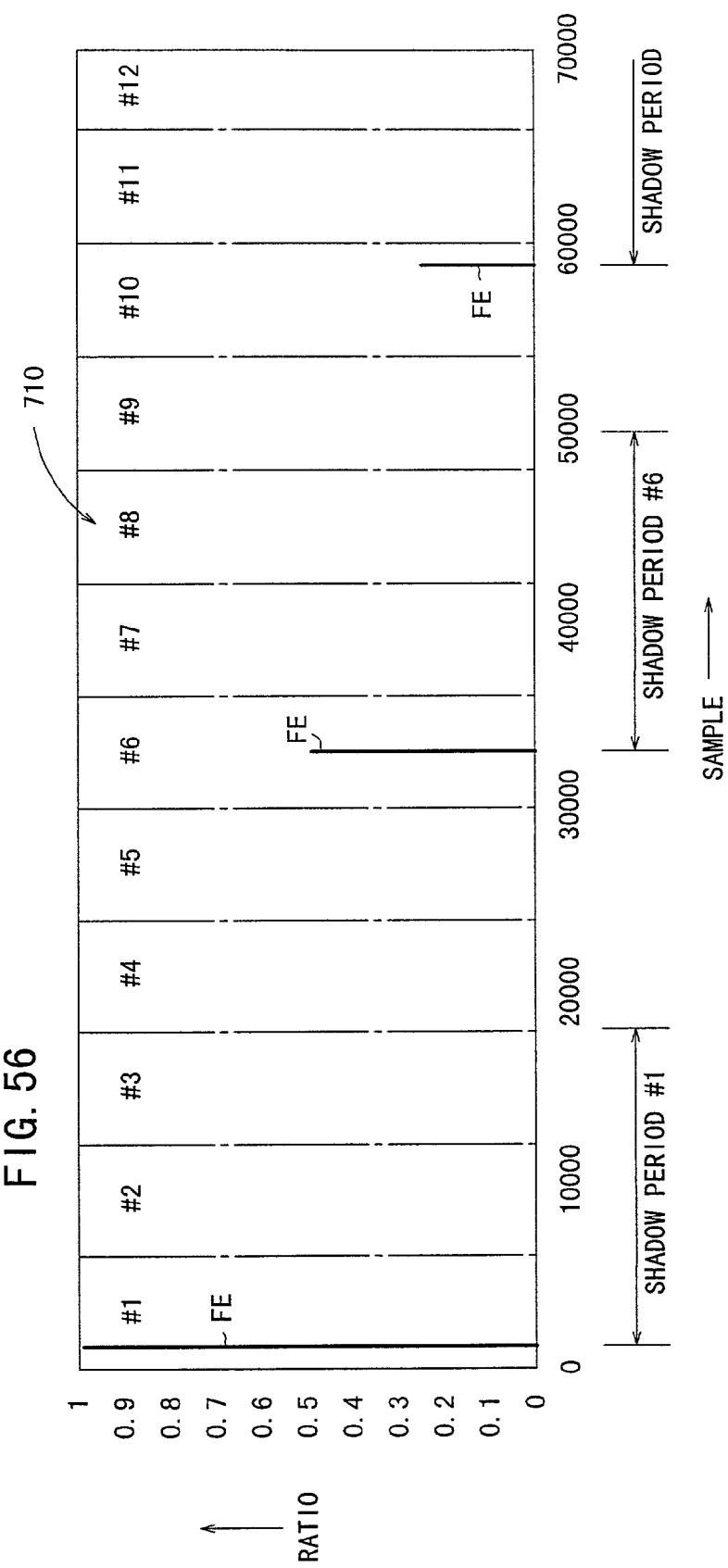
FIG. 56 is a view showing final events in the waveform.

By repeating the above process, as shown in FIG. 56, three effective final events FE can be extracted from eleven potential events PE of FIG. 55.

At the positions of the final events FE, obstacle objects 411 or the like are generated as road parts.

The type of obstacle object 411 or the like is determined by the process which was described with reference to FIG. 19.

As described above, the entertainment system as applied to the embodiment according to the present invention comprises the buffer 283, audio signal analyzing means (the CPU 251), and road part generating means (the CPU 251). The buffer 283 stores an audio signal 700 for a certain period of time. The audio signal 700 includes sampling values constituting continuous events, i.e., positive audio events and negative audio events. The audio signal analyzing means reads the audio signal 700 from the buffer 283 and analyzes the audio events in the read audio signal 700 as distinctive points so as to select final events FE. The road part generating means generates objects such as road parts 411 or the like to be displayed on the screen of the display 18A.

According to the present embodiment, the CPU 251 as the audio signal analyzing means has a first function to generate an emphasized signal 704 by calculating a ratio of Ps/Pl, i.e., a ratio of a short term power (Ps) in a predetermined short period before a time point (sampling point) to a long term power (Pl) in a predetermined long period of time before the time point (sampling point) at each of the time points (sampling points) so as to emphasize sampling values obtained in the sampling points.

Further, the audio analyzing means has a second function to partially extract the emphasized signal by comparing the values in the emphasized signal 704 and a threshold TH. Specifically, parts of the emphasized signal 704 having values smaller than the threshold TH is eliminated and the remaining parts of the emphasized signal 704 having values equal to or larger than the threshold TH are extracted.

Further, the audio analyzing means has a third function to determine potential events PE by dividing the emphasized signal 704 into a plurality of select periods having a predetermined period of time and selecting peak values in the respective select periods.

Further, the audio analyzing means has a fourth function to select final events FE from the potential events PE. Specifically, shadow periods each having at least two times longer than the select period are assigned in the overall period of the audio signal such that each shadow period starts one of the potential events PE. Then, the largest potential event PE is selected as the final event FE.

Preferably, a short term power is the sum of the squares of sampling values in a short term block and the long term power is the sum of the squares of sampling values in a long term block.

The road part generating means may generate road parts to be displayed on the display 18A based on combinations of positive and/or negative gradients between respective adjoining peaks of the selected final events FE.

What is claimed is:

1. An audio processing and image generating apparatus comprising:
    means for analyzing an audio signal supplied from a recording medium storing said audio signal or via a communication link, wherein the means for analyzing the audio signal performs a frequency analysis and/or an amplitude analysis of the audio signal for a certain period of time; and
    means for generating a game image based on a result of an analysis of said audio signal, wherein the means for generating the game image generates a predetermined game image based on a result of the frequency analysis and/or the amplitude analysis of the audio signal,
    wherein the audio processing and image generating apparatus comprises a game machine;
    wherein said game image indicates the timing for an operator to manipulate a predetermined control member selected from a plurality of control members of a controller;
    wherein the analyzing the audio signal and the generating the game image are performed in parallel with a display process.

2. An audio processing and image generating apparatus according to claim 1, wherein said timing to manipulate the predetermined control member is timing according to music based on said audio signal.

3. A method of audio processing and image generating comprising the steps of:
    analyzing an audio signal supplied from a recording medium storing said audio signal or via a communication link, wherein the analyzing the audio signal includes performing a frequency analysis and/or an amplitude analysis of the audio signal for a certain period of time; and
    generating a game image based on a result of an analysis of said audio signal, wherein the generating the game image includes generating a predetermined game image based on a result of the frequency analysis and/or the amplitude analysis of the audio signal,
    wherein the method of audio processing and image generating comprises a method for use in a game machine;
    wherein said game image indicates the timing for an operator to manipulate a predetermined control member selected from a plurality of control members of a controller;
    wherein the steps of analyzing and generating are performed in parallel with a display process.

4. A method of audio processing and image generating according to claim 3, wherein said timing to manipulate the predetermined control member is timing according to music based on said audio signal.

5. A recording medium for storing a program, said program comprising the steps of:
    analyzing an audio signal supplied from a recording medium storing said audio signal or via a communication link, wherein the analyzing the audio signal includes performing a frequency analysis and/or an amplitude analysis of the audio signal for a certain period of time; and
    generating a game image based on a result of an analysis of said audio signal, wherein the generating the game image includes generating a predetermined game image based on a result of the frequency analysis and/or the amplitude analysis of the audio signal,
    wherein the program comprises a game program;
    wherein said game image indicates the timing for an operator to manipulate a predetermined control member selected from a plurality of control members of a controller;
    wherein the steps of analyzing and generating are performed in parallel with a display process.

6. A recording medium according to claim 5, wherein said timing to manipulate the predetermined control member is timing according to music based on said audio signal.

7. A program comprising the steps of:
analyzing an audio signal supplied from a recording medium storing said audio signal or via a communication link, wherein the analyzing the audio signal includes performing a frequency analysis and/or an amplitude analysis of the audio signal for a certain period of time; and generating a game image based on a result of an analysis of said audio signal, wherein the generating the game image includes generating a predetermined game image based on a result of the frequency analysis and/or the amplitude analysis of the audio signal, wherein the program comprises a game program;

wherein said game image indicates the timing for an operator to manipulate a predetermined control member selected from a plurality of control members of a controller;

wherein the steps of analyzing and generating are performed in parallel with a display process.

8. A program according to claim 7, wherein said timing to manipulate the predetermined control member is timing according to music based on said audio signal.

* * * * *